US012427075B2

(12) United States Patent
Lim et al.

(10) Patent No.: US 12,427,075 B2
(45) Date of Patent: Sep. 30, 2025

(54) SURGICAL FRAME INCLUDING MAIN BEAM FOR FACILITATING PATIENT ACCESS

(71) Applicant: Warsaw Orthopedic, Inc., Warsaw, IN (US)

(72) Inventors: Roy K. Lim, Germantown, TN (US); Matthew M. Morrison, Cordova, TN (US); Thomas V. McGahan, Germantown, TN (US); Richard A. Hynes, Melbourne Beach, FL (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 134 days.

(21) Appl. No.: 18/515,211

(22) Filed: Nov. 20, 2023

(65) Prior Publication Data

US 2024/0082092 A1 Mar. 14, 2024

Related U.S. Application Data

(63) Continuation of application No. 17/334,089, filed on May 28, 2021, now Pat. No. 11,819,461, which is a (Continued)

(51) Int. Cl.

| | |
|---|---|
| ***A61G 13/12*** | (2006.01) |
| ***A61G 13/04*** | (2006.01) |
| ***A61G 13/08*** | (2006.01) |

(52) U.S. Cl.

CPC ......... *A61G 13/1295* (2013.01); *A61G 13/04* (2013.01); *A61G 13/08* (2013.01); (Continued)

(58) Field of Classification Search

CPC ..... A45F 3/24; A45F 3/22; A45F 3/26; A61B 6/0407; A61G 13/04; A61G 13/122; (Continued)

(56) References Cited

U.S. PATENT DOCUMENTS

| | | | |
|---|---|---|---|
| 2,691,979 | A | 10/1954 | Watson |
| 3,060,925 | A | 10/1962 | Honsaker et al. |

(Continued)

FOREIGN PATENT DOCUMENTS

| | | | |
|---|---|---|---|
| CN | 2100875 | U | 4/1992 |
| CN | 201185976 | | 1/2009 |

(Continued)

OTHER PUBLICATIONS

Examination Report dated Apr. 8, 2020 from Australian Application No. 2016308175.

(Continued)

*Primary Examiner* — Madison Emanski

(57) ABSTRACT

A surgical positioning frame for supporting a patient includes a main beam having an axis of rotation relative to support structures. The main beam rotates the patient between a prone position and a lateral position. The main beam including a conforming main beam portion extending between the first and second support arms. The conforming main beam is preferably configured to allow a surgeon access to one lateral side of the patient and a surgical assistant access to the other lateral side of the patient with limited interference thereby.

20 Claims, 39 Drawing Sheets

Related U.S. Application Data continuation of application No. 15/672,005, filed on Aug. 8, 2017, now Pat. No. 11,020,304.

(52) U.S. Cl.
CPC ......... *A61G 13/121* (2013.01); *A61G 13/123* (2013.01); *A61G 2200/325* (2013.01)

(58) Field of Classification Search
CPC .. A61G 13/123; A61G 13/0054; A61G 13/08; A61G 13/1245; A61G 2200/325; A61G 13/121; A61G 13/1235; A61H 1/0222
USPC ....... 5/127, 120, 129, 83.1, 89.1, 84.1, 85.1, 5/88.1, 608, 611, 617; 248/165, 166, 248/188.6
See application file for complete search history.

(56) References Cited

U.S. PATENT DOCUMENTS

| | | | |
|---|---|---|---|
| 3,227,440 | A | 1/1966 | Scott |
| 3,293,667 | A | 12/1966 | Ohrberg |
| 3,306,287 | A | 2/1967 | Arp |
| 3,389,702 | A | 6/1968 | Kennedy |
| 3,828,377 | A | 8/1974 | Fary, Sr. |
| 4,029,089 | A | 6/1977 | Mulhlland |
| 4,194,257 | A | 3/1980 | Martin et al. |
| 4,397,051 | A | 8/1983 | Wheeler |
| 4,446,587 | A | 5/1984 | Jump |
| 4,627,119 | A | 12/1986 | Hachey et al. |
| 4,655,200 | A | 4/1987 | Knight |
| 4,705,026 | A | 11/1987 | Chaussy |
| 4,866,796 | A | 9/1989 | Robinson |
| 4,872,656 | A | 10/1989 | Brendgord |
| 4,901,384 | A | 2/1990 | Eary |
| 4,915,101 | A | 4/1990 | Cuccia |
| 5,005,233 | A | 4/1991 | Toivio et al. |
| 5,009,407 | A | 4/1991 | Watanabe |
| 5,088,706 | A | 2/1992 | Jackson |
| 5,103,511 | A | 4/1992 | Sequin |
| 5,131,106 | A | 7/1992 | Jackson |
| 5,362,302 | A | 11/1994 | Jenson et al. |
| 5,390,383 | A | 2/1995 | Carn |
| 5,406,658 | A | 4/1995 | Olkkonen et al. |
| 5,410,769 | A | 5/1995 | Waterman |
| 5,444,882 | A | 8/1995 | Andrews |
| 5,544,371 | A | 8/1996 | Fuller |
| 5,570,482 | A | 11/1996 | Asakawa |
| 5,613,254 | A | 3/1997 | Clayman |
| 5,642,302 | A | 6/1997 | Dumont |
| 5,673,443 | A | 10/1997 | Marmor |
| 5,860,899 | A | 1/1999 | Rassman |
| 5,991,651 | A | 11/1999 | LaBarbera |
| 6,003,176 | A | 12/1999 | Wasley |
| 6,076,525 | A | 6/2000 | Hoffman |
| 6,112,349 | A | 9/2000 | Connolly |
| 6,154,901 | A | 12/2000 | Carr |
| 6,260,220 | B1 | 7/2001 | Lamb |
| 6,295,671 | B1 | 10/2001 | Reesby et al. |
| 6,311,349 | B1 | 11/2001 | Kazakia |
| 6,367,104 | B1 | 4/2002 | Fallbo, Sr. et al. |
| 6,378,149 | B1 | 4/2002 | Sanders et al. |
| 6,516,483 | B1 | 2/2003 | VanSteenburg |
| 6,566,833 | B2 | 5/2003 | Barlett |
| 6,615,430 | B2 | 9/2003 | Heimbrock |
| 6,671,905 | B2 | 1/2004 | Bartlett et al. |
| 6,681,423 | B2 | 1/2004 | Zachrisson |
| 6,701,553 | B1 | 3/2004 | Hand et al. |
| 6,701,554 | B2 | 3/2004 | Heimbrock |
| 6,701,558 | B2 | 3/2004 | VanSteenburg |
| 6,715,169 | B2 | 4/2004 | Niederkrom |
| 6,728,983 | B2 | 5/2004 | Bartlett et al. |
| 6,732,390 | B2 | 5/2004 | Krywiczanin |
| 6,739,006 | B2 | 5/2004 | Borders et al. |
| 6,820,621 | B2 | 11/2004 | DeMayo |
| 6,874,181 | B1 | 4/2005 | Connolly et al. |
| 6,934,986 | B2 | 8/2005 | Krywiczanin et al. |
| 6,941,951 | B2 | 9/2005 | Hubert et al. |
| 6,966,081 | B1 | 11/2005 | Sharps |
| 7,100,225 | B1 | 9/2006 | Bailey |
| 7,152,261 | B2 | 12/2006 | Jackson |
| 7,189,214 | B1 | 3/2007 | Saunders |
| 7,219,379 | B2 | 5/2007 | Krywiczanin et al. |
| 7,234,180 | B2 | 6/2007 | Horton et al. |
| 7,290,302 | B2 | 11/2007 | Sharps |
| 7,426,930 | B1 | 9/2008 | Bailey |
| 7,472,440 | B2 | 1/2009 | Bartlett et al. |
| 7,484,253 | B1 | 2/2009 | Coppens |
| 7,496,980 | B2 | 3/2009 | Sharps |
| 7,600,281 | B2 | 10/2009 | Skripps |
| 7,669,262 | B2 | 3/2010 | Skripps |
| 7,739,762 | B2 | 6/2010 | Lamb et al. |
| 7,882,583 | B2 | 2/2011 | Skripps |
| 8,118,029 | B2 | 2/2012 | Gneiting et al. |
| 8,234,730 | B2 | 8/2012 | Skripps |
| 8,286,283 | B2 | 10/2012 | Copeland et al. |
| 8,286,637 | B2 | 10/2012 | Kaska |
| 8,407,831 | B2 | 4/2013 | White et al. |
| 8,413,660 | B2 | 4/2013 | Weinstein et al. |
| 8,439,948 | B1 | 5/2013 | King |
| 8,443,473 | B2 | 5/2013 | Maxwell |
| 8,584,281 | B2 | 11/2013 | Diel et al. |
| 8,635,725 | B2 | 1/2014 | Tannoury et al. |
| 8,726,431 | B2 | 5/2014 | Sverdlik et al. |
| 9,072,646 | B2 | 7/2015 | Skripps et al. |
| 9,265,680 | B2 | 2/2016 | Sharps |
| 9,339,430 | B2 | 5/2016 | Jackson et al. |
| 9,358,170 | B2 | 6/2016 | Jackson |
| 9,414,982 | B2 | 8/2016 | Jackson |
| 9,498,397 | B2 | 11/2016 | Hight et al. |
| 9,522,078 | B2 | 12/2016 | Pizzini |
| 9,554,959 | B2 | 1/2017 | Carn |
| 9,655,793 | B2 | 5/2017 | Hertz |
| 9,700,476 | B2 | 7/2017 | Hoel et al. |
| 9,713,562 | B2 | 7/2017 | Perlman et al. |
| 9,744,089 | B2 | 8/2017 | Jackson |
| 9,937,006 | B2 | 4/2018 | Skripps et al. |
| 9,993,380 | B2 | 6/2018 | Jackson |
| 10,136,863 | B2 | 11/2018 | Kaiser et al. |
| 10,314,758 | B2 | 6/2019 | Dolliver et al. |
| 10,342,722 | B2 | 7/2019 | Garrido |
| 10,406,054 | B1 | 9/2019 | Scholl et al. |
| 10,426,684 | B2 | 10/2019 | Dubois et al. |
| 10,543,142 | B2 | 1/2020 | Lim et al. |
| 10,548,796 | B2 | 2/2020 | Lim et al. |
| 10,576,006 | B2 | 3/2020 | Lim et al. |
| 10,695,252 | B2 | 6/2020 | Jackson |
| 10,722,413 | B2 | 7/2020 | Lim et al. |
| 10,729,607 | B2 | 8/2020 | Jackson |
| 10,751,240 | B2 | 8/2020 | Lim et al. |
| 10,835,438 | B2 | 11/2020 | Jackson |
| 10,835,439 | B2 | 11/2020 | Lim et al. |
| 10,849,809 | B2 | 12/2020 | Lim et al. |
| 10,874,570 | B2 | 12/2020 | Lim et al. |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,898,401 | B2 | 1/2021 | Lim et al. |
| 10,900,448 | B2 | 1/2021 | Lim et al. |
| 10,966,892 | B2 | 4/2021 | Lim et al. |
| 11,020,304 | B2 | 6/2021 | Lim et al. |
| 11,813,217 | B2 | 11/2023 | Lim et al. |
| 11,850,191 | B2 | 12/2023 | Lim et al. |
| 2002/0138905 | A1 | 10/2002 | Barltett et al. |
| 2002/0138906 | A1 | 10/2002 | Barltett et al. |
| 2002/0157186 | A1 | 10/2002 | VanSteenburg |
| 2003/0140419 | A1 | 7/2003 | Barltett et al. |
| 2003/0140420 | A1 | 7/2003 | Niederkrom |
| 2003/0145382 | A1 | 8/2003 | Krywiczanin |
| 2003/0178027 | A1 | 9/2003 | DeMayo et al. |
| 2004/0010849 | A1 | 1/2004 | Krywiczanin et al. |
| 2004/0133983 | A1 | 7/2004 | Newkirk |
| 2005/0132495 | A1 | 6/2005 | Girard et al. |
| 2005/0181917 | A1 | 8/2005 | Dayal |

(56) References Cited

U.S. PATENT DOCUMENTS

| | | | |
|---|---|---|---|
| 2006/0037141 | A1 | 2/2006 | Krywiczanin et al. |
| 2006/0123546 | A1* | 6/2006 | Horton ............... A61G 13/0054 5/624 |
| 2006/0162076 | A1 | 7/2006 | Bartlett et al. |
| 2006/0162084 | A1 | 7/2006 | Mezue |
| 2007/0113336 | A1 | 5/2007 | Sharps |
| 2008/0034502 | A1 | 2/2008 | Copeland et al. |
| 2008/0134434 | A1 | 6/2008 | Celauro |
| 2008/0222811 | A1 | 9/2008 | Gilbert et al. |
| 2009/0139030 | A1 | 6/2009 | Yang |
| 2010/0037397 | A1 | 2/2010 | Wood |
| 2010/0051303 | A1 | 3/2010 | Ullrich et al. |
| 2010/0192300 | A1 | 8/2010 | Tannoury |
| 2010/0293719 | A1 | 11/2010 | Klemm et al. |
| 2011/0099716 | A1 | 5/2011 | Jackson |
| 2012/0103344 | A1 | 5/2012 | Hunter |
| 2012/0144589 | A1 | 6/2012 | Skripps et al. |
| 2012/0255122 | A1 | 10/2012 | Diel et al. |
| 2013/0111666 | A1 | 5/2013 | Jackson |
| 2013/0133137 | A1 | 5/2013 | Jackson |
| 2013/0191994 | A1 | 8/2013 | Bellows et al. |
| 2013/0283526 | A1 | 10/2013 | Gagliardi |
| 2013/0307298 | A1 | 11/2013 | Meiki |
| 2014/0020183 | A1 | 1/2014 | Dominick |
| 2014/0059773 | A1 | 3/2014 | Carn |
| 2014/0068861 | A1* | 3/2014 | Jackson ................. A61G 13/08 5/624 |
| 2014/0109316 | A1 | 4/2014 | Jackson et al. |
| 2014/0137327 | A1 | 5/2014 | Tannoury et al. |
| 2014/0250598 | A1 | 9/2014 | Sharps et al. |
| 2015/0044956 | A1 | 2/2015 | Hacker |
| 2015/0245971 | A1 | 9/2015 | Bernardoni et al. |
| 2015/0272681 | A1 | 10/2015 | Skripps et al. |
| 2015/0283006 | A1 | 10/2015 | Akins |
| 2016/0000621 | A1 | 1/2016 | Jackson |
| 2016/0000627 | A1 | 1/2016 | Jackson et al. |
| 2016/0081582 | A1 | 3/2016 | Rapoport |
| 2016/0089287 | A1 | 3/2016 | Buerstner |
| 2016/0193099 | A1 | 7/2016 | Drake |
| 2017/0027797 | A1 | 2/2017 | Dolliver et al. |
| 2017/0049651 | A1 | 2/2017 | Lim |
| 2017/0049653 | A1 | 2/2017 | Lim |
| 2017/0079864 | A1 | 3/2017 | Riley |
| 2017/0112698 | A1 | 4/2017 | Hight et al. |
| 2017/0135891 | A1 | 5/2017 | Kettner |
| 2017/0151115 | A1 | 6/2017 | Jackson |
| 2017/0341232 | A1 | 11/2017 | Perplies |
| 2017/0348171 | A1 | 12/2017 | Jackson |
| 2018/0116891 | A1 | 5/2018 | Beale et al. |
| 2018/0185228 | A1 | 7/2018 | Catacchio et al. |
| 2018/0193104 | A1 | 7/2018 | Beale et al. |
| 2018/0363596 | A1 | 12/2018 | Lim et al. |
| 2019/0000702 | A1 | 1/2019 | Lim et al. |
| 2019/0000707 | A1 | 1/2019 | Lim et al. |
| 2019/0029906 | A1 | 1/2019 | Konsin et al. |
| 2019/0046381 | A1 | 2/2019 | Lim et al. |
| 2019/0046383 | A1 | 2/2019 | Lim et al. |
| 2019/0209409 | A1 | 7/2019 | Jackson et al. |
| 2020/0000668 | A1 | 1/2020 | Lim et al. |
| 2020/0060913 | A1 | 2/2020 | Lim et al. |
| 2020/0060914 | A1 | 2/2020 | Lim et al. |
| 2020/0060915 | A1 | 2/2020 | Lim et al. |
| 2020/0138659 | A1 | 5/2020 | Lim et al. |
| 2020/0138660 | A1 | 5/2020 | Jackson |
| 2020/0170868 | A1 | 6/2020 | Jackson |
| 2020/0188208 | A1 | 6/2020 | Lim et al. |
| 2020/0281788 | A1 | 9/2020 | Lim et al. |
| 2020/0297568 | A1 | 9/2020 | Lim et al. |
| 2020/0337923 | A1 | 10/2020 | Lim et al. |
| 2020/0337926 | A1 | 10/2020 | Lim et al. |
| 2020/0337927 | A1 | 10/2020 | Lim et al. |
| 2020/0360214 | A1 | 11/2020 | Lim et al. |
| 2021/0069047 | A1 | 3/2021 | Lim et al. |
| 2021/0085550 | A1 | 3/2021 | Lim et al. |
| 2021/0330532 | A1 | 10/2021 | Lim et al. |
| 2021/0330536 | A1 | 10/2021 | Lim et al. |
| 2021/0330537 | A1 | 10/2021 | Lim et al. |
| 2022/0241128 | A1 | 8/2022 | Newkirk et al. |

FOREIGN PATENT DOCUMENTS

| | | |
|---|---|---|
| CN | 103298440 A | 9/2013 |
| EP | 3158986 | 4/2017 |
| EP | 3434248 | 1/2019 |
| JP | 2012-228509 | 11/2012 |
| JP | 5237301 | 7/2013 |
| JP | 2017099859 | 6/2017 |
| JP | 2017113528 | 6/2017 |
| JP | 2018069048 | 5/2018 |
| WO | WO9321853 | 11/1993 |
| WO | 9835643 | 8/1998 |
| WO | 2000062731 | 10/2000 |
| WO | 2007058673 | 5/2007 |
| WO | 2017031225 | 2/2017 |
| WO | 2017139548 | 8/2017 |
| WO | 2017218683 | 12/2017 |
| WO | 2019032491 | 2/2019 |
| WO | 2021158769 | 8/2021 |

OTHER PUBLICATIONS

Office Action and Search Report issued Aug. 27, 2019 for corresponding Chinese application No. 201680046857.4.

Second Office Action dated Mar. 24, 2020 from Chinese Application No. 201680046857.4.

Office Action issued Dec. 17, 2019 for corresponding Japanese Application No. 2018-504646 with English translation.

International Search Report dated Nov. 21, 2016 from International Application No. PCT/US2016/047394.

Extended Search Report issued Mar. 20, 2019 for corresponding EP Application No. 16837764.6.

Written Opinion of International Searching Authority issued Nov. 21, 2016 for International Application No. PCT/US2016/047394.

International Preliminary Report on Patentability issued Feb. 20, 2018 for PCT/US2016/047394.

Office Action issued Jun. 2, 2020 for corresponding Japanese application No. 2018-566265 with English translation.

International Search Report and Written Opinion dated Dec. 4, 2018 in PCT/US2018/045480.

International Preliminary Report on Patentability and Written Opinion dated Feb. 11, 2020 in PCT/US2018/045480.

Extended European Search Report dated Apr. 7, 2021 from European Application No. 18843859.2.

Communication per Article 94(3) EPC dated Oct. 24, 2023 from European Application No. 18843859.2.

Office Action and Search Report issued Aug. 3, 2021 for Chinese application No. 201880050325.7.

Office Action issued Jul. 22, 2022 for Japanese Application No. 2020-506226.

Examination Report used Jun. 8, 2023 for Australian Application No. 2018313009.

International Search Report and Written Opinion dated Dec. 4, 2019 from International Application No. PCT/US2019/046979.

* cited by examiner

SURGICAL FRAME INCLUDING MAIN BEAM FOR FACILITATING PATIENT ACCESS

The present application is a continuation of U.S. application Ser. No. 17/334,089, filed May 28, 2021; which is a continuation of U.S. application Ser. No. 15/672,005, filed Aug. 8, 2017; all of which are incorporated by reference herein.

BACKGROUND OF THE INVENTION

Field of the Invention

The present invention relates to a conforming main beam for use with a surgical frame. More particularly, the present invention relates to a conforming main beam for use with a surgical frame configured to allow a surgeon access to one lateral side of the patient and a surgical assistant access to the other lateral side of the patient with limited interference thereby. More specifically, the present invention relates to a conforming main beam for use with a surgical frame that is arranged, sized, and shaped to avoid blocking access to the patient from either of the lateral sides of the patient when the patient is positioned at least in the prone position.

Description of the Prior Art

Access to a patient is of paramount concern during surgery. Surgical frames have been used to position and reposition patients during surgery. For example, surgical frames have been configured to manipulate the rotational position of the patient before, during, and even after surgery. Such surgical frames include support structures to facilitate the rotational movement of the patient. Typical support structures can include main beams supported at either ends thereof for rotational movement about axes of rotation extending along the lengths of the surgical frames. The main beams can be positioned and repositioned to afford various positions of the patients positioned thereon. To illustrate, the main beams can be rotated for positioning a patient in prone positions, lateral positions, and positions 45° between the prone and lateral positions. To facilitate such positioning and repositioning, the main beams have been structured for supporting the patient during such movement. However, when a patient is positioned in a prone position using such a main beam, the main beam can afford access to one lateral side of the patient and impede access to the other lateral side of the patient. Therefore, there is a need for a main beam that simultaneously supports a patient in the above-discussed positions, and affords access to either of the lateral sides of the patient when the patient is positioned in at least the prone position.

SUMMARY OF THE INVENTION

The present invention in one preferred embodiment contemplates a surgical positioning frame for supporting a patient, the surgical positioning frame including a main beam having an axis of rotation relative to at least a first support structure and a second support structure, the main beam being rotatable about the axis of rotation between at least a first position supporting the patient in a prone position and a second position supporting the patient in a lateral position, the axis of rotation being substantially aligned with a cranial-caudal axis of the patient when the patient is supported on the surgical positioning frame, the main beam having a first support arm at the first end and a second support arm at the second end, the first and second support arms being pivotally attached relative to the first and second support structures, respectively, the main beam including a conforming main beam portion having a first end and a second end, and the main beam extending between the first and second support arms, the conforming main beam portion including a first portion extending toward the second end from the first support arm in a direction substantially aligned with the axis of rotation, a second portion extending toward the second end from the first portion in a direction transverse to the axis of rotation, a third portion extending toward the second end from the second portion in a direction substantially aligned with the axis of rotation, at least one of a fourth portion and a fifth portion extending to the second support arm from the third portion; the first portion, when the patient is supported by the surgical positioning frame in the prone position, extending underneath the head and between the arms of the patient, the second portion, when the patient is supported by the surgical positioning frame in the prone position, extending upwardly toward the right side of the torso of the patient underneath the patient, the third portion, when the patient is supported by the surgical positioning frame in the prone position, extending from underneath to along the right side of the torso of the patient; and the first and second support structures supporting the main beam, and the first and second support structures spacing the main beam from the ground.

The present invention in another preferred embodiment contemplates a surgical positioning frame for supporting a patient, the surgical positioning frame including a main beam for supporting the patient for rotatable movement about an axis of rotation relative to a support structure, the main beam being rotatable about the axis of rotation between at least a first position supporting the patient in a prone position and a second position supporting the patient in a lateral position, the main beam having a first support arm at the first end and a second support arm at the second end, the first and second support arms being pivotally attached relative to the support structure, the main beam including a conforming main beam portion having a first end and a second end, and the main beam extending between the first and second support arms, the conforming main beam portion including a first portion extending toward the second end from the first support arm, a second portion extending toward the second end from the first portion, a third portion extending toward the second end from the second portion, at least one of a fourth portion and a fifth portion extending to the second support arm from the third portion; the first portion, when the patient is supported by the surgical positioning frame in the prone position, extending underneath the head and between the arms of the patient, the second portion, when the patient is supported by the surgical positioning frame in the prone position, extending upwardly toward the right side of the torso of the patient underneath the patient, the third portion, when the patient is supported by the surgical positioning frame in the prone position, extending from underneath to along the right side of the torso of the patient; and the support structure supporting the main beam, and spacing the main beam from the ground.

The present invention in yet another preferred embodiment contemplates a surgical positioning frame for supporting a patient, the surgical positioning frame including a main beam for supporting the patient for rotatable movement about an axis of rotation relative to a support structure, the main beam being rotatable about the axis of rotation between at least a first position supporting the patient in a prone position and a second position supporting the patient in a lateral position, the main beam having at least a first support arm, the first support arm being pivotally attached relative to the support structure, the main beam including a conforming main beam portion having a first end and a second end, and the main beam extending from the first support arm, the conforming main beam portion including a first portion extending toward the second end from the first support arm, a second portion extending toward the second end from the first portion, a third portion extending toward the second end from the second portion, at least one of a fourth portion and a fifth portion extending toward the second end; the first portion, when the patient is supported by the surgical positioning frame in the prone position, extending underneath the head and between the arms of the patient, the second portion, when the patient is supported by the surgical positioning frame in the prone position, extending upwardly toward the right side of the torso of the patient underneath the patient, the third portion, when the patient is supported by the surgical positioning frame in the prone position, extending from underneath to along the right side of the torso of the patient; and the support structure supporting the main beam, and spacing the main beam from the ground.

The present invention in one preferred embodiment contemplates a method of reconfiguring a surgical frame before, during, or after surgery, the method including spacing a main beam of the surgical frame and a patient positioned on the main beam from the ground with a first support portion and a second support portion; rotating the main beam and the patient positioned thereon from a prone position to one of a first lateral position and a second lateral position; and moving a translating beam under the main beam and the patient positioned thereon, the translating beam being moveable between a first position at or adjacent a first lateral side of the surgical frame and a second position at or adjacent a second lateral side of the surgical frame, and the translating beam joining portions of the surgical frame together between the first and second support portions.

The present invention in another preferred embodiment contemplates a method of reconfiguring a surgical frame before, during, or after surgery, the method including spacing a main beam of the surgical frame from the ground with a first support portion and a second support portion; supporting a patient on the main beam of the surgical frame; rotating the main beam and the patient positioned thereon from a prone position to one of a first lateral position and a second lateral position; and moving a translating beam under the main beam and the patient positioned thereon, the translating beam being moveable between a first position at or adjacent a first lateral side of the surgical frame and a second position at or adjacent a second lateral side of the surgical frame, and the translating beam joining portions of the surgical frame together between the first and second support portions.

The present invention in yet another preferred embodiment contemplates a method of reconfiguring a surgical frame before, during, or after surgery, the method including providing the surgical frame including a support platform, a first support portion, a second support portion, and a main beam spaced from the ground by the support platform, the first support portion, and the second support portion, the support platform including a translating beam moveable between a first position at or adjacent a first lateral side of the surgical frame and a second position at or adjacent a second lateral side of the surgical frame, the main beam being configured to receive a patient thereon, the main beam and the patient received thereon being rotatable relative to the support platform, the first support portion, and the second support portion; supporting the patient on the main beam of the surgical frame; rotating the patient to a prone position, and moving the translating beam to a position underneath the patient supported in the prone position; and rotating the patient to one of a first lateral position and a second lateral position, and moving the translating beam to a position underneath the patient supported in the one of the first lateral position and the second lateral position.

These and other objects of the present invention will be apparent from review of the following specification and the accompanying drawings.

DETAILED DESCRIPTION OF THE PREFERRED EMBODIMENT

Figure 1:
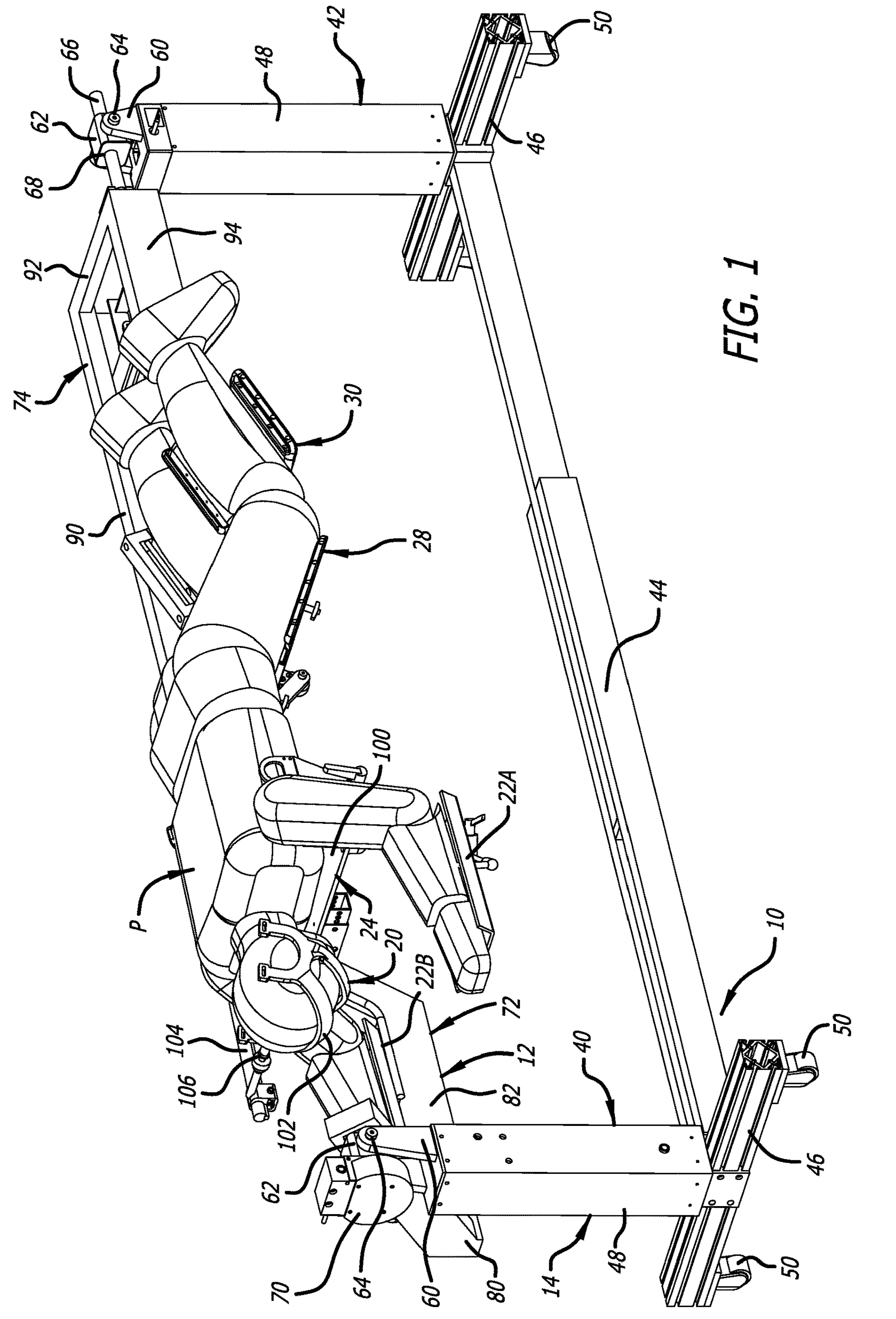
FIG. 1 is a top perspective view of a prior art surgical frame with a patient positioned thereon in a prone position.
Figure 2:
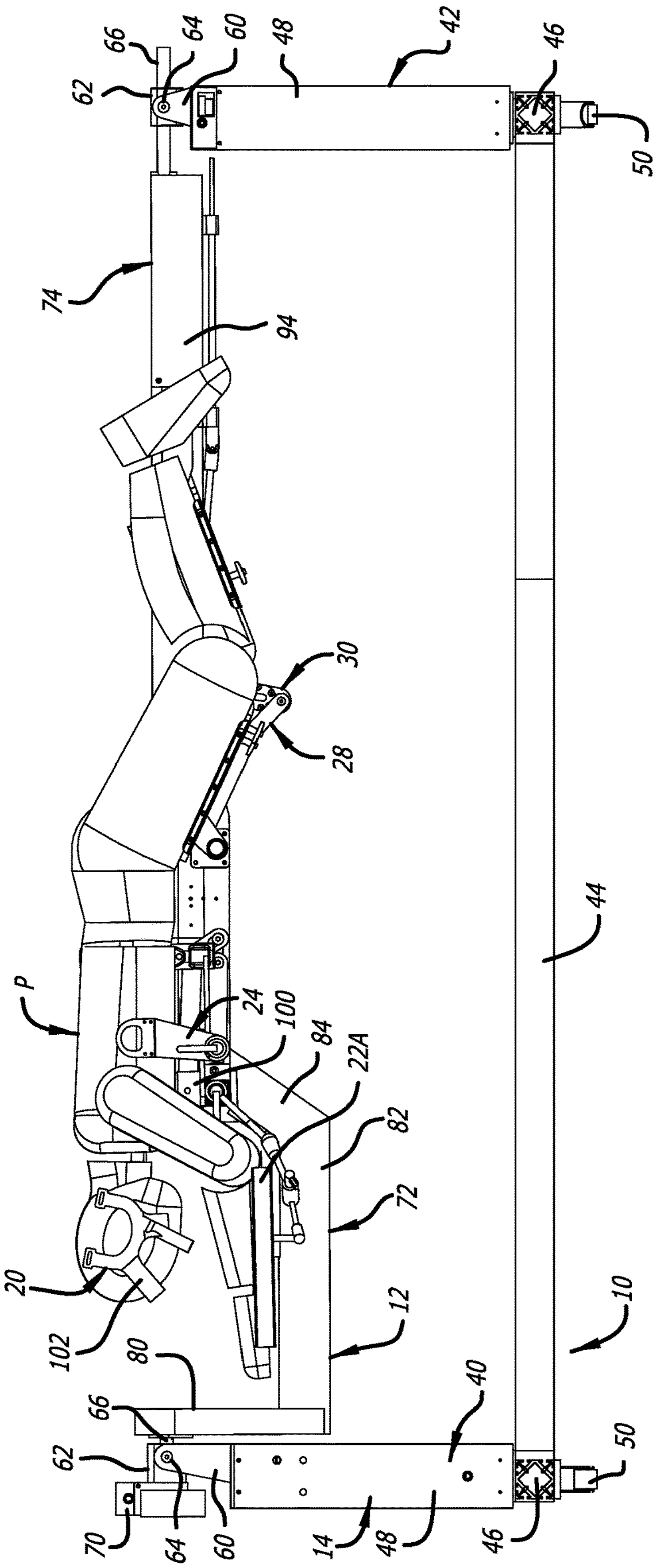
FIG. 2 is a side elevational view of the surgical frame of FIG. 1 with the patient positioned thereon in a prone position.
Figure 3:
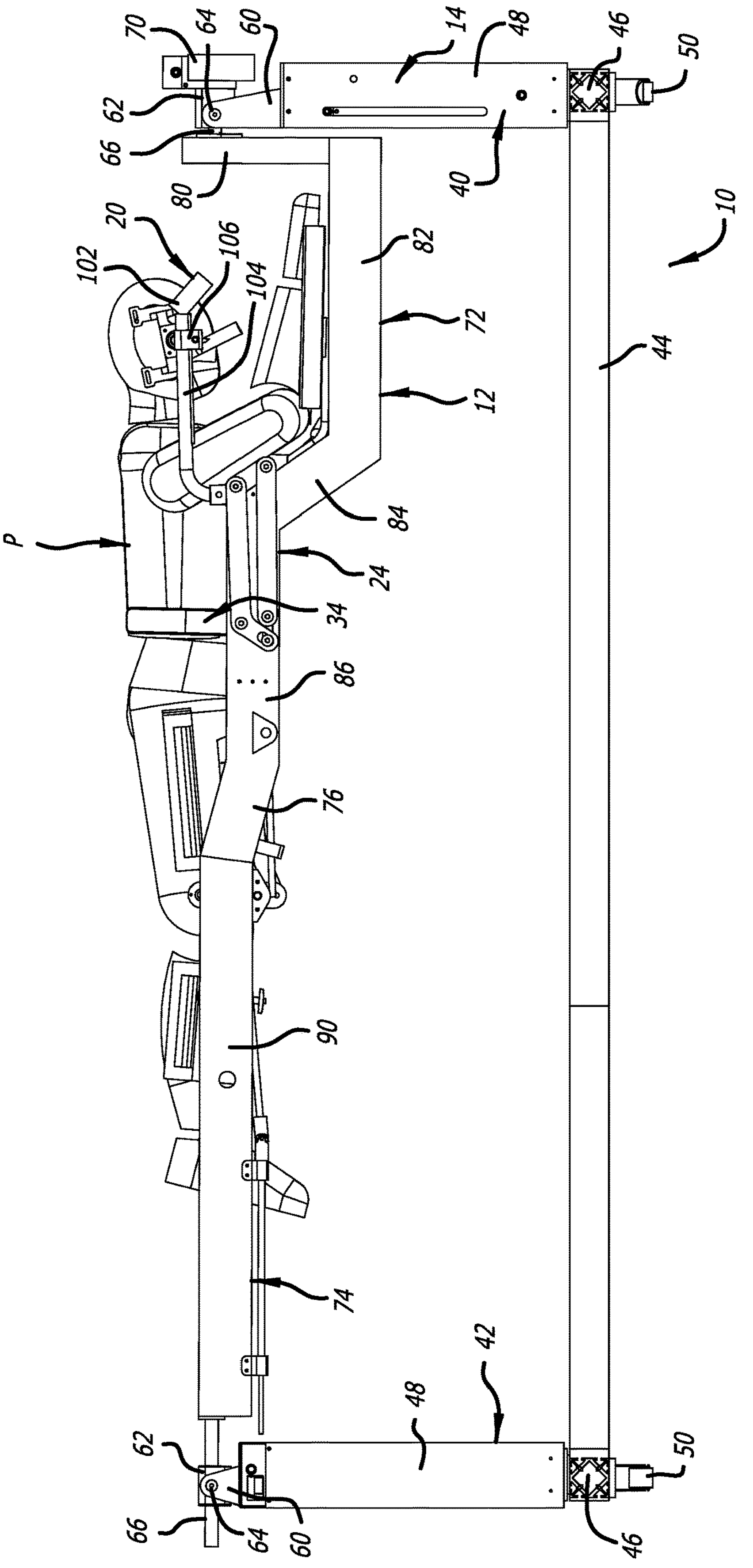
FIG. 3 is another side elevational view of the surgical frame of FIG. 1 with the patient positioned thereon in a prone position.

FIGS. 1-26 depict a prior art embodiment of a surgical support frame generally indicated by the numeral 10. FIGS. 1-26 were previously described in U.S. Ser. No. 15/239,256, which is hereby incorporated by reference herein in its entirety. As discussed below, the surgical frame 10 serves as an exoskeleton to support the body of the patient P as the patient's body is manipulated thereby, and, in doing so, serves to support the patient P such that the patient's spine does not experience unnecessary torsion.

The surgical frame 10 is configured to provide a relatively minimal amount of structure adjacent the patient's spine to facilitate access thereto and to improve the quality of imaging available before and during surgery. Thus, the surgeon's workspace and imaging access are thereby increased. Furthermore, radio-lucent or low magnetic susceptibility materials can be used in constructing the structural components adjacent the patient's spine in order to further enhance imaging quality.

The surgical frame 10 has a longitudinal axis and a length therealong. As depicted in FIGS. 1-5, for example, the surgical frame 10 includes an offset structural main beam 12 and a support structure 14. The offset main beam 12 is spaced from the ground by the support structure 14. As discussed below, the offset main beam 12 is used in supporting the patient P on the surgical frame 10 and various support components of the surgical frame 10 that directly contact the patient P (such as a head support 20, arm supports 22A and 22B, torso-lift supports 24 and 160, a sagittal adjustment assembly 28 including a pelvic-tilt mechanism 30 and a leg adjustment mechanism 32, and a coronal adjustment assembly 34). As discussed below, an operator such as a surgeon can control actuation of the various support components to manipulate the position of the patient's body. Soft straps (not shown) are used with these various support components to secure the patient P to the frame and to enable either manipulation or fixation of the patient P. Reusable soft pads can be used on the load-bearing areas of the various support components.

Figure 4:
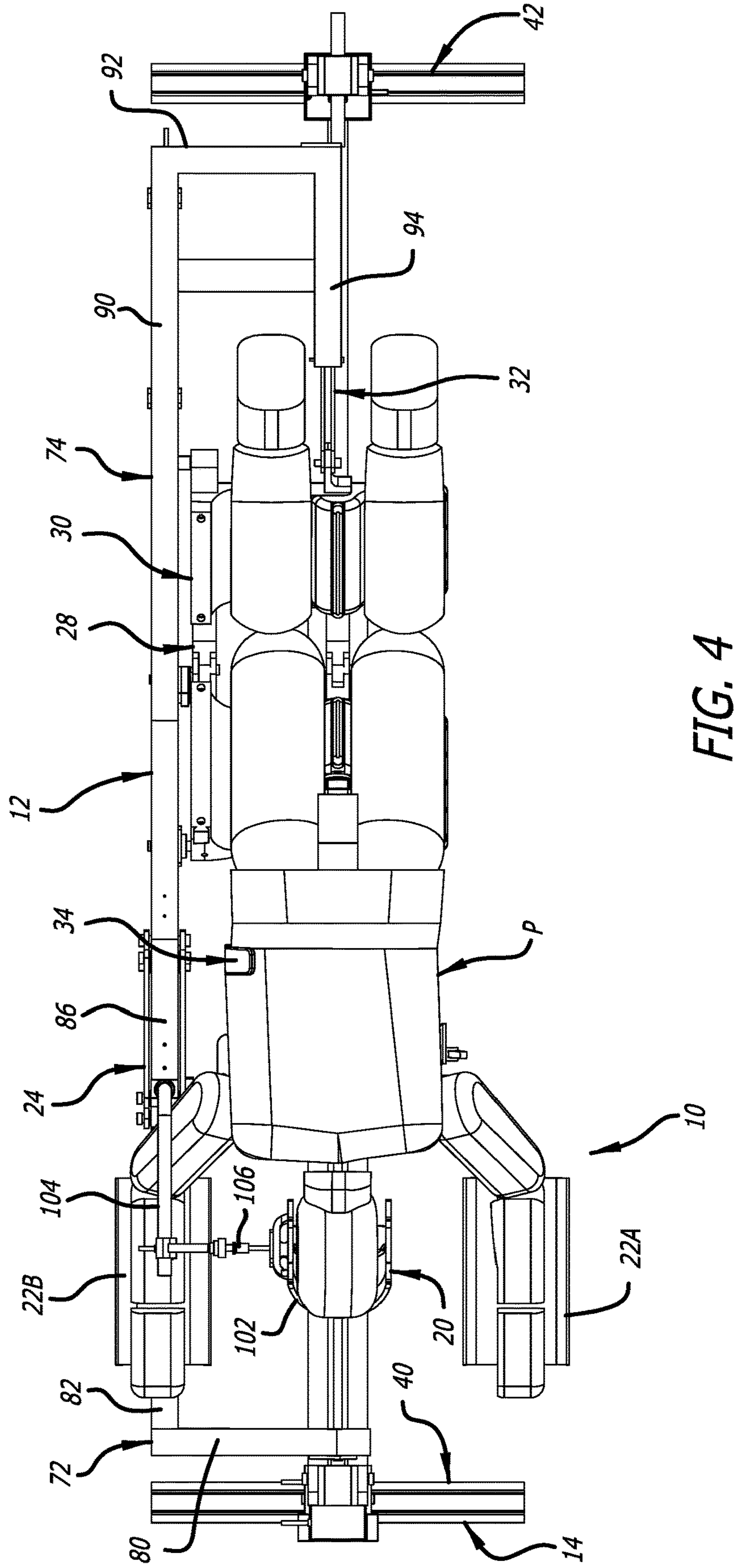
FIG. 4 is a top plan view of the surgical frame of FIG. 1 with the patient positioned thereon in a prone position.
Figure 5:
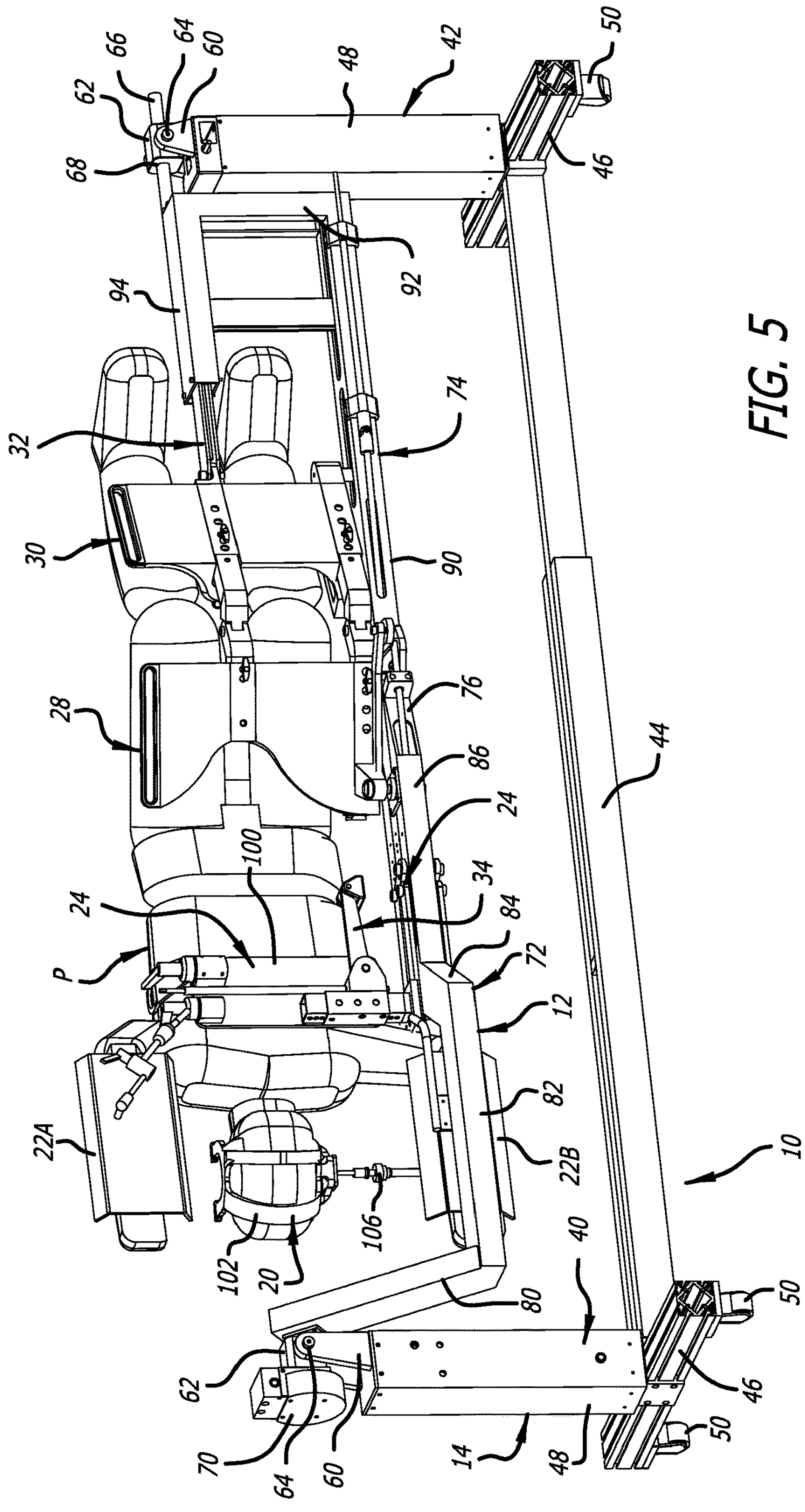
FIG. 5 is a top perspective view of the surgical frame of FIG. 1 with the patient positioned thereon in a lateral position.

The offset main beam 12 is used to facilitate rotation of the patient P. The offset main beam 12 can be rotated a full 360° before and during surgery to facilitate various positions of the patient P to afford various surgical pathways to the patient's spine depending on the surgery to be performed. For example, the offset main beam 12 can be positioned to place the patient P in a prone position (e.g., FIGS. 1-4), a lateral position (e.g., FIG. 5), and in a position 45° between the prone and lateral positions. Furthermore, the offset main beam 12 can be rotated to afford anterior, posterior, lateral, anterolateral, and posterolateral pathways to the spine. As such, the patient's body can be flipped numerous times before and during surgery without compromising sterility or safety. The various support components of the surgical frame 10 are strategically placed to further manipulate the patient's body into position before and during surgery. Such intraoperative manipulation and positioning of the patient P affords a surgeon significant access to the patient's body. To illustrate, when the offset main beam 12 is rotated to position the patient P in a lateral position, as depicted in FIG. 5, the head support 20, the arm supports 22A and 22B, the torso-lift support 24, the sagittal adjustment assembly 28, and/or the coronal adjustment assembly 34 can be articulated such that the surgical frame 10 is OLIF-capable or DLIF-capable.

As depicted in FIG. 1, for example, the support structure 14 includes a first support portion 40 and a second support portion 42 interconnected by a cross member 44. Each of the first and second support portions 40 and 42 include a horizontal portion 46 and a vertical support post 48. The horizontal portions 46 are connected to the cross member 44, and casters 50 can be attached to the horizontal portions 46 to facilitate movement of the surgical frame 10.

The vertical support posts 48 can be adjustable to facilitate expansion and contraction of the heights thereof. Expansion and contraction of the vertical support posts 48 facilitates raising and lowering, respectively, of the offset main beam 12. As such, the vertical support posts 48 can be adjusted to have equal or different heights. For example, the vertical support posts 48 can be adjusted such that the vertical support post 48 of the second support portion 42 is raised 12 inches higher than the vertical support post 48 of the first support portion 40 to place the patient P in a reverse Trendelenburg position.

Furthermore, cross member 44 can be adjustable to facilitate expansion and contraction of the length thereof. Expansion and contraction of the cross member 44 facilitates lengthening and shortening, respectively, of the distance between the first and second support portions 40 and 42.

The vertical support post 48 of the first and second support portions 40 and 42 have heights at least affording rotation of the offset main beam 12 and the patient P positioned thereon. Each of the vertical support posts 48 include a clevis 60, a support block 62 positioned in the clevis 60, and a pin 64 pinning the clevis 60 to the support block 62. The support blocks 62 are capable of pivotal movement relative to the clevises 60 to accommodate different heights of the vertical support posts 48. Furthermore, axles 66 extending outwardly from the offset main beam 12 are received in apertures 68 formed the support blocks 62. The axles 66 define an axis of rotation of the offset main beam 12, and the interaction of the axles 66 with the support blocks 62 facilitate rotation of the offset main beam 12.

Furthermore, a servomotor 70 can be interconnected with the axle 66 received in the support block 62 of the first support portion 40. The servomotor 70 can be computer controlled and/or operated by the operator of the surgical frame 10 to facilitate controlled rotation of the offset main beam 12. Thus, by controlling actuation of the servomotor 70, the offset main beam 12 and the patient P supported thereon can be rotated to afford the various surgical pathways to the patient's spine.

As depicted in FIGS. 1-5, for example, the offset main beam 12 includes a forward portion 72 and a rear portion 74. The forward portion 72 supports the head support 20, the arm supports 22A and 22B, the torso-lift support 24, and the coronal adjustment assembly 34, and the rear portion 74 supports the sagittal adjustment assembly 28. The forward and rear portions 72 and 74 are connected to one another by connection member 76 shared therebetween. The forward portion 72 includes a first portion 80, a second portion 82, a third portion 84, and a fourth portion 86. The first portion 80 extends transversely to the axis of rotation of the offset main beam 12, and the second and fourth portions 82 and 86 are aligned with the axis of rotation of the offset main beam 12. The rear portion 74 includes a first portion 90, a second portion 92, and a third portion 94. The first and third portions 90 and 94 are aligned with the axis of rotation of the offset main beam 12, and the second portion 92 extends transversely to the axis of rotation of the offset main beam 12.

The axles 66 are attached to the first portion 80 of the forward portion 72 and to the third portion 94 of the rear portion 74. The lengths of the first portion 80 of the forward portion 72 and the second portion 92 of the rear portion 74 serve in offsetting portions of the forward and rear portions 72 and 74 from the axis of rotation of the offset main beam 12. This offset affords positioning of the cranial-caudal axis of patient P approximately aligned with the axis of rotation of the offset main beam 12.

Programmable settings controlled by a computer controller (not shown) can be used to maintain an ideal patient height for a working position of the surgical frame 10 at a near-constant position through rotation cycles, for example, between the patient positions depicted in FIGS. 1 and 5. This allows for a variable axis of rotation between the first portion 40 and the second portion 42.

Figure 6:
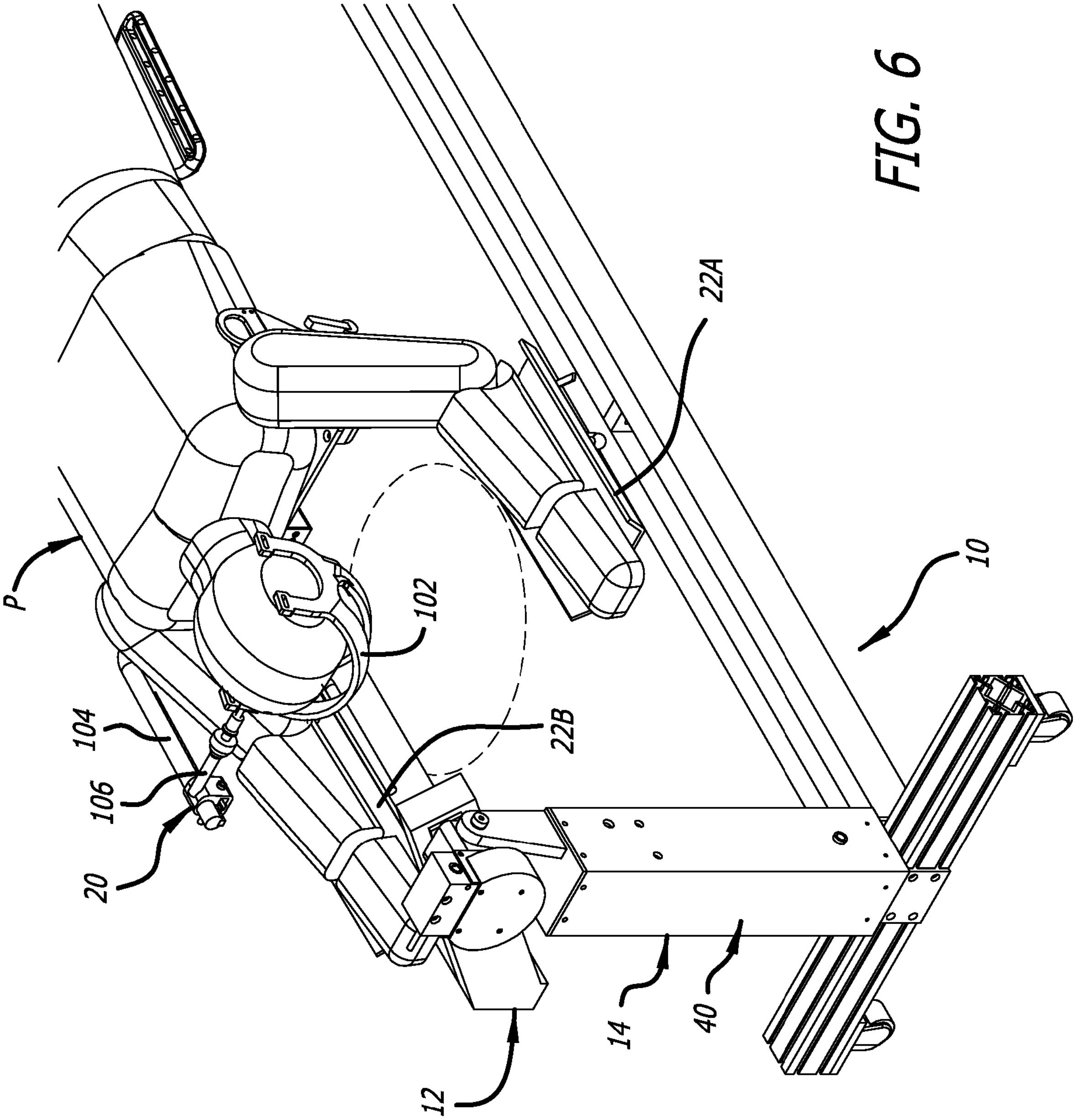
FIG. 6 is a top perspective view of portions of the surgical frame of FIG. 1 showing an area of access to the head of the patient positioned thereon in a prone position.

As depicted in FIG. 5, for example, the head support 20 is attached to a chest support plate 100 of the torso-lift support 24 to support the head of the patient P. If the torso-lift support 24 is not used, the head support 20 can be directly attached to the forward portion 72 of the offset main beam 12. As depicted in FIGS. 4 and 6, for example, the head support 20 further includes a facial support cradle 102, an axially adjustable head support beam 104, and a temple support portion 106. Soft straps (not shown) can be used to secure the patient P to the head support 20. The facial support cradle 102 includes padding across the forehead and cheeks, and provides open access to the mouth of the patient P. The head support 20 also allows for imaging access to the cervical spine. Adjustment of the head support 20 is possible via adjusting the angle and the length of the head support beam 104 and the temple support portion 106.

As depicted in FIG. 5, for example, the arm supports 22A and 22B contact the forearms and support the remainder of the arms of the patient P, with the first arm support 22A and the second arm support 22B attached to the chest support plate 100 of the torso-lift support 24. If the torso-lift support 24 is not used, the arm supports 22A and 22B can both be directly attached to the offset main beam 12. The arm supports 22A and 22B are positioned such that the arms of the patient P are spaced away from the remainder of the patient's body to provide access (FIG. 6) to at least portions of the face and neck of the patient P, thereby providing greater access to the patient.

Figure 7:
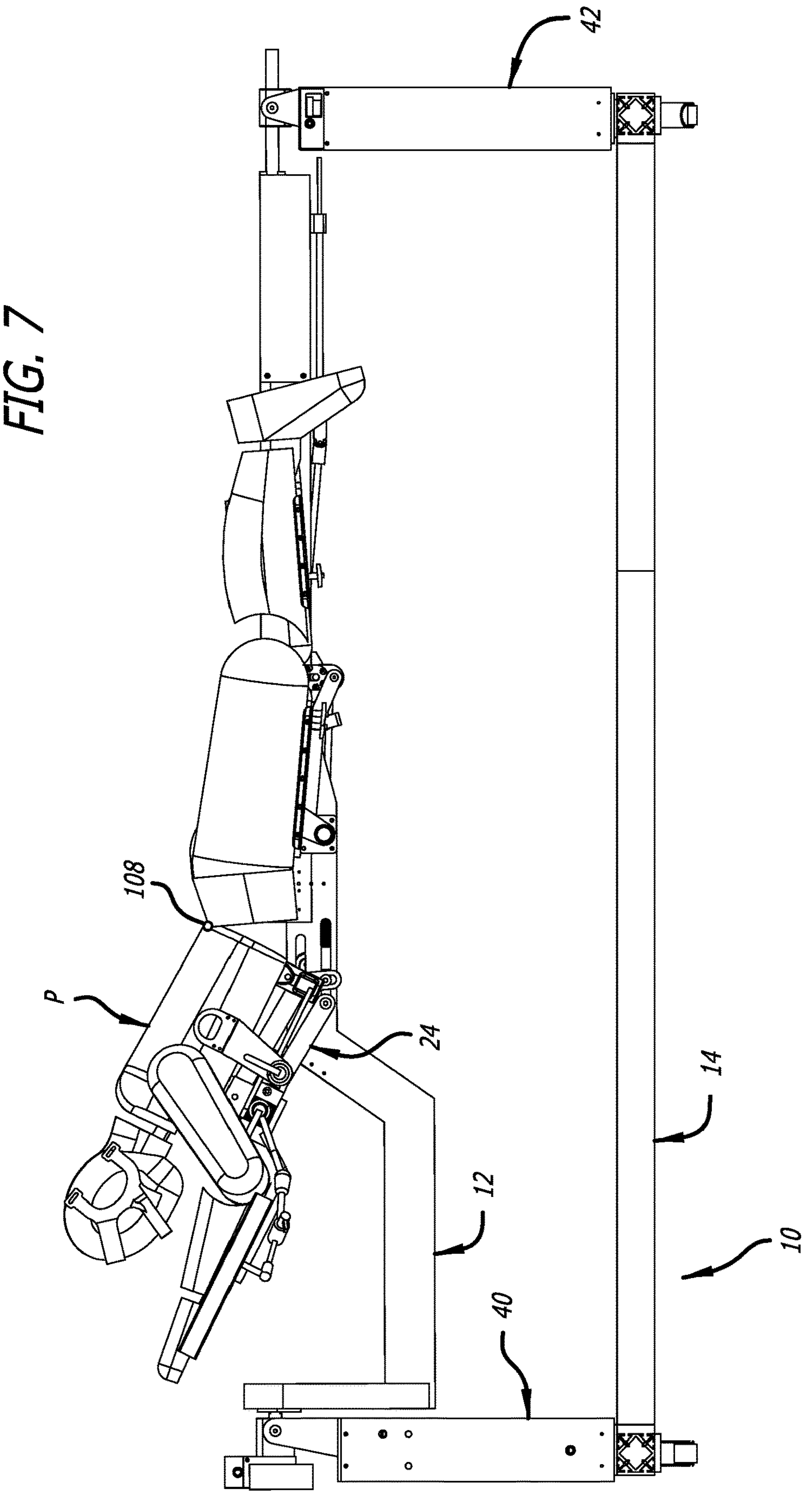
FIG. 7 is a side elevational view of the surgical frame of FIG. 1 showing a torso-lift support supporting the patient in a lifted position.
Figure 8:
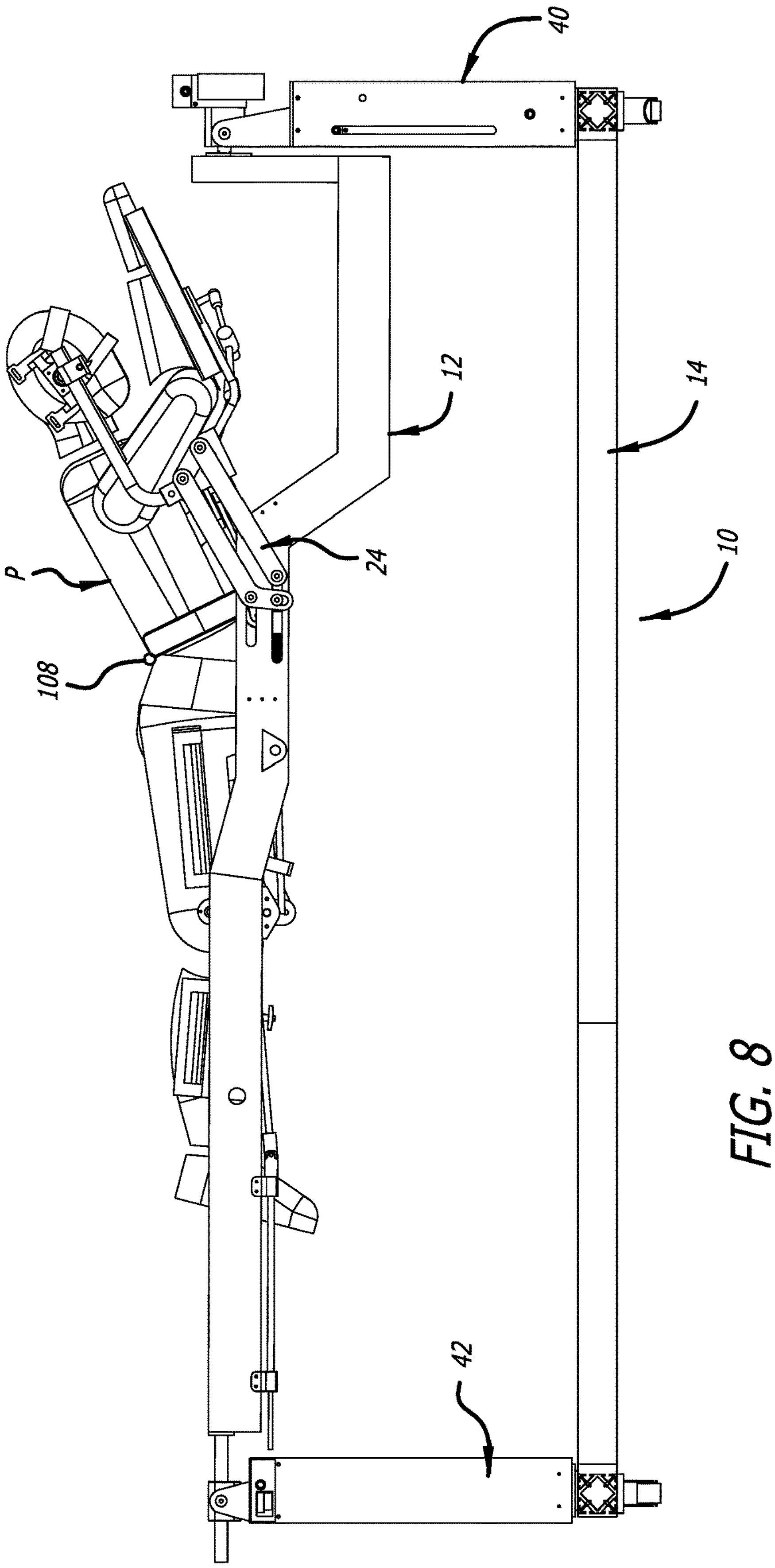
FIG. 8 is another side elevational view of the surgical frame of FIG. 1 showing the torso-lift support supporting the patient in the lifted position.
Figure 9:
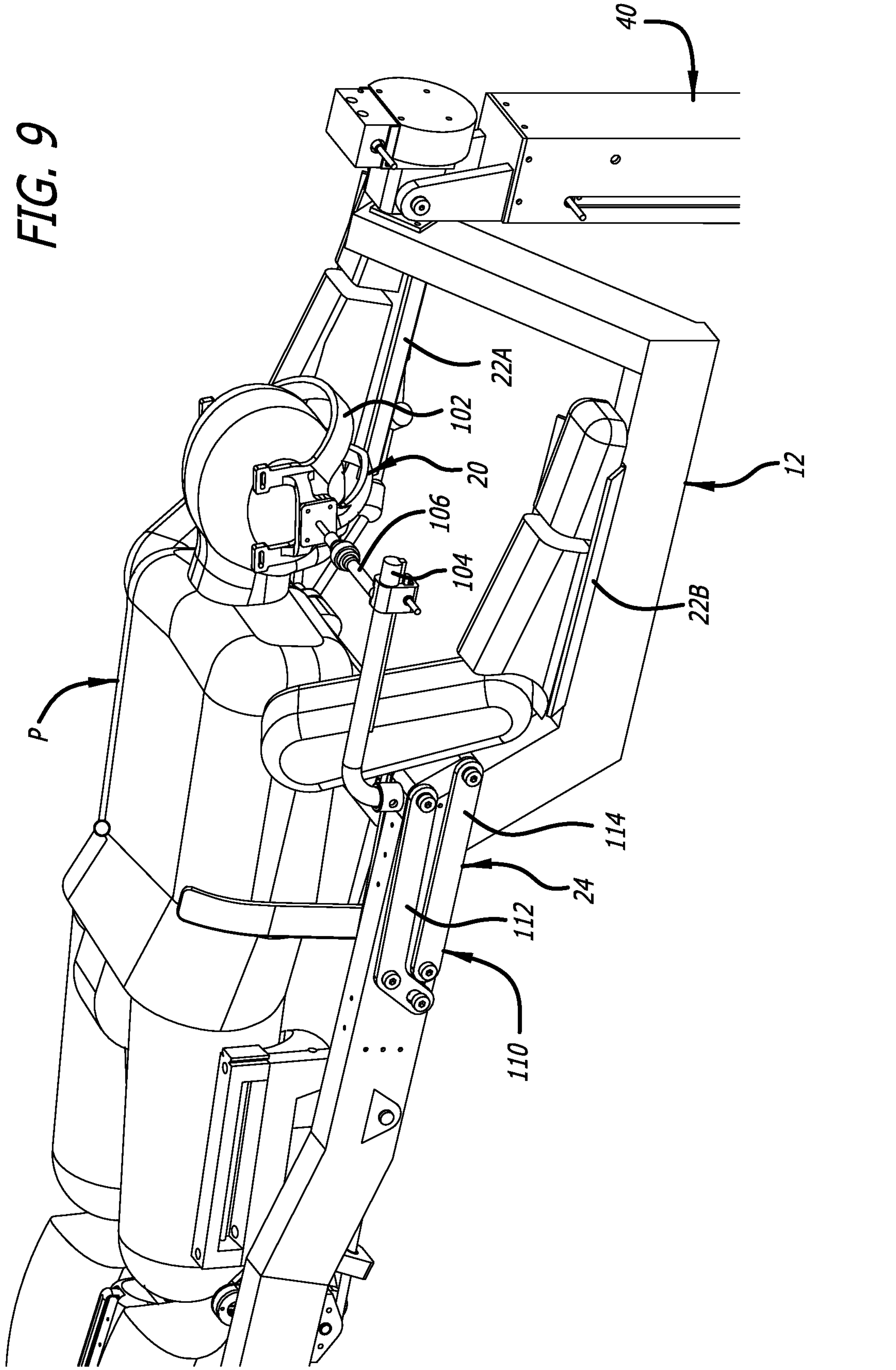
FIG. 9 is an enlarged top perspective view of portions of the surgical frame of FIG. 1 showing the torso-lift support supporting the patient in an unlifted position.

As depicted in FIGS. 7-12, for example, the surgical frame 10 includes a torso-lift capability for lifting and lowering the torso of the patient P between an uplifted position and a lifted position, which is described in detail below with respect to the torso-lift support 24. As depicted in FIGS. 7 and 8, for example, the torso-lift capability has an approximate center of rotation ("COR") 108 that is located at a position anterior to the patient's spine about the L2 of the lumbar spine, and is capable of elevating the upper body of the patient at least an additional six inches when measured at the chest support plate 100.

As depicted in FIGS. 9-12, for example, the torso-lift support 24 includes a "crawling" four-bar mechanism 110 attached to the chest support plate 100. Soft straps (not shown) can be used to secure the patient P to the chest support plate 100. The head support 20 and the arm supports 22A and 22B are attached to the chest support plate 100, thereby moving with the chest support plate 100 as the chest support plate 100 is articulated using the torso-lift support 24. The fixed COR 108 is defined at the position depicted in FIGS. 7 and 8. Appropriate placement of the COR 108 is important so that spinal cord integrity is not compromised (i.e., overly compressed or stretched) during the lift maneuver performed by the torso-lift support 24.

Figure 10:
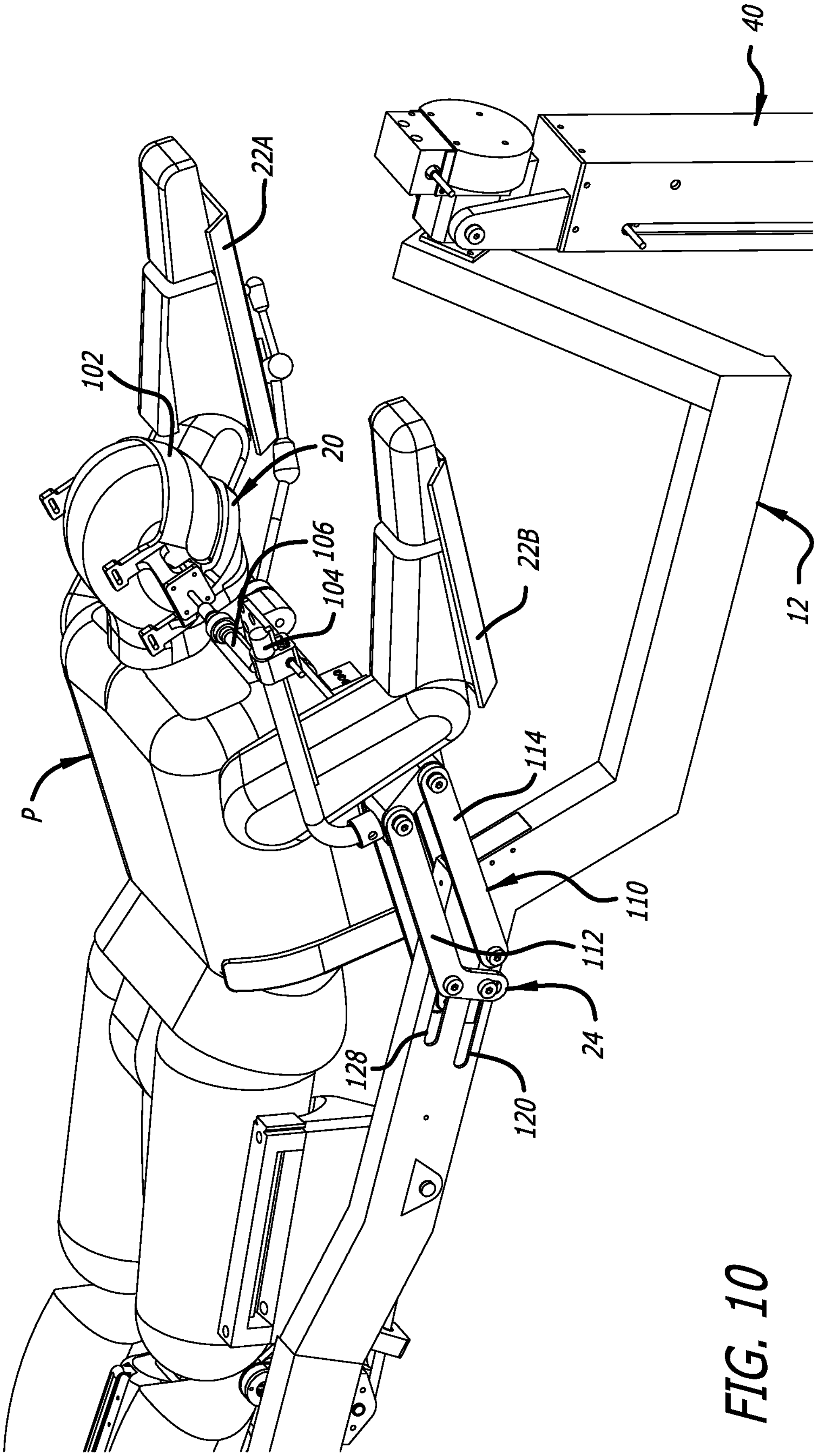
FIG. 10 is an enlarged top perspective view of portions of the surgical frame of FIG. 1 showing the torso-lift support supporting the patient in the lifted position.
Figure 11:
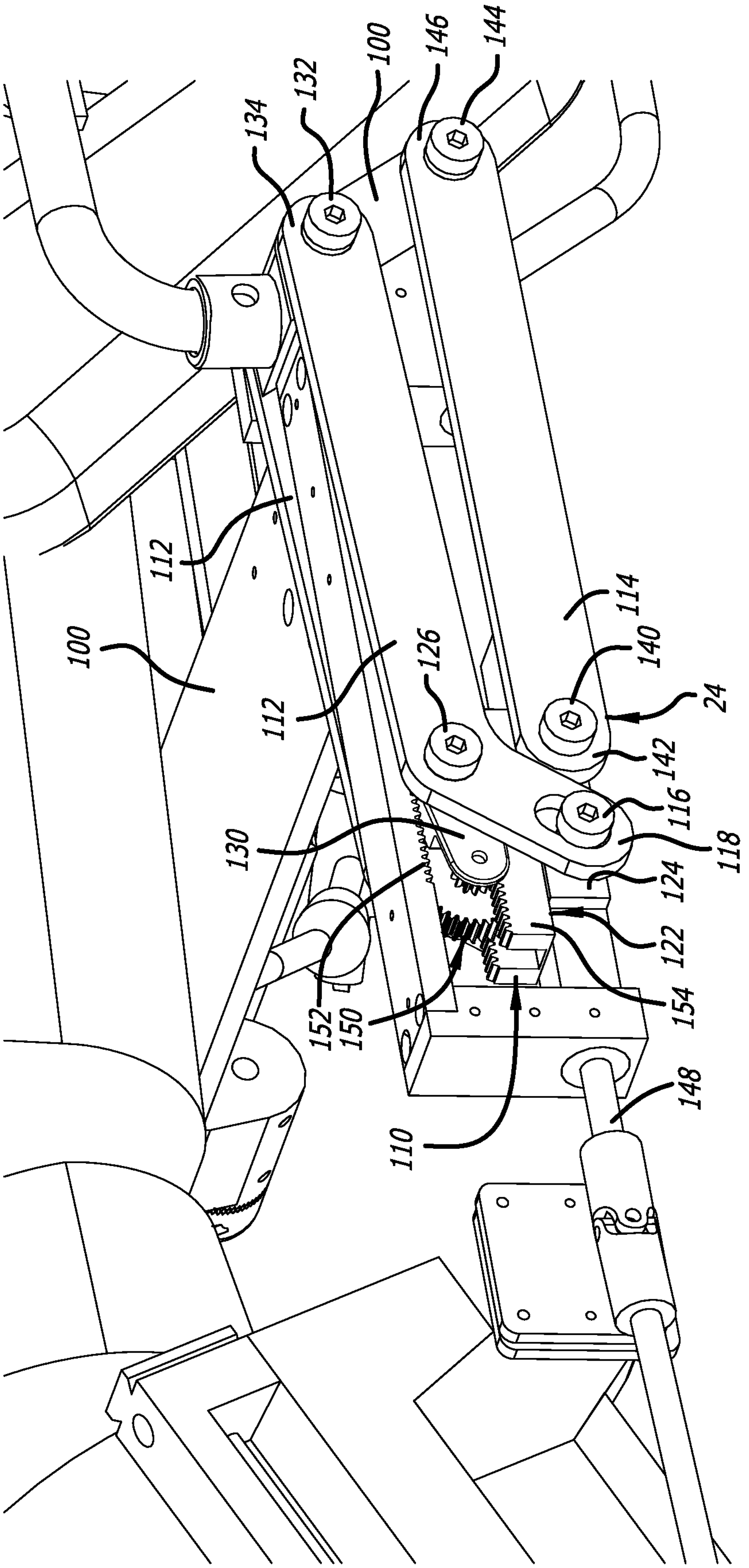
FIG. 11 is an enlarged top perspective view of componentry of the torso-lift support in the unlifted position.
Figure 12:
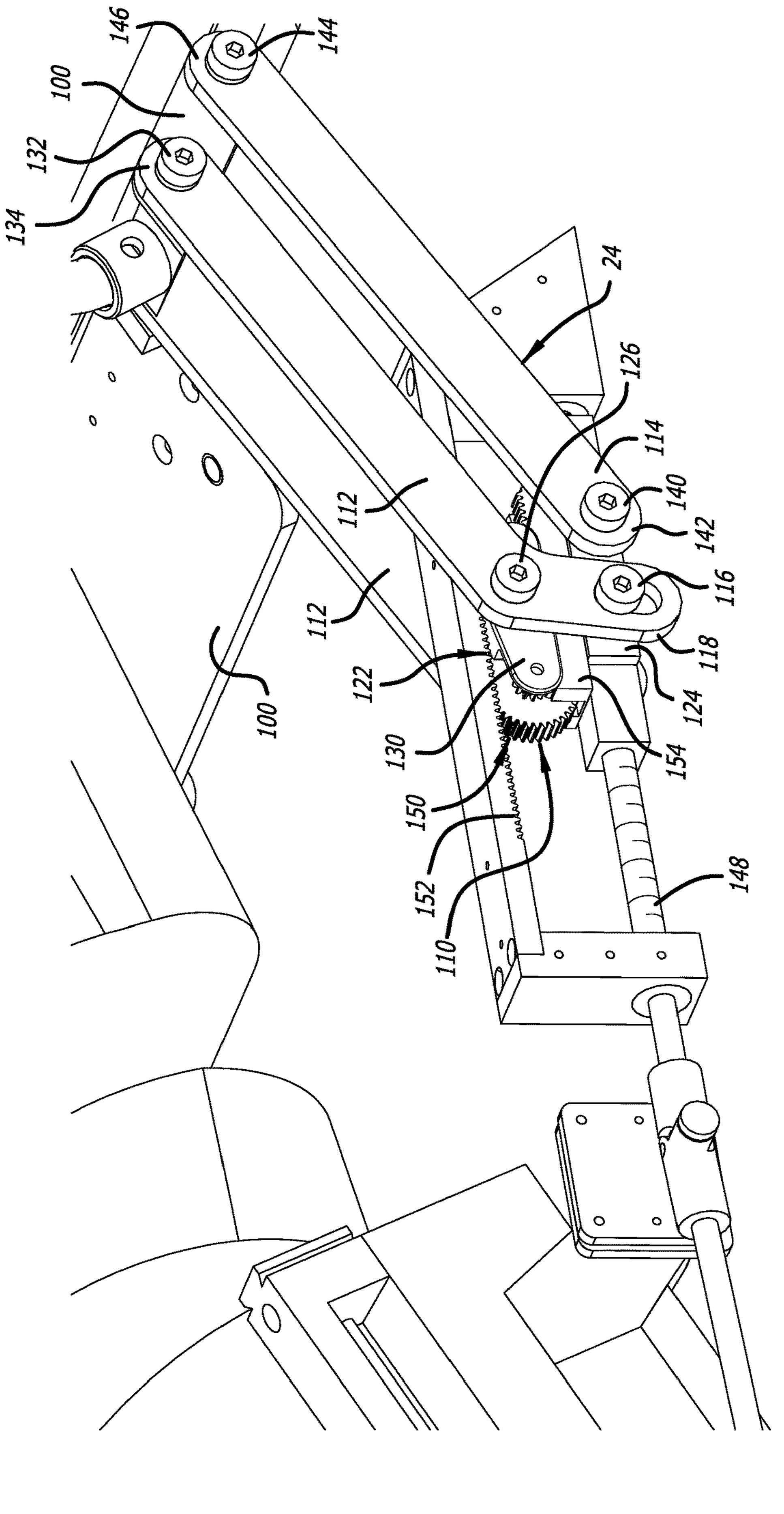
FIG. 12 is an enlarged top perspective view of the componentry of the torso-lift support in the lifted position.

As depicted in FIGS. 10-12, for example, the four-bar mechanism 110 includes first links 112 pivotally connected between offset main beam 12 and the chest support plate 100, and second links 114 pivotally connected between the offset main beam 12 and the chest support plate 100. As depicted in FIGS. 11 and 12, for example, in order to maintain the COR 108 at the desired fixed position, the first and second links 112 and 114 of the four-bar mechanism 110 crawl toward the first support portion 40 of the support structure 14, when the patient's upper body is being lifted. The first and second links 112 and 114 are arranged such that neither the surgeon's workspace nor imaging access are compromised while the patient's torso is being lifted.

As depicted in FIGS. 11 and 12, for example, each of the first links 112 define an L-shape, and includes a first pin 116 at a first end 118 thereof. The first pin 116 extends through first elongated slots 120 defined in the offset main beam 12, and the first pin 116 connects the first links 112 to a dual rack and pinion mechanism 122 via a drive nut 124 provided within the offset main beam 12, thus defining a lower pivot point thereof. Each of the first links 112 also includes a second pin 126 positioned proximate the corner of the L-shape. The second pin 126 extends through second elongated slots 128 defined in the offset main beam 12, and is linked to a carriage 130 of rack and pinion mechanism 122. Each of the first links 112 also includes a third pin 132 at a second end 134 that is pivotally attached to chest support plate 100, thus defining an upper pivot point thereof.

As depicted in FIGS. 11 and 12, for example, each of the second links 114 includes a first pin 140 at a first end 142 thereof. The first pin 140 extends through the first elongated slot 120 defined in the offset main beam 12, and the first pin 140 connects the second links 114 to the drive nut 124 of the rack and pinion mechanism 122, thus defining a lower pivot point thereof. Each of the second links 114 also includes a second pin 144 at a second end 146 that is pivotally connected to the chest support plate 100, thus defining an upper pivot point thereof.

As depicted in FIGS. 11 and 12, the rack and pinion mechanism 122 includes a drive screw 148 engaging the drive nut 124. Coupled gears 150 are attached to the carriage 130. The larger of the gears 150 engage an upper rack 152 (fixed within the offset main beam 12), and the smaller of the gears 150 engage a lower rack 154. The carriage 130 is defined as a gear assembly that floats between the two racks 152 and 154.

As depicted in FIGS. 11 and 12, the rack and pinion mechanism 122 converts rotation of the drive screw 148 into linear translation of the first and second links 112 and 114 in the first and second elongated slots 120 and 128 toward the first portion 40 of the support structure 14. As the drive nut 124 translates along drive screw 148 (via rotation of the drive screw 148), the carriage 130 translates towards the first portion 40 with less travel due to the different gear sizes of the coupled gears 150. The difference in travel, influenced by different gear ratios, causes the first links 112 pivotally attached thereto to lift the chest support plate 100. Lowering of the chest support plate 100 is accomplished by performing this operation in reverse. The second links 114 are "idler" links (attached to the drive nut 124 and the chest support plate 100) that controls the tilt of the chest support plate 100 as it is being lifted and lowered. All components associated with lifting while tilting the chest plate predetermine where COR 108 resides. Furthermore, a servomotor (not shown) interconnected with the drive screw 148 can be computer controlled and/or operated by the operator of the surgical frame 10 to facilitate controlled lifting and lowering of the chest support plate 100. A safety feature can be provided, enabling the operator to read and limit a lifting and lowering force applied by the torso-lift support 24 in order to prevent injury to the patient P. Moreover, the torso-lift support 24 can also include safety stops (not shown) to prevent over-extension or compression of the patient P, and sensors (not shown) programmed to send patient position feedback to the safety stops.

Figure 13A:
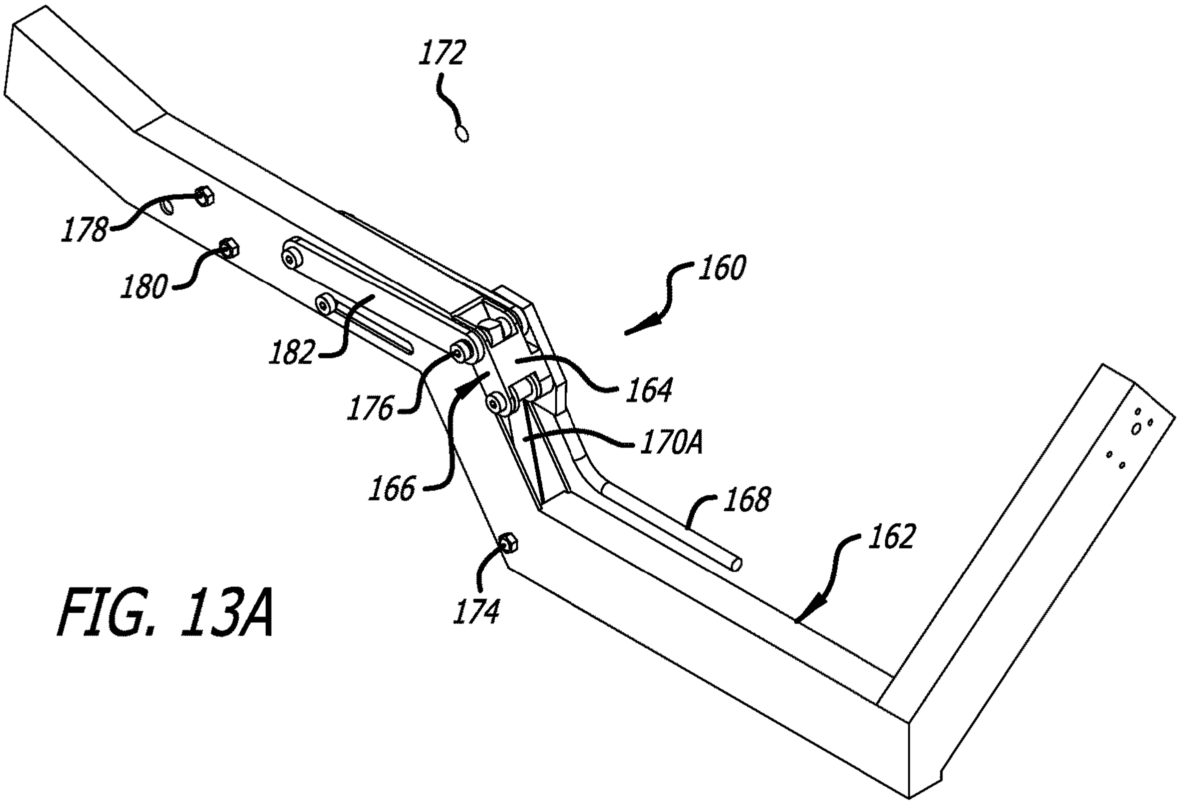
FIG. 13A is a perspective view of an embodiment of a structural offset main beam for use with another embodiment of a torso-lift support showing the torso-lift support in a retracted position.

An alternative preferred embodiment of a torso-lift support is generally indicated by the numeral 160 in FIGS. 13A-15. As depicted in FIGS. 13A-13C, an alternate offest main beam 162 is utilized with the torso-lift support 160. Furthermore, the torso-lift support 160 has a support plate 164 pivotally linked to the offset main beam 162 by a chest support lift mechanism 166. An arm support rod/plate 168 is connected to the support plate 164, and the second arm support 22B. The support plate 164 is attached to the chest support plate 100, and the chest support lift mechanism 166 includes various actuators 170A, 170B, and 170C used to facilitate positioning and repositioning of the support plate 164 (and hence, the chest support plate 100).

Figure 13B:
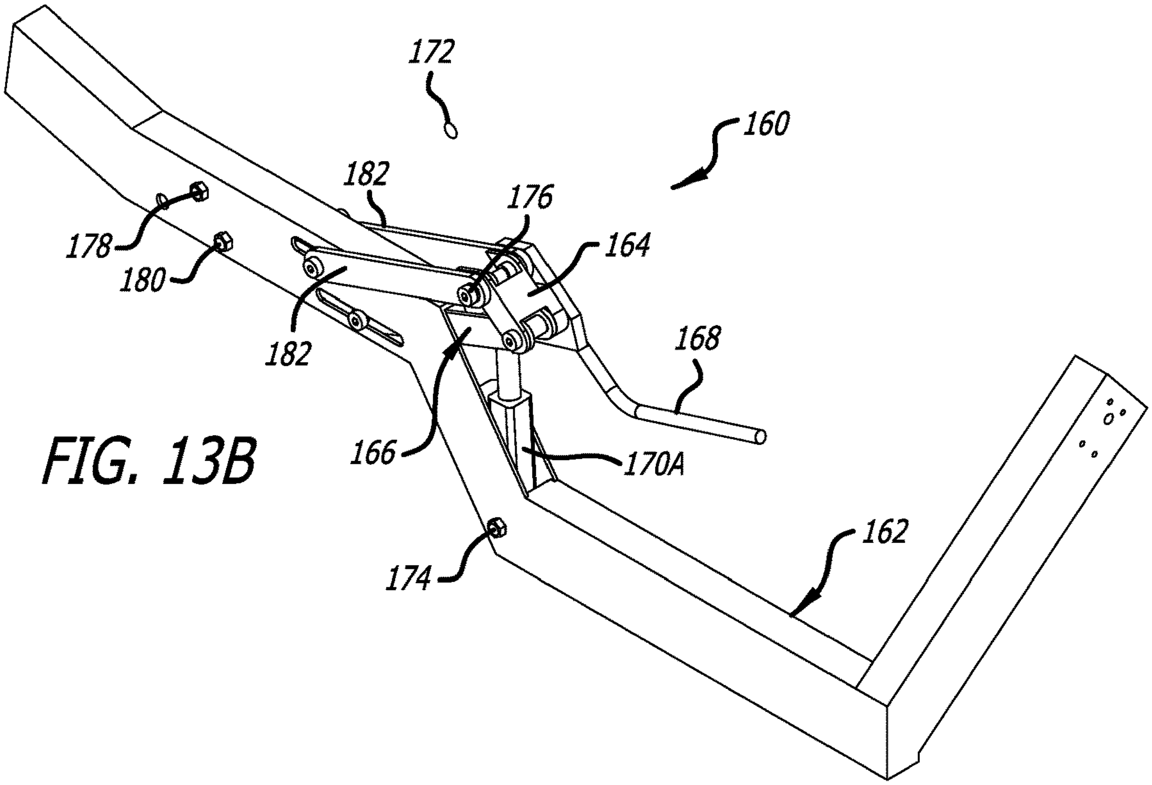
FIG. 13B is a perspective view similar to FIG. 13A showing the torso-lift support at half travel.
Figure 13C:
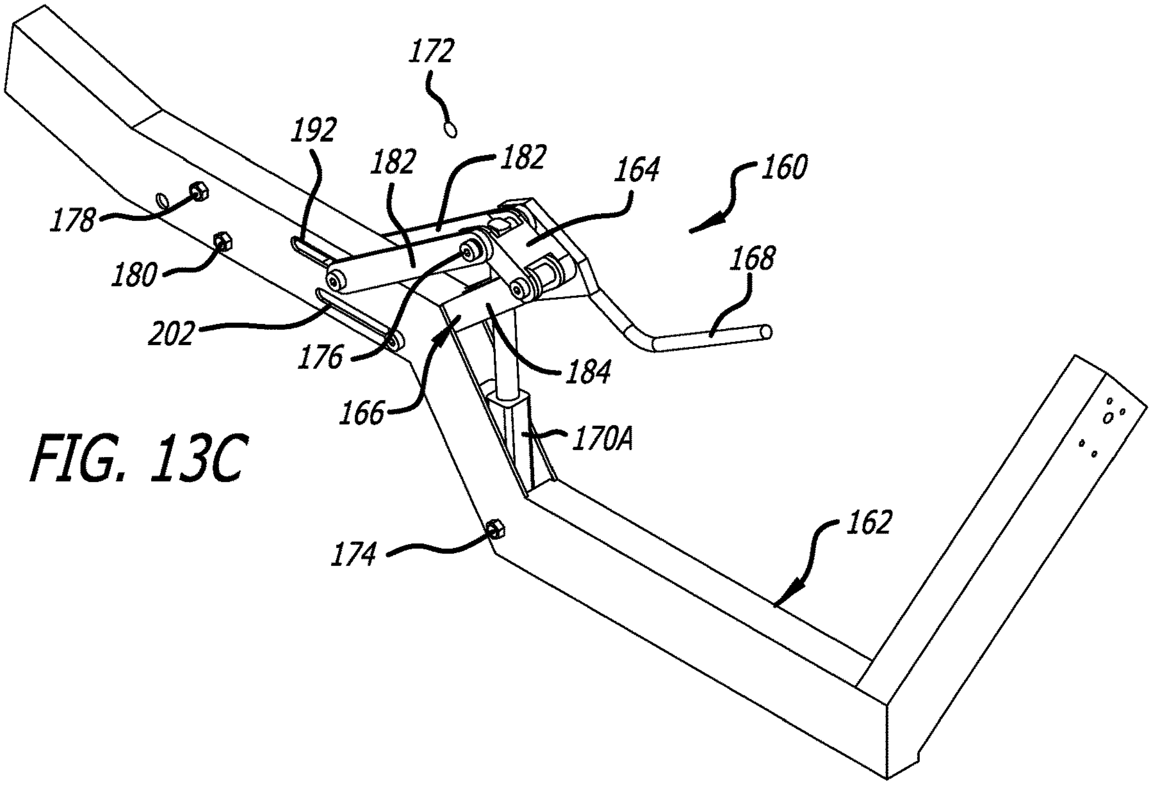
FIG. 13C is a perspective view similar to FIGS. 13A and 13B showing the torso-lift support at full travel.

As discussed below, the torso-lift support 160 depicted in FIGS. 13A-15 enables a COR 172 thereof to be programmably altered such that the COR 172 can be a fixed COR or a variable COR. As their names suggest, the fixed COR stays in the same position as the torso-lift support 160 is actuated, and the variable COR moves between a first position and a second position as the torso-lift support 160 is actuated between its initial position and final position at full travel thereof. Appropriate placement of the COR 172 is important so that spinal cord integrity is not compromised (i.e., overly compressed or stretched). Thus, the support plate 164 (and hence, the chest support plate 100) follows a path coinciding with a predetermined COR 172 (either fixed or variable). FIG. 13A depicts the torso-lift support 160 retracted, FIG. 13B depicts the torso-lift support 160 at half travel, and FIG. 13C depicts the torso-lift support 160 at full travel.

Figure 14:
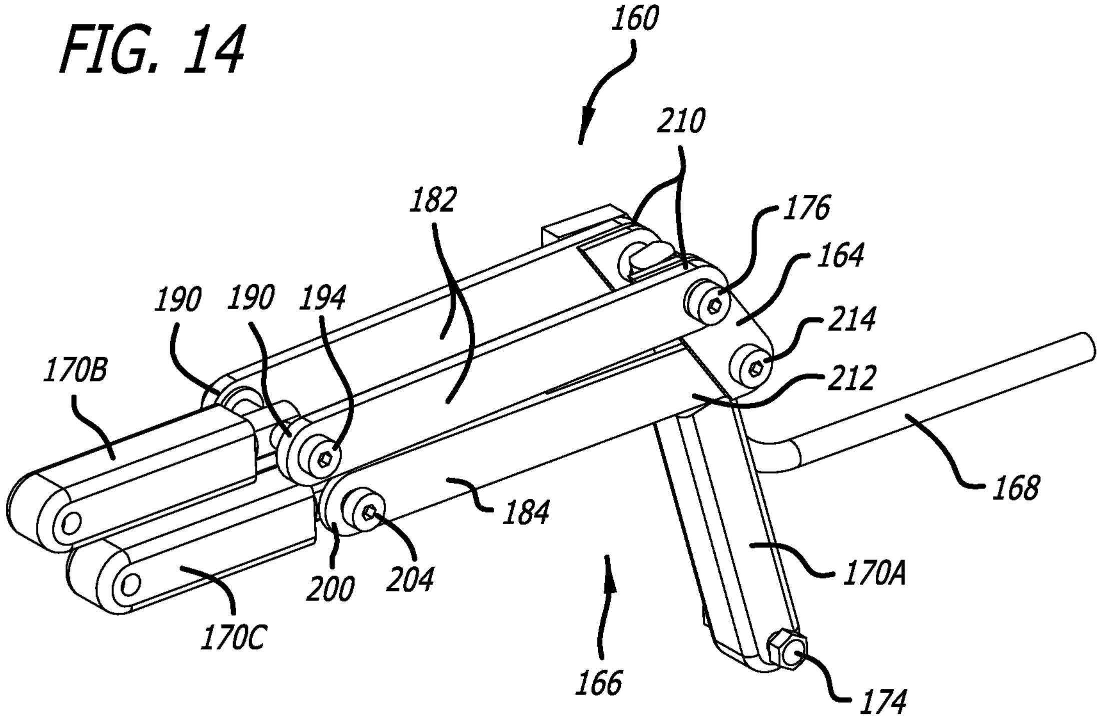
FIG. 14 is a perspective view of a chest support lift mechanism of the torso-lift support of FIGS. 13A-13C with actuators thereof retracted.
Figure 15:
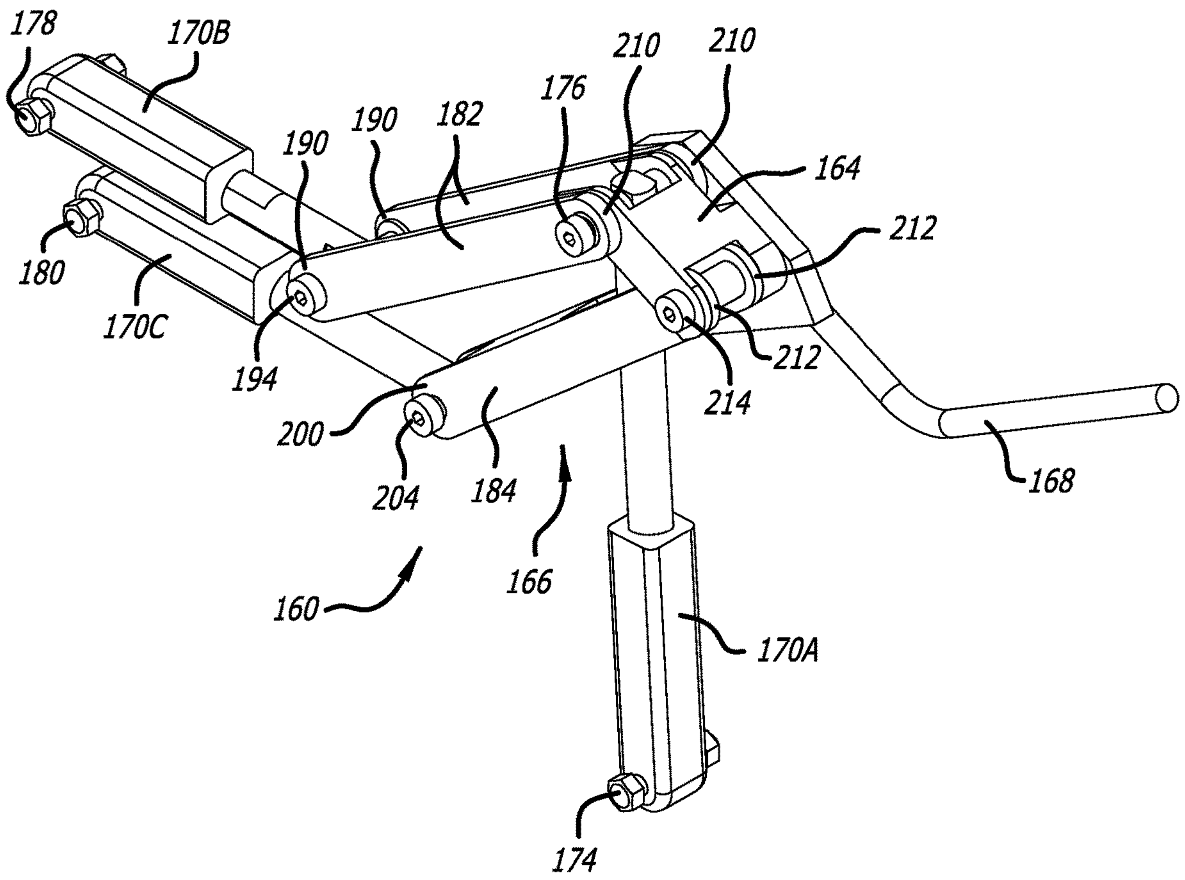
FIG. 15 is another perspective view of a chest support lift mechanism of the torso-lift support of FIGS. 13A-13C with the actuators thereof extended.

As discussed above, the chest support lift mechanism 166 includes the actuators 170A, 170B, and 170C to position and reposition the support plate 164 (and hence, the chest support plate 100). As depicted in FIGS. 14 and 15, for example, the first actuator 170A, the second actuator 170B, and the third actuator 170C are provided. Each of the actuators 170A, 170B, and 170C are interconnected with the offset main beam 12 and the support plate 164, and each of the actuators 170A, 170B, and 170C are moveable between a retracted and extended position. As depicted in FIGS. 13A-13C, the first actuator 170A is pinned to the offset main beam 162 using a pin 174 and pinned to the support plate 164 using a pin 176. Furthermore, the second and third actuators 170B and 170C are received within the offset main beam 162. The second actuator 170B is interconnected with the offset main beam 162 using a pin 178, and the third actuator 170C is interconnected with the offset main beam 162 using a pin 180.

The second actuator 170B is interconnected with the support plate 164 via first links 182, and the third actuator 170C is interconnected with the support plate 164 via second links 184. First ends 190 of the first links 182 are pinned to the second actuator 170B and elongated slots 192 formed in the offset main beam 162 using a pin 194, and first ends 200 of the second links 184 are pinned to the third actuator 170C and elongated slots 202 formed in the offset main beam 162 using a pin 204. The pins 194 and 204 are moveable within the elongated slots 192 and 202. Furthermore, second ends 210 of the first links 182 are pinned to the support plate 164 using the pin 176, and second ends 212 of the second links 184 are pinned to the support plate 164 using a pin 214. To limit interference therebetween, as depicted in FIGS. 13A-13C, the first links 182 are provided on the exterior of the offset main beam 162, and, depending on the position thereof, the second links 184 are positioned on the interior of the offset main beam 162.

Actuation of the actuators 170A, 170B, and 170C facilitates movement of the support plate 164. Furthermore, the amount of actuation of the actuators 170A, 170B, and 170C can be varied to affect different positions of the support plate 164. As such, by varying the amount of actuation of the actuators 170A, 1706, and 170C, the COR 172 thereof can be controlled. As discussed above, the COR 172 can be predetermined, and can be either fixed or varied. Furthermore, the actuation of the actuators 170A, 170B, and 170C can be computer controlled and/or operated by the operator of the surgical frame 10, such that the COR 172 can be programmed by the operator. As such, an algorithm can be used to determine the rates of extension of the actuators 170A, 1706, and 170C to control the COR 172, and the computer controls can handle implementation of the algorithm to provide the predetermined COR. A safety feature can be provided, enabling the operator to read and limit a lifting force applied by the actuators 170A, 170B, and 170C in order to prevent injury to the patient P. Moreover, the torso-lift support 160 can also include safety stops (not shown) to prevent over-extension or compression of the patient P, and sensors (not shown) programmed to send patient position feedback to the safety stops.

FIGS. 16-23 depict portions of the sagittal adjustment assembly 28. The sagittal adjustment assembly 28 can be used to distract or compress the patient's lumbar spine during or after lifting or lowering of the patient's torso by the torso-lift supports. The sagittal adjustment assembly 28 supports and manipulates the lower portion of the patient's body. In doing so, the sagittal adjustment assembly 28 is configured to make adjustments in the sagittal plane of the patient's body, including tilting the pelvis, controlling the position of the upper and lower legs, and lordosing the lumbar spine.

Figure 16:
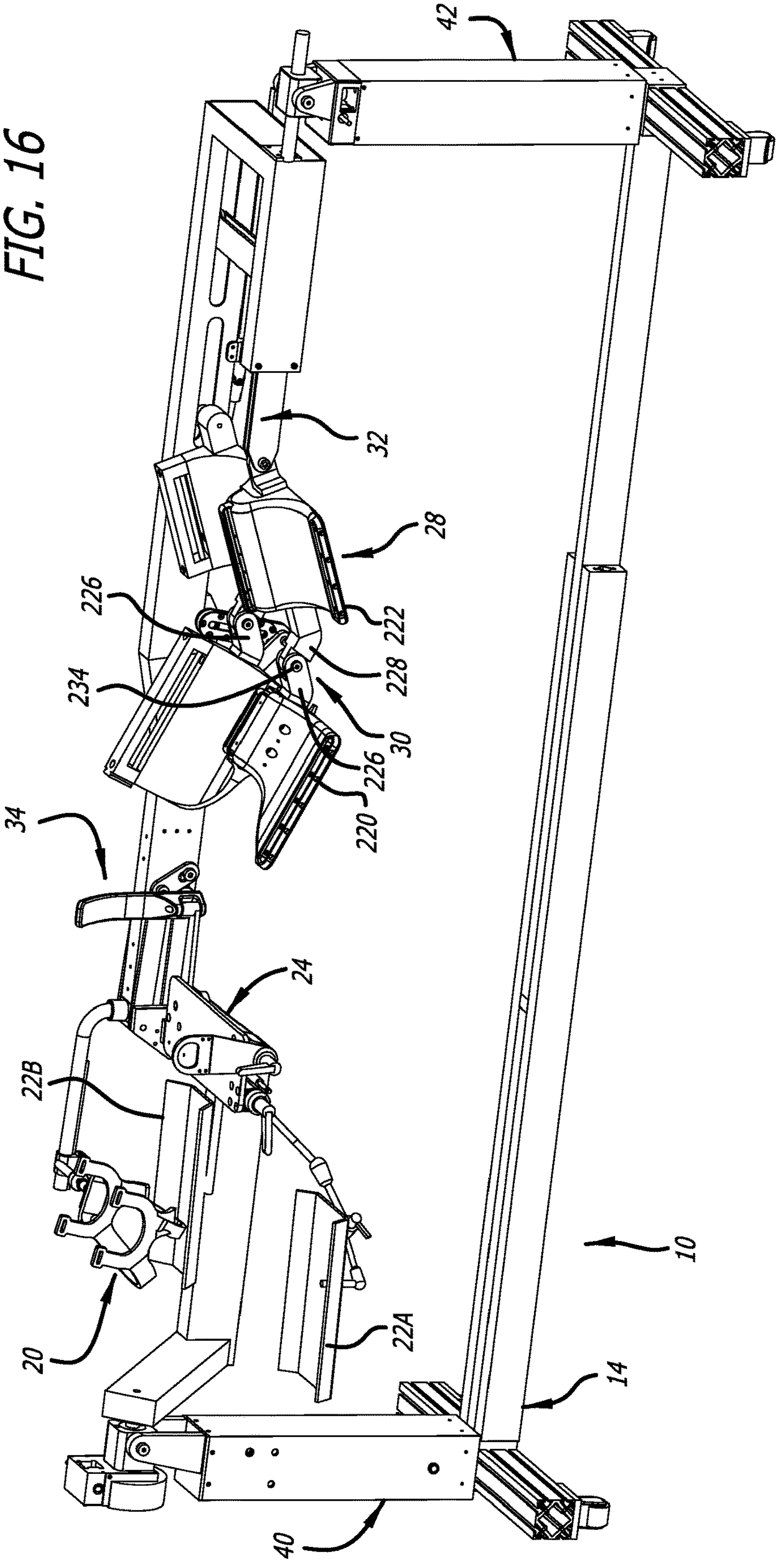
FIG. 16 is a top perspective view of the surgical frame of FIG. 5.
Figure 17:
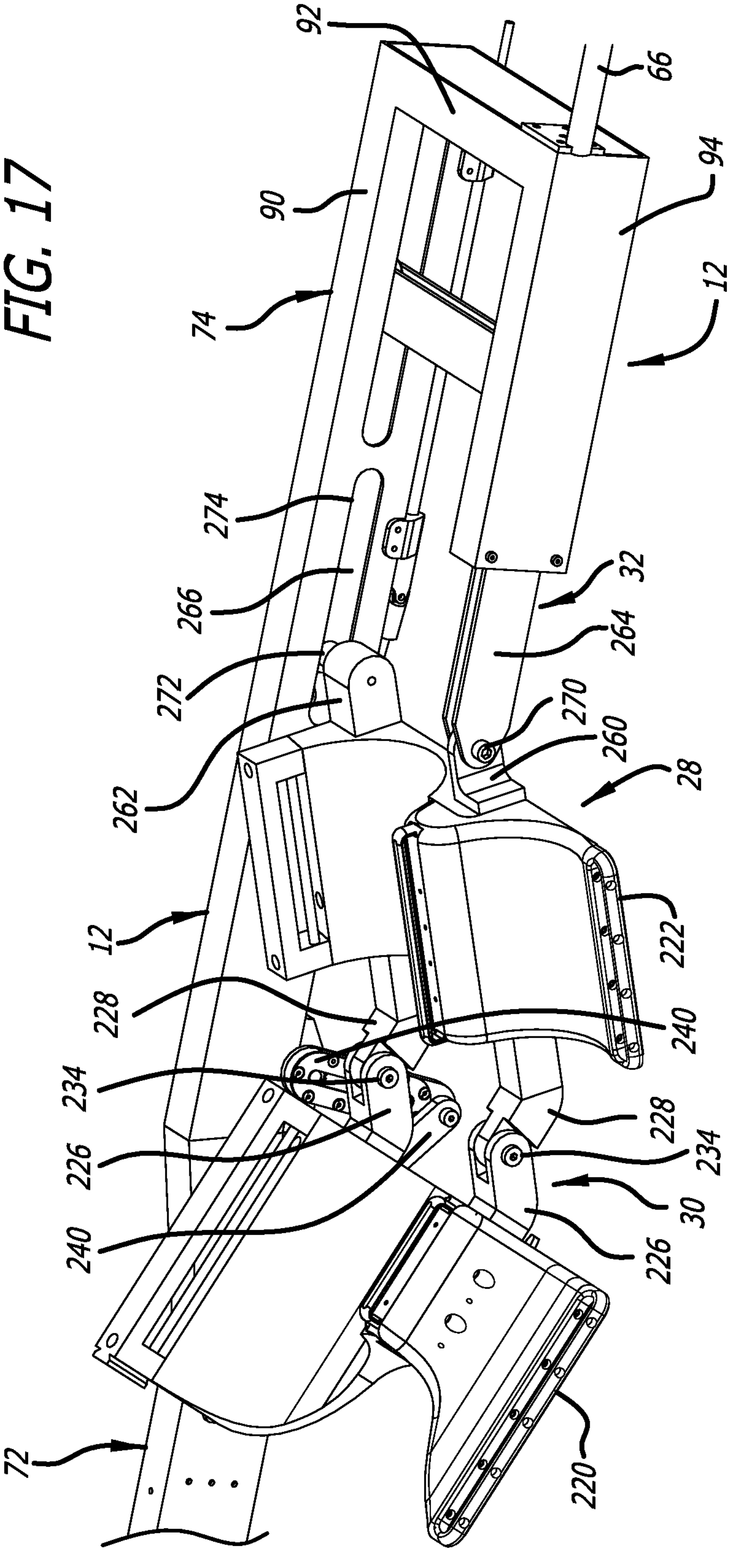
FIG. 17 is an enlarged top perspective view of portions of the surgical frame of FIG. 1 showing a sagittal adjustment assembly including a pelvic-tilt mechanism and leg adjustment mechanism.

As depicted in FIGS. 16 and 17, for example, the sagittal adjustment assembly 28 includes the pelvic-tilt mechanism 30 for supporting the thighs and lower legs of the patient P. The pelvic-tilt mechanism 30 includes a thigh cradle 220 configured to support the patient's thighs, and a lower leg cradle 222 configured to support the patient's shins. Different sizes of thigh and lower leg cradles can be used to accommodate different sizes of patients, i.e., smaller thigh and lower leg cradles can be used with smaller patients, and larger thigh and lower leg cradles can be used with larger patients. Soft straps (not shown) can be used to secure the patient P to the thigh cradle 220 and the lower leg cradle 222. The thigh cradle 220 and the lower leg cradle 222 are moveable and pivotal with respect to one another and to the offset main beam 12. To facilitate rotation of the patient's hips, the thigh cradle 220 and the lower leg cradle 222 can be positioned anterior and inferior to the patient's hips.

Figure 18:
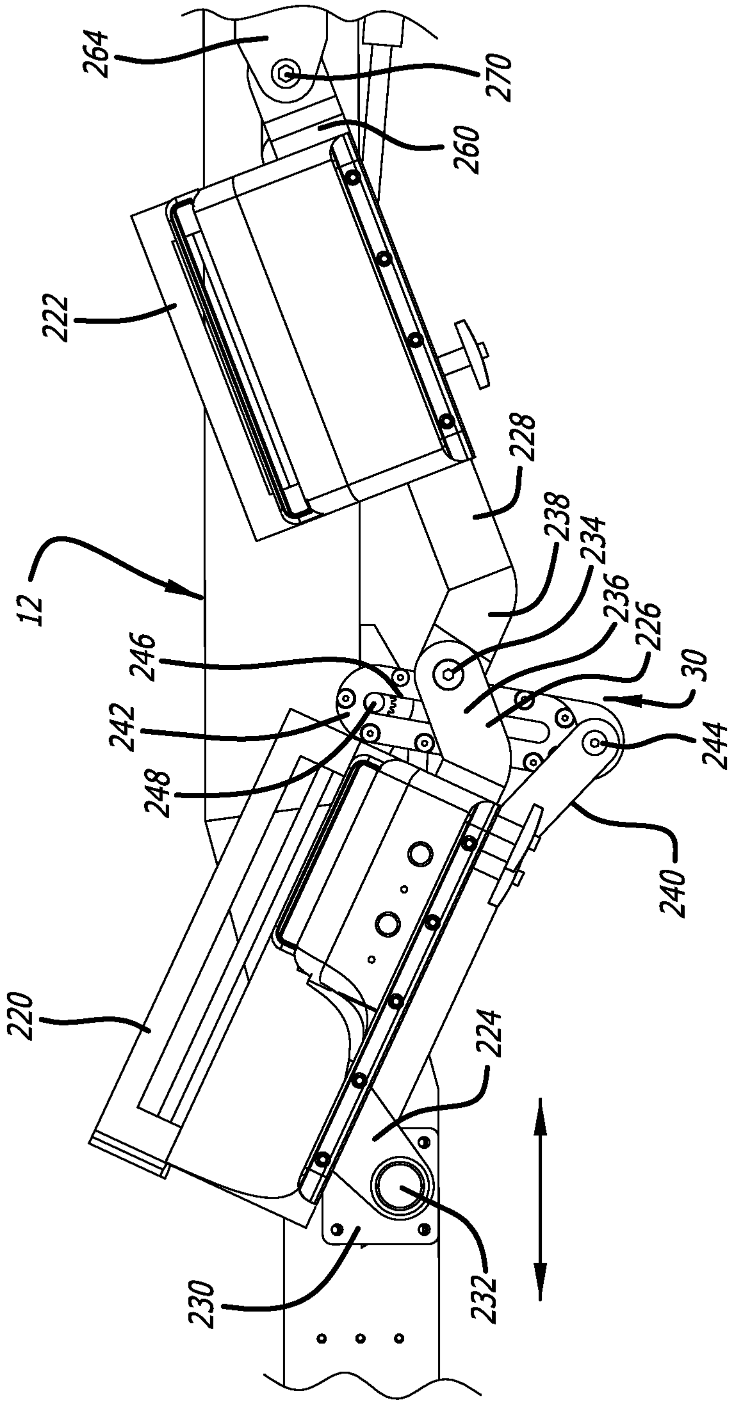
FIG. 18 is an enlarged side elevational view of portions of the surgical frame of FIG. 1 showing the pelvic-tilt mechanism.
Figure 25:
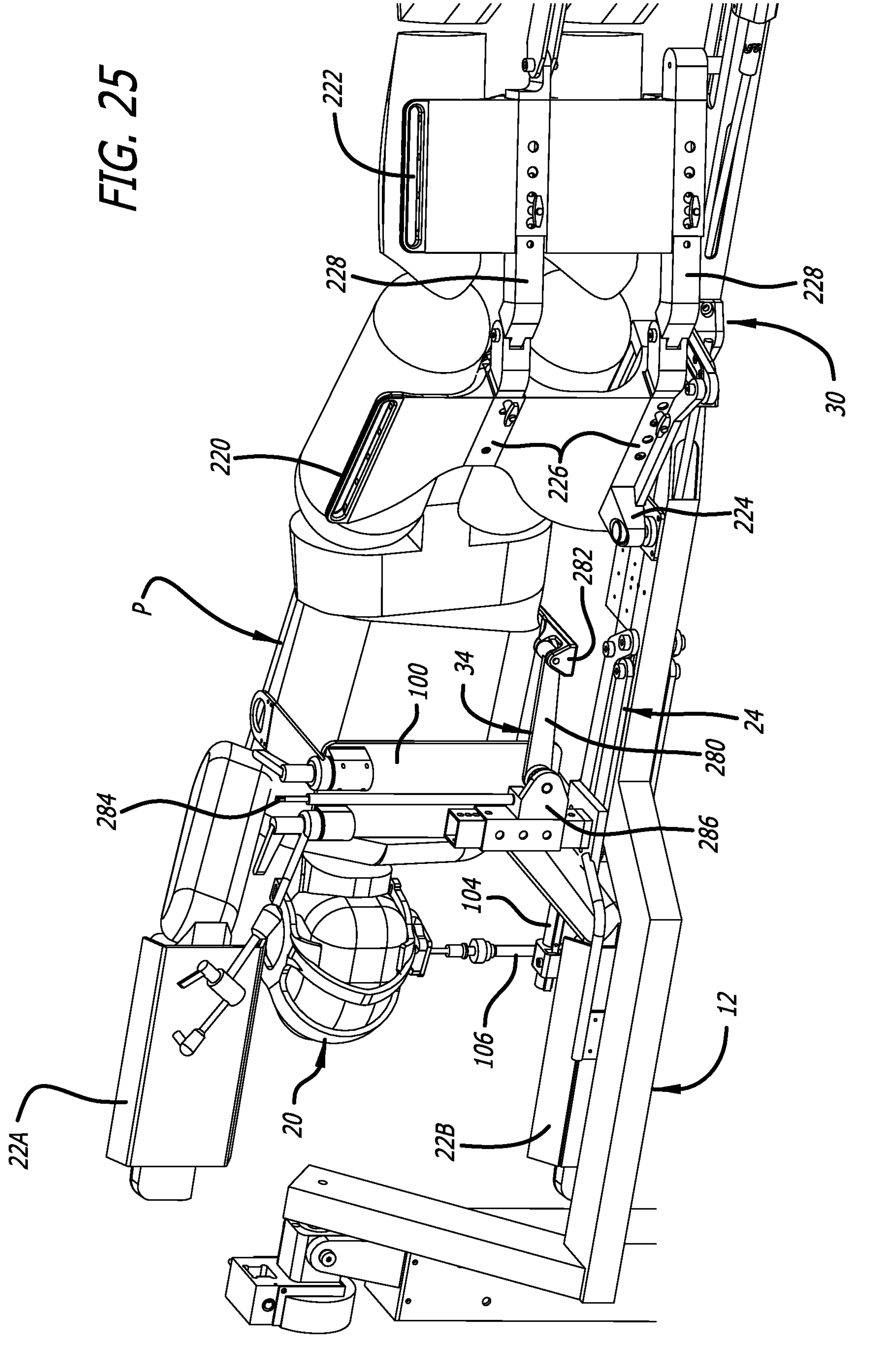
FIG. 25 is a top perspective view of portions of the surgical frame of FIG. 1 showing operation of the coronal adjustment assembly.

As depicted in FIGS. 18 and 25, for example, a first support strut 224 and second support struts 226 are attached to the thigh cradle 220. Furthermore, third support struts 228 are attached to the lower leg cradle 222. The first support strut 224 is pivotally attached to the offset main beam 12 via a support plate 230 and a pin 232, and the second support struts 226 are pivotally attached to the third support struts 228 via pins 234. The pins 234 extend through angled end portions 236 and 238 of the second and third support struts 226 and 228, respectively. Furthermore, the lengths of second and third support struts 226 and 228 are adjustable to facilitate expansion and contraction of the lengths thereof.

To accommodate patients with different torso lengths, the position of the thigh cradle 220 can be adjustable by moving the support plate 230 along the offset main beam 12. Furthermore, to accommodate patients with different thigh and lower leg lengths, the lengths of the second and third support struts 226 and 228 can be adjusted.

Figure 19:
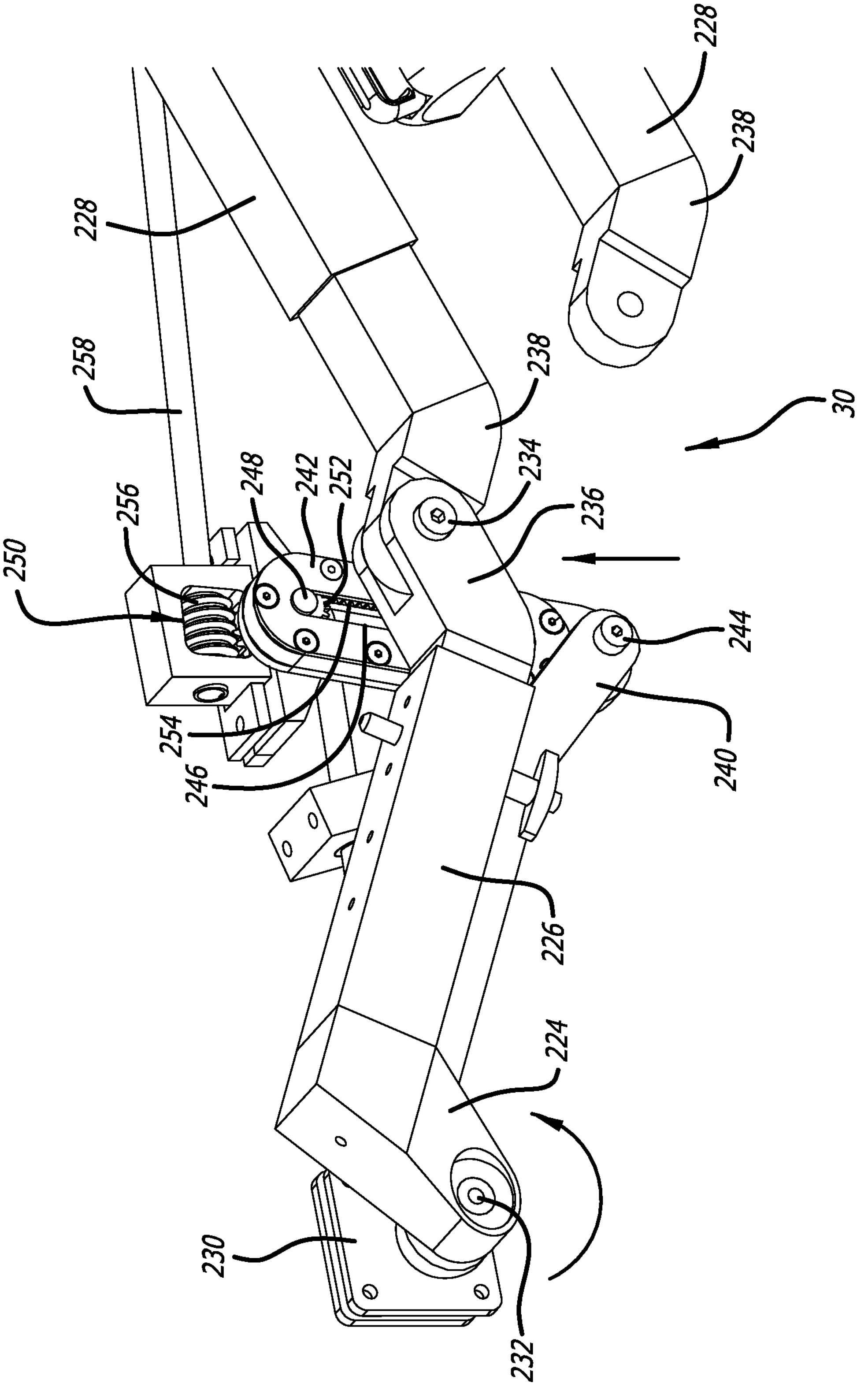
FIG. 19 is an enlarged perspective view of componentry of the pelvic-tilt mechanism.
Figure 20:
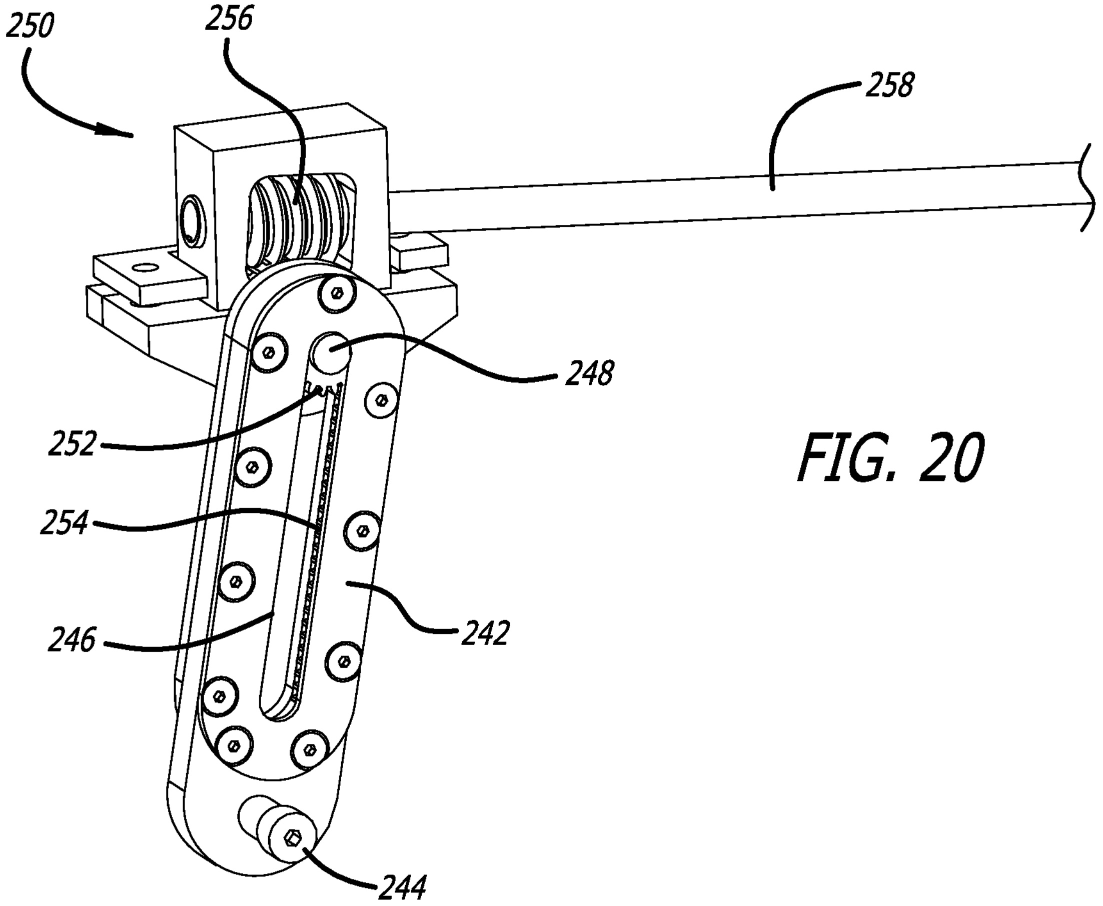
FIG. 20 is an enlarged perspective view of a captured rack and a worm gear assembly of the componentry of the pelvic-tilt mechanism.
Figure 21:
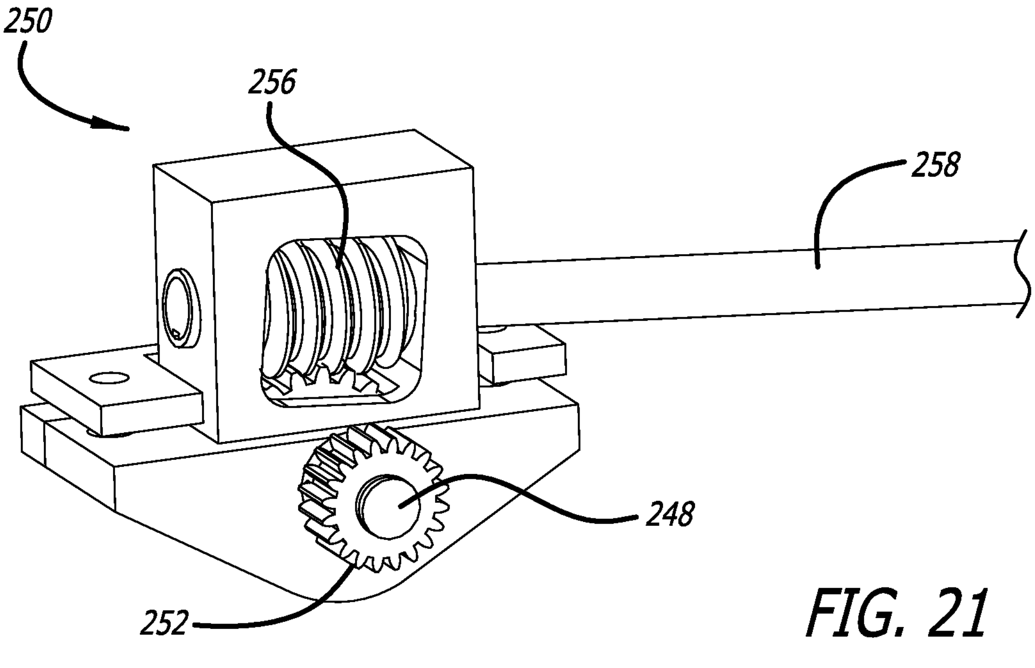
FIG. 21 is an enlarged perspective view of the worm gear assembly of FIG. 20.

To control the pivotal angle between the second and third support struts 226 and 228 (and hence, the pivotal angle between the thigh cradle 220 and lower leg cradle 222), a link 240 is pivotally connected to a captured rack 242 via a pin 244. The captured rack 242 includes an elongated slot 246, through which is inserted a worm gear shaft 248 of a worm gear assembly 250. The worm gear shaft 248 is attached to a gear 252 provided on the interior of the captured rack 242. The gear 252 contacts teeth 254 provided inside the captured rack 242, and rotation of the gear 252 (via contact with the teeth 254) causes motion of the captured rack 242 upwardly and downwardly. The worm gear assembly 250, as depicted in FIGS. 19-21, for example, includes worm gears 256 which engage a drive shaft 258, and which are connected to the worm gear shaft 248.

The worm gear assembly 250 also is configured to function as a brake, which prevents unintentional movement of the sagittal adjustment assembly 28. Rotation of the drive shaft 258 causes rotation of the worm gears 256, thereby causing reciprocal vertical motion of the captured rack 242. The vertical reciprocal motion of the captured rack 242 causes corresponding motion of the link 240, which in turn pivots the second and third support struts 226 and 228 to correspondingly pivot the thigh cradle 220 and lower leg cradle 222. A servomotor (not shown) interconnected with the drive shaft 258 can be computer controlled and/or operated by the operator of the surgical frame 10 to facilitate controlled reciprocal motion of the captured rack 242.

The sagittal adjustment assembly 28 also includes the leg adjustment mechanism 32 facilitating articulation of the thigh cradle 220 and the lower leg cradle 222 with respect to one another. In doing so, the leg adjustment mechanism 32 accommodates the lengthening and shortening of the patient's legs during bending thereof. As depicted in FIG. 17, for example, the leg adjustment mechanism 32 includes a first bracket 260 and a second bracket 262 attached to the lower leg cradle 222. The first bracket 260 is attached to a first carriage portion 264, and the second bracket 262 is attached to a second carriage portion 266 via pins 270 and 272, respectively. The first carriage portion 264 is slidable within third portion 94 of the rear portion 74 of the offset main beam 12, and the second carriage portion 266 is slidable within the first portion 90 of the rear portion 74 of the offset main beam 12. An elongated slot 274 is provided in the first portion 90 to facilitate engagement of the second bracket 262 and the second carriage portion 266 via the pin 272. As the thigh cradle 220 and the lower leg cradle 222 articulate with respect to one another (and the patient's legs bend accordingly), the first carriage 264 and the second carriage 266 can move accordingly to accommodate such movement.

Figure 22:
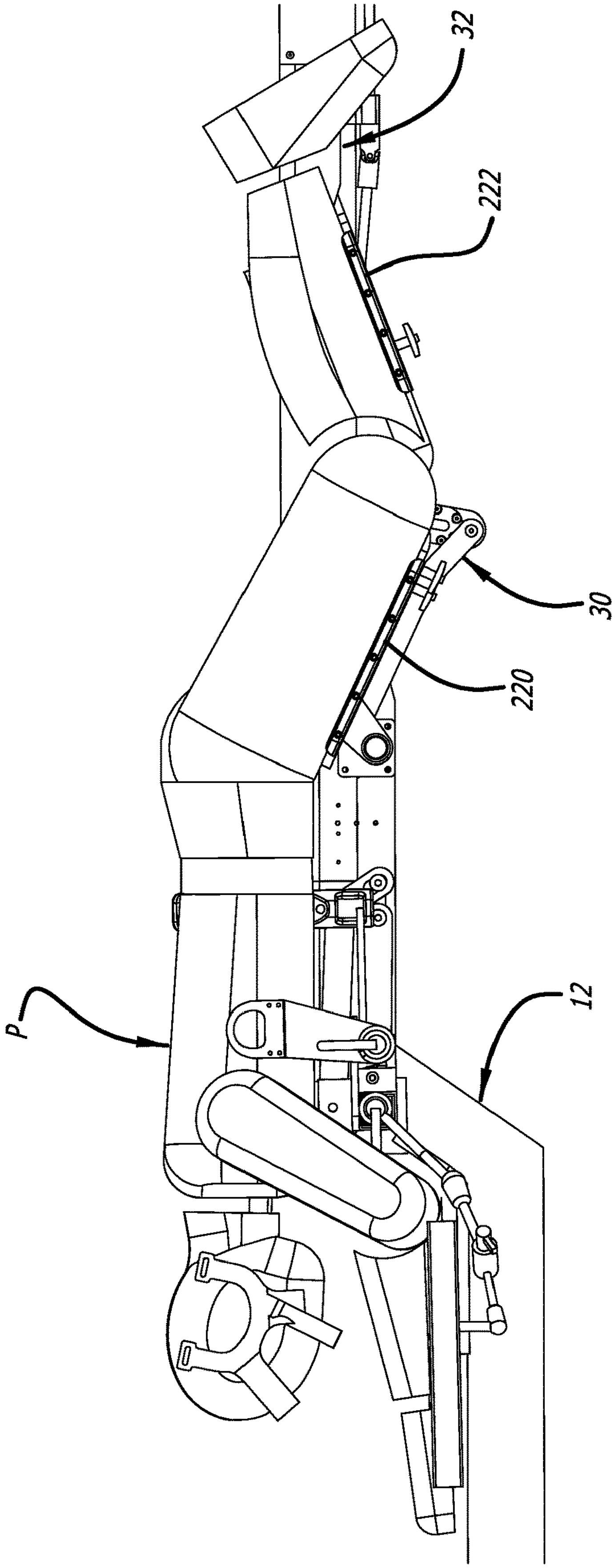
FIG. 22 is a side elevational view of portions of the surgical frame of FIG. 1 showing the patient positioned thereon and the pelvic-tilt mechanism of the sagittal adjustment assembly in the flexed position.
Figure 23:
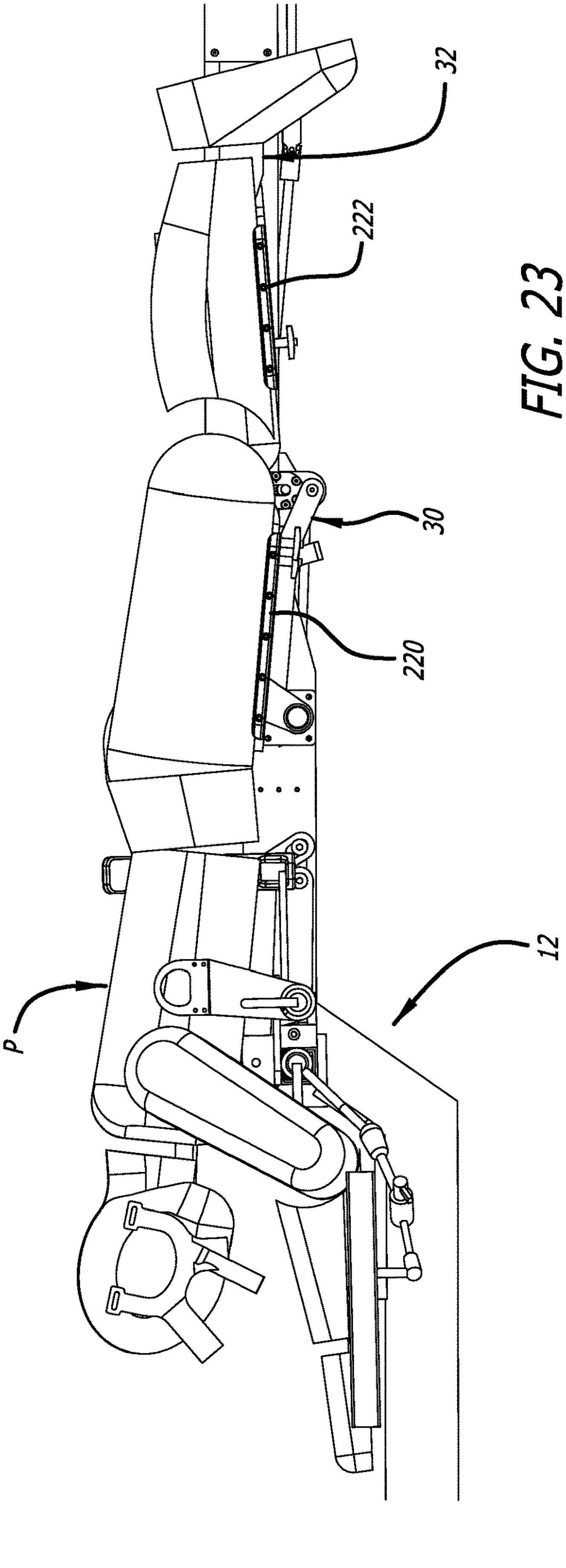
FIG. 23 is another side elevational view of portions of the surgical frame of FIG. 1 showing the patient positioned thereon and the pelvic-tilt mechanism of the sagittal adjustment assembly in the fully extended position.

The pelvic-tilt mechanism 30 is movable between a flexed position and a fully extended position. As depicted in FIG. 22, in the flexed position, the lumbar spine is hypo-lordosed. This opens the posterior boundaries of the lumbar vertebral bodies and allows for easier placement of any interbody devices. The lumbar spine stretches slightly in this position. As depicted in FIG. 23, in the extended position, the lumbar spine is lordosed. This compresses the lumbar spine. When posterior fixation devices, such as rods and screws, are placed, optimal sagittal alignment can be achieved. During sagittal alignment, little to negligible angle change occurs between the thighs and the pelvis. The pelvic-tilt mechanism 30 also can hyper-extend the hips as a means of lordosing the spine, in addition to tilting the pelvis. One of ordinary skill will recognize, however, that straightening the patient's legs does not lordose the spine. Leg straightening is a consequence of rotating the pelvis while maintaining a fixed angle between the pelvis and the thighs.

The sagittal adjustment assembly 28, having the configuration described above, further includes an ability to compress and distract the spine dynamically while in the lordosed or flexed positions. The sagittal adjustment assembly 28 also includes safety stops (not shown) to prevent over-extension or compression of the patient, and sensors (not shown) programmed to send patient position feedback to the safety stops.

Figure 24:
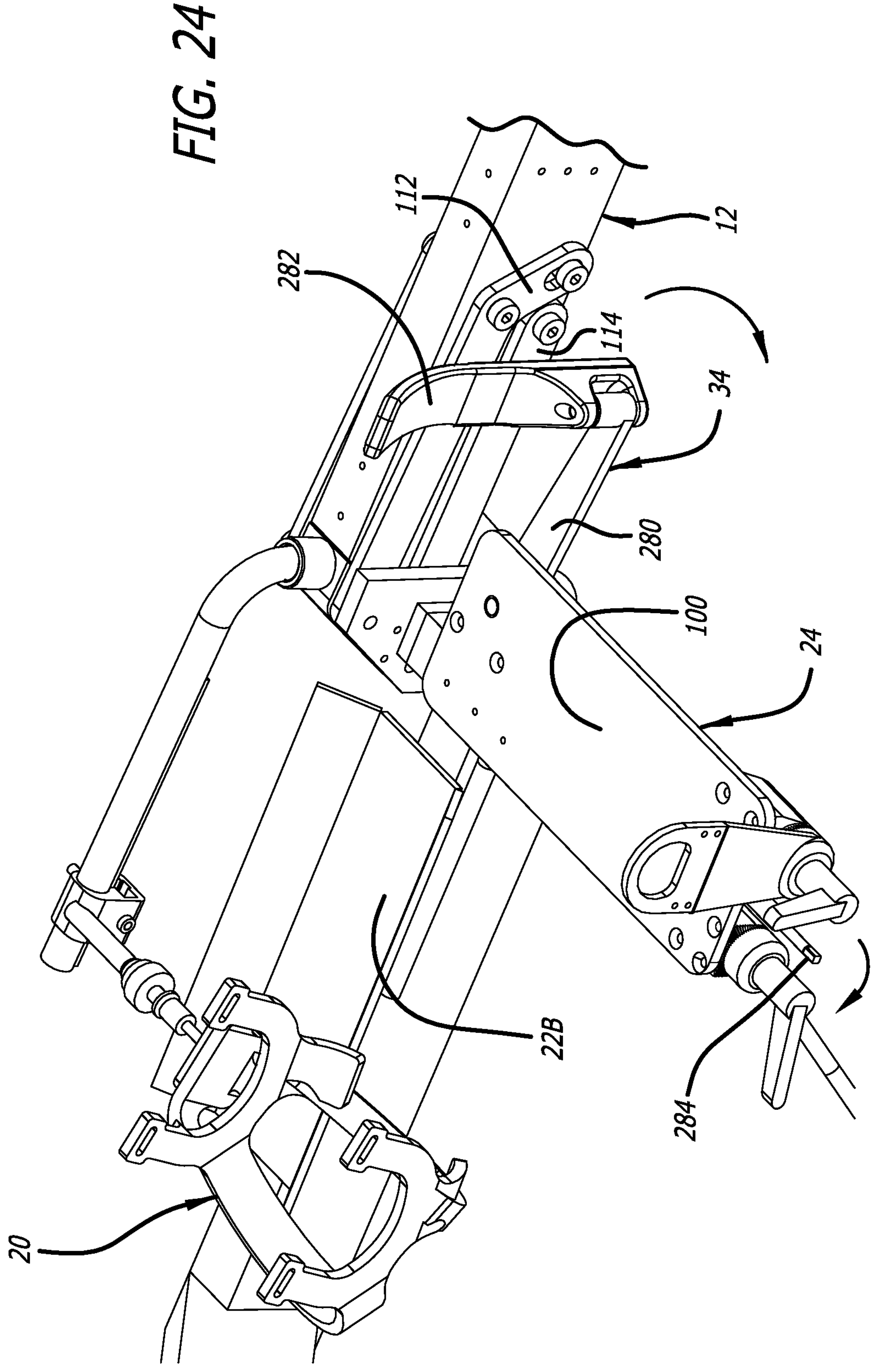
FIG. 24 is an enlarged top perspective view of portions of the surgical frame of FIG. 1 showing a coronal adjustment assembly.
Figure 26:
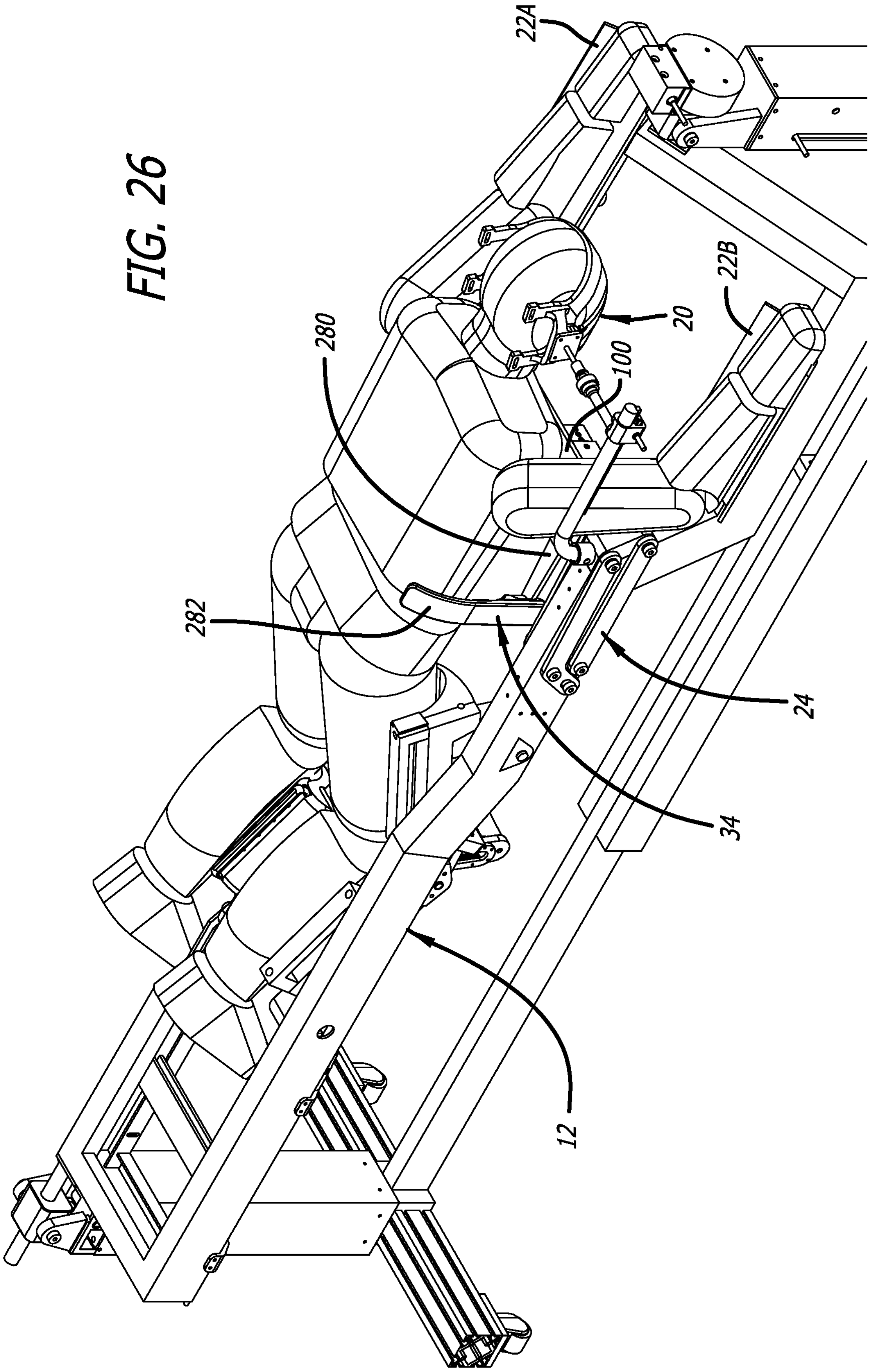
FIG. 26 is a top perspective view of a portion of the surgical frame of FIG. 1 showing operation of the coronal adjustment assembly.

As depicted in FIGS. 24-26, for example, the coronal adjustment assembly 34 is configured to support and manipulate the patient's torso, and further to correct a spinal deformity, including but not limited to a scoliotic spine. As depicted in FIGS. 24-26, for example, the coronal adjustment assembly 34 includes a lever 280 linked to an arcuate radio-lucent paddle 282. As depicted in FIGS. 24 and 25, for example, a rotatable shaft 284 is linked to the lever 280 via a transmission 286, and the rotatable shaft 284 projects from an end of the chest support plate 100. Rotation of the rotatable shaft 284 is translated by the transmission 286 into rotation of the lever 280, causing the paddle 282, which is linked to the lever 280, to swing in an arc. Furthermore, a servomotor (not shown) interconnected with the rotatable shaft 284 can be computer controlled and/or operated by the operator of the surgical frame 10 to facilitate controlled rotation of the lever 280.

As depicted in FIG. 24, for example, adjustments can be made to the position of the paddle 282 to manipulate the torso and straighten the spine. As depicted in FIG. 25, when the offset main beam 12 is positioned such that the patient P is positioned in a lateral position, the coronal adjustment assembly 34 supports the patient's torso. As further depicted in FIG. 26, when the offset main beam 12 is positioned such that the patient P is positioned in a prone position, the coronal adjustment assembly 34 can move the torso laterally, to correct a deformity, including but not limited to a scoliotic spine. When the patient is strapped in via straps (not shown) at the chest and legs, the torso is relatively free to move and can be manipulated. Initially, the paddle 282 is moved by the lever 280 away from the offset main beam 12. After the paddle 282 has been moved away from the offset main beam 12, the torso can be pulled with a strap towards the offset main beam 12. The coronal adjustment assembly 34 also includes safety stops (not shown) to prevent over-extension or compression of the patient, and sensors (not shown) programmed to send patient position feedback to the safety stops.

Preferred embodiments of conforming main beam portions are generally indicated by the numeral 300 in FIGS. 27-31 and 36-39, and by the numeral 330 in FIGS. 32-35. The conforming main beam portions 300 and 330 can be incorporated into the surgical frame 10. As such, the conforming main beam portions 300 and 330 can be used in place of portions of the offset main beam 12. As discussed below, the conforming main beam portions 300 and 330 can be configured to facilitate access to either of the lateral sides of the patient P, as well as to facilitate performance of posterior decompression surgery on the patient P. Furthermore, the conforming main beam portions 300 and 330 can be configured to facilitate performance of DLIF (direct lateral interbody fusion) or OLIF (oblique lumbar interbody fusion) surgeries.

As discussed above, the offset main beam 12 includes a forward portion 72 and a rear portion 74. The forward portion 72 includes the second portion 82, the third portion 84, and the fourth portion 86, the rear portion 74 includes the first portion 90, and the connection member 76 joins the fourth portion 86 and the first portion 90 to one another. These portions of the offset main beam 12 are supported between the first portion 80 of the forward portion 72 and the second portion 92 of the rear portion 74. In fact, the second portion 82, the third portion 84, the fourth portion 86, the connecting member 76, and the first portion 90 are spaced from the axis of rotation of the offset main beam 12 by the first portion 80 and the second portion 92. Likewise, the conforming main beam portion 300 can be supported by the remainder of the surgical frame 10 via the first portion 80 and the second portion 92. The conforming main beam portion 300 can be supported between the first portion 80 and the second portion 92 rather than using the portions of the offset main beam 12 supported between the first portion 80 and the second portion 92 in FIGS. 1-5, 7, 8, 16, and 26. As such, the first portion 80 and the second portion 92 serve as support arms for supporting the conforming main be beam portion 300 relative to the remainder of the surgical frame.

As depicted in FIGS. 27-31 and 36-39, the conforming main beam portion 300 includes a first portion 302, a second portion 304, a third portion 306, a fourth portion 308, and a fifth portion 310. Furthermore, the conforming main beam portion 300 has a first end 320 and a second end 322. The first portion 302 can be attached at the first end 320 to the first portion 80, and the fifth portion 310 can be attached at the second end 322 to the second portion 92. As such, the conforming main beam portion 300 is spaced from the axis of rotation of the offset main beam 12 by the first portion 80 and the second portion 92, and the conforming main beam portion 300 is supported by the remainder of the surgical frame 10 via the first portion 80 and the second portion 92.

The first portion 302, the second portion 304, the third portion 306, the fourth portion 308, and the fifth portion 310 of the conforming main beam portion 300 are configured to facilitate access to either of the lateral sides of the patient P. That is, when the patient P is supported in at least the prone position (FIGS. 27-31 and 39) by the surgical frame 10, the conforming main beam portion 300 is configured (i.e., arranged, sized, and shaped) to afford access not only to the lateral side of the patient P opposite from the conforming main beam portion 300, but is configured (i.e., arranged, sized, and shaped) to afford access to the lateral side of the patient P adjacent the conforming main beam portion 300. As such, when the patient P is positioned in the prone position, the configuration of the conforming main beam portion 300 allows a surgeon access to one lateral side of the patient P and a surgical assistant access to the other lateral side of the patient P with limited interference by the conforming main beam portion 300. In other words, the conforming main beam portion 300 is arranged, sized, and shaped to avoid blocking access to the patient P from either of the lateral sides of the patient P when the patient P is positioned in the prone position. More specifically, when the patient P is in the prone position, as depicted in FIGS. 27-31 and 39, the configuration of the surgical frame 10 can afford easy access to the left lateral side of the torso of the patient P, and the conforming main beam portion 300 is arranged, sized, and shaped to avoid blocking access to the right lateral side of the torso of the patient P.

Figure 27:
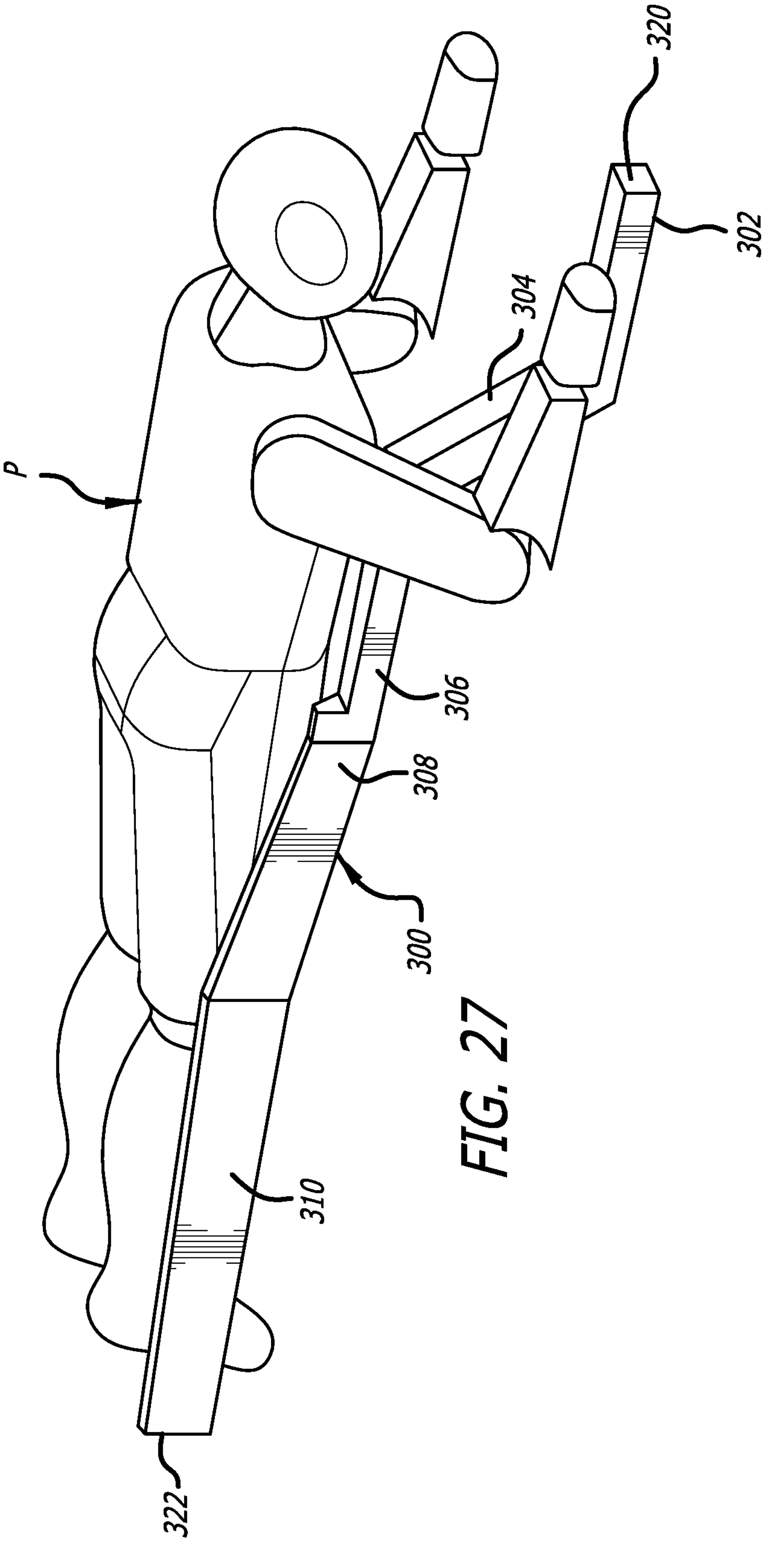
FIG. 27 is a top left perspective view of a first embodiment of a conforming main beam portion and a patient positioned with respect thereto, the first embodiment of the conforming main beam portion being provided to replace portions of the offset main beam depicted in FIGS. 1-10, 16, 22, 23, 25, and 26.
Figure 28:
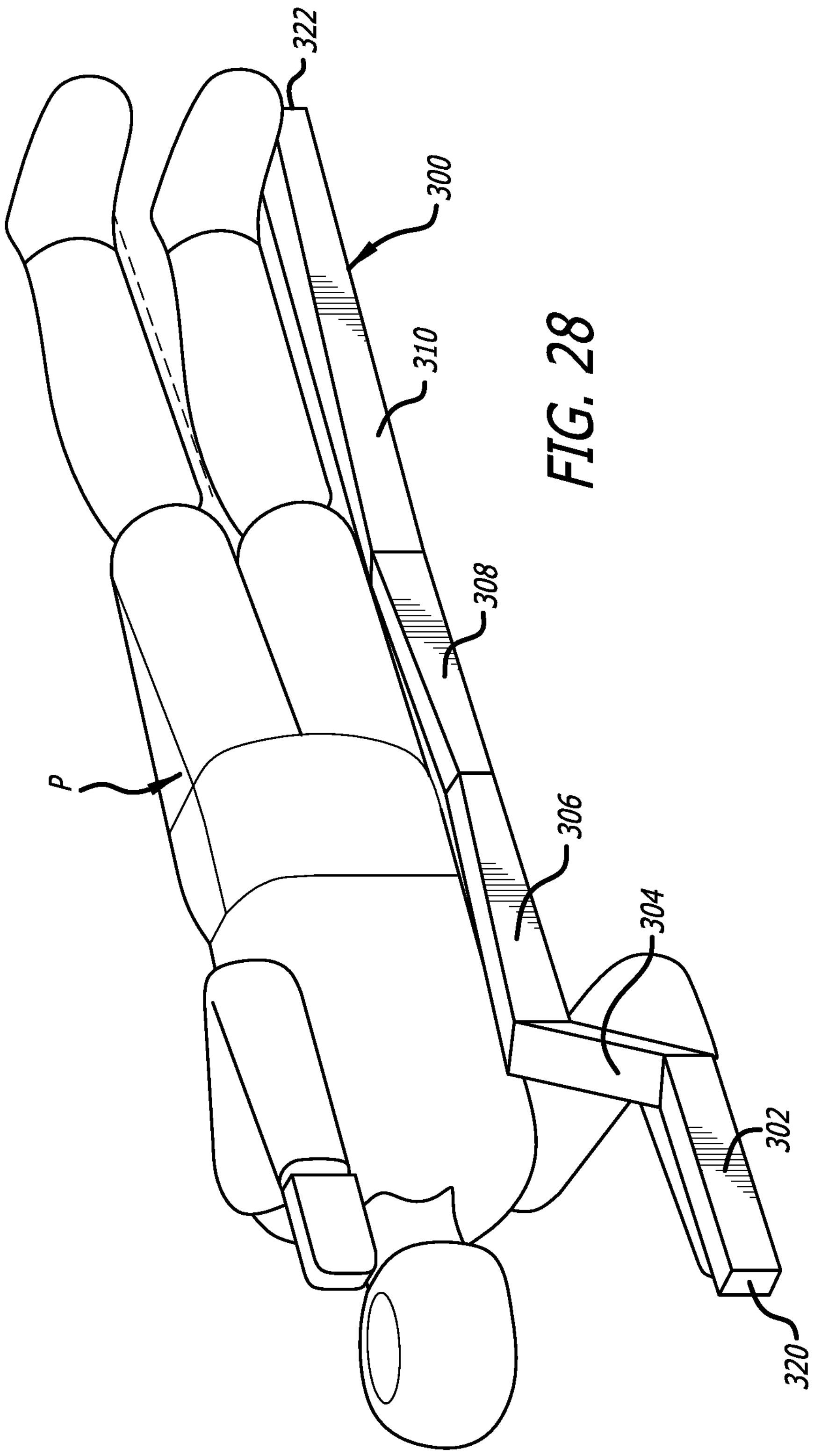
FIG. 28 is a bottom right perspective view of the conforming main beam portion of FIG. 27 and the patient positioned with respect thereto.
Figure 39:
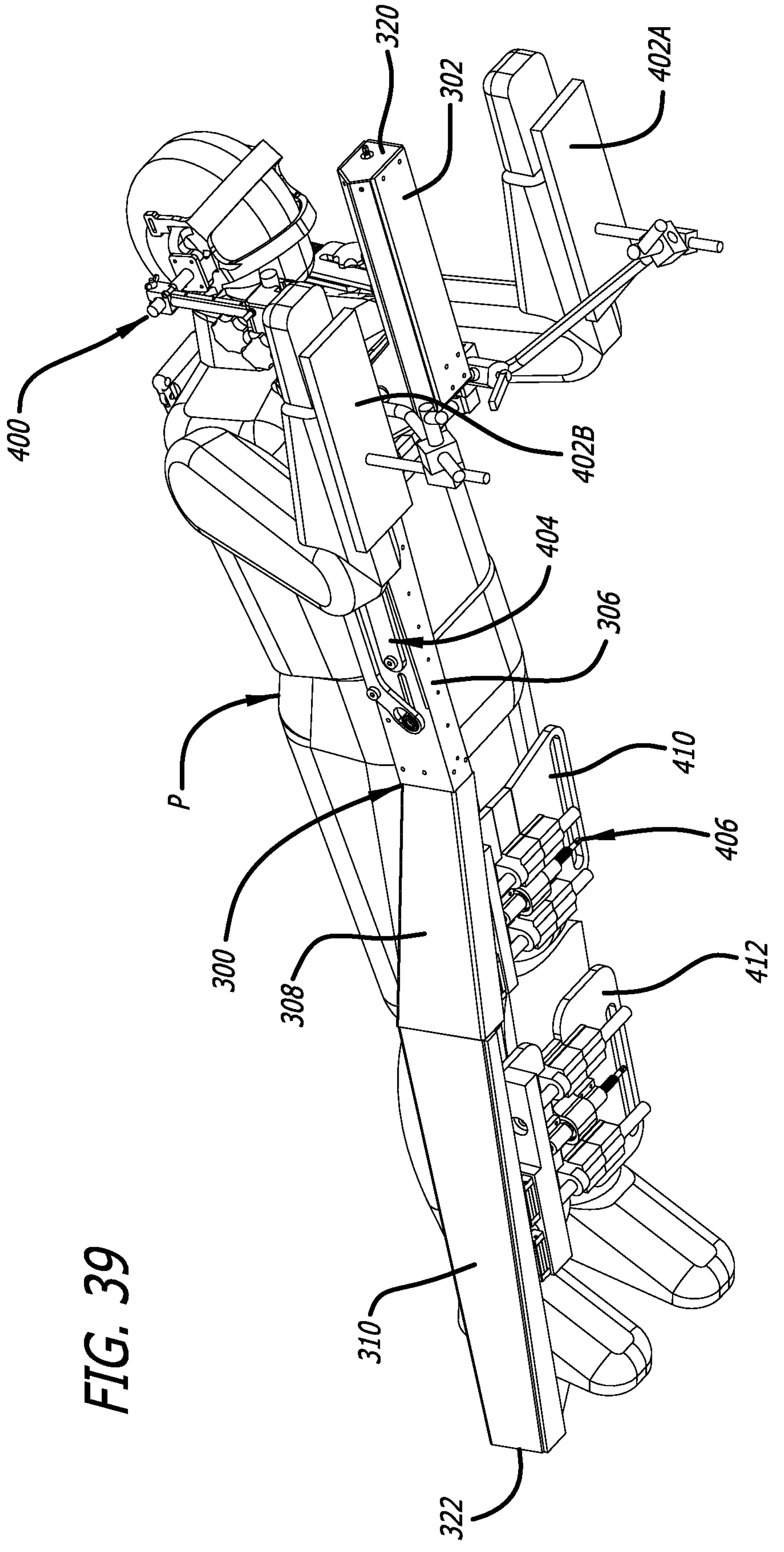
FIG. 39 is a bottom left perspective view of the conforming main beam portion of FIG. 27 showing the main beam in the second rotational position and the patient being positioned with respect to the various support components.

As depicted in FIGS. 27, 28, and 39, the first portion 302, the second portion 304, the third portion 306, the fourth portion 308, and the fifth portion 310 are arranged to facilitate access to the torso of the patient P. To that end, when the patient P is in the prone position, the first portion 302, the second portion 304, and at least a portion of the third portion 306 can be arranged such that these portions are positioned under the patient P, and at least a portion of the third portion 306, the fourth portion 308, and the fifth portion 310 can be arranged such that these portions are positioned along the right side of the patient P. The third portion 306 transitions the conforming main beam portion 300 from underneath to the right side of the patient, and at least a portion of the third portion 306, the fourth portion 308, and the fifth portion 310 can directly abut and extend along the right side of the patient P. The arrangement of the first portion 302, the second portion 304, the third portion 306, the fourth portion 308, and the fifth portion 310 affords access to the right lateral side of the torso of the patient P.

As depicted in FIGS. 27-31, when the conforming main beam portion 300 is oriented such that the patient P is in the prone position, the first portion 302 is oriented at an angle substantially aligned with the axis of rotation of the offset main beam 12, and the first portion 302 is spaced from and extends toward the second end 322 from the first end 320 beneath the head and between the arms of the patient P.

As depicted in FIGS. 27-31, when the conforming main beam portion 300 is oriented such that the patient P is in the prone position, the second portion 304 is oriented at an angle transverse to the axis of rotation of the offset main beam 12, and the second portion extends toward the second end 322 upwardly from the first portion toward the right side of the torso of the patient P underneath the patient P. The second portion 304 terminates adjacent the right side of the chest of the patient P.

As depicted in FIGS. 27-31, when the conforming main beam portion 300 is oriented such that the patient P is in the prone position, the third portion 306 is oriented at an angle substantially aligned with the axis of rotation of the offset main beam 12, and the third portion 306 extends toward the second end 322 from the second portion 304 from underneath to along the right side of the torso of the patient P. The third portion 306 terminates adjacent the right hip of the patient P.

As depicted in FIGS. 27-31, when the conforming main beam portion 300 is oriented such that the patient P is in the prone position, the fourth portion 308 is oriented at an angle transverse to the axis of rotation of the offset main beam 12, and the fourth portion 308 extends toward the second end 322 upwardly from the third portion 306 along a portion of the right upper leg of the patient P. The fourth portion 308 terminates at or above the right knee of the patient P.

As depicted in FIGS. 27-31, when the conforming main beam portion 300 is oriented such that the patient P is in the prone position, the fifth portion 310 extends to the second end 322 downwardly from the fourth portion 308 along a portion of the right upper leg, the right lower leg, and the right foot of the patient P.

In addition to being arranged to facilitate access to the patient P, the first portion 302, the second portion 304, the third portion 306, the fourth portion 308, and the fifth portion 310 can be sized and shaped to facilitate such access. To illustrate, as depicted in FIG. 27, the third portion 306 can have a relatively short height along some or all of its length to provide access to the right lateral side of the patient P. Furthermore, the widths of third portion 306 and the fourth portion 308 can be varied to accommodate the shape of the patient P. To illustrate, as depicted in FIG. 28, the width of the third portion 306 can decrease as it extends toward the second end 322, and the width of the fourth portion 308 can increase as it extends toward the second end 322 to accommodate the lower torso of the patient P.

Figure 29:
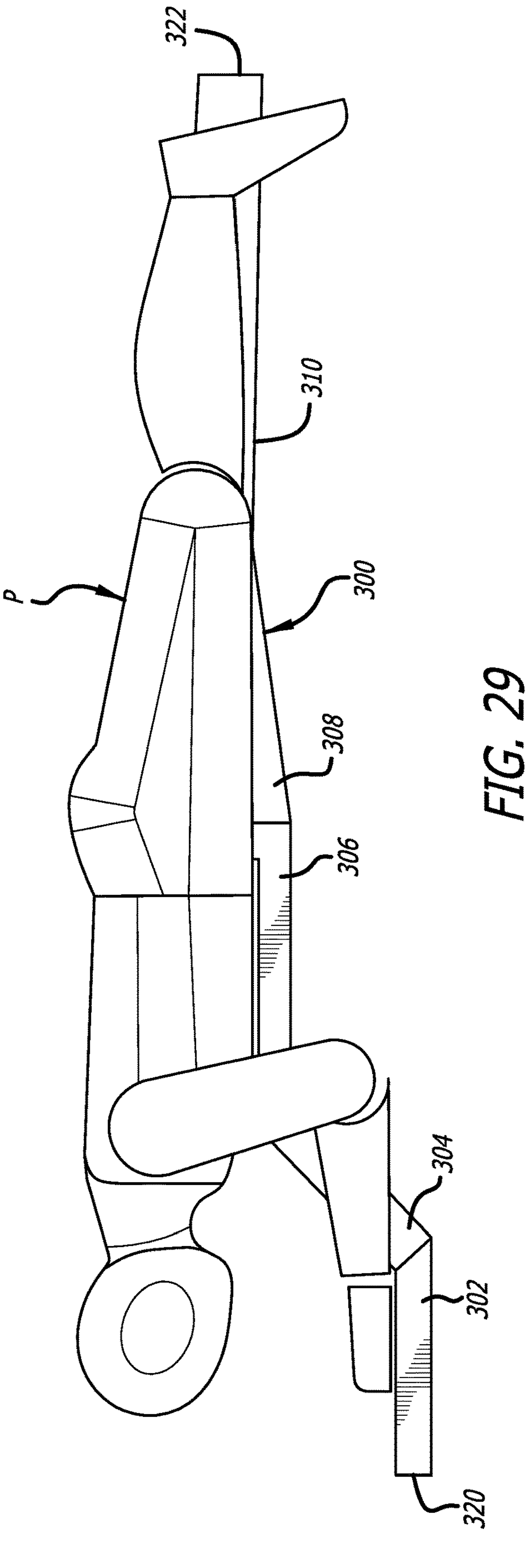
FIG. 29 is a right side elevational view of the conforming main beam portion of FIG. 27 with the torso of the patient positioned in a flat first prone position.
Figure 30:
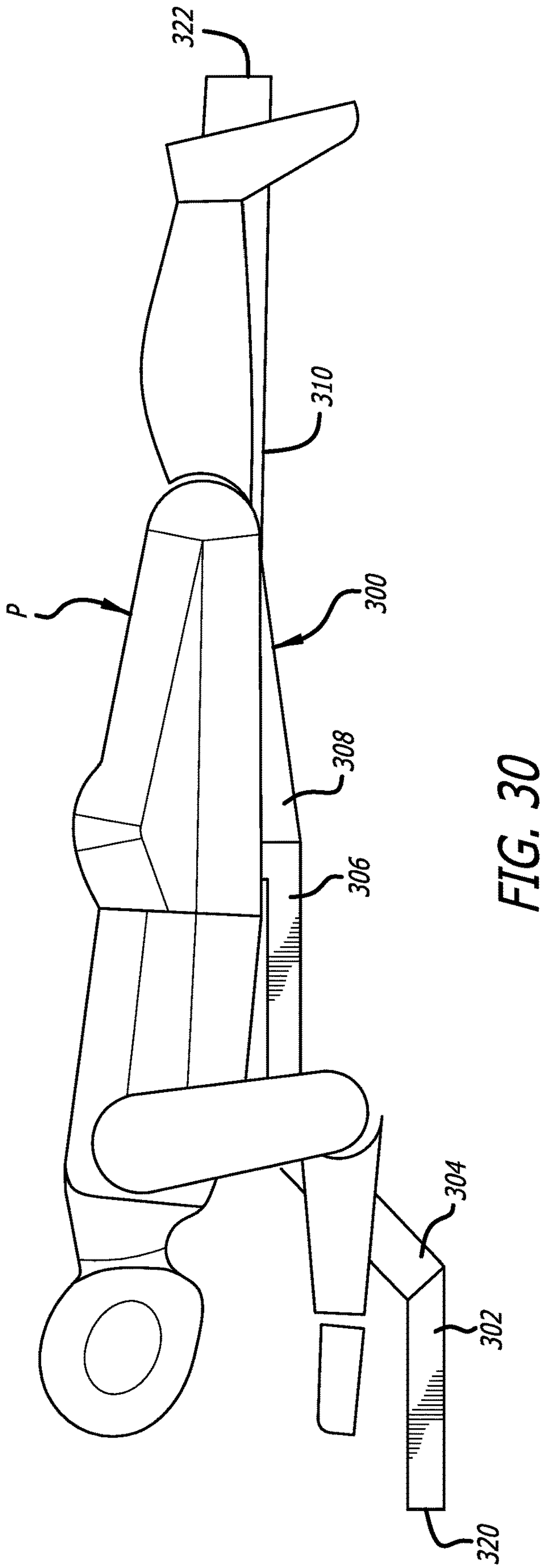
FIG. 30 is a right side elevational view of the conforming main beam portion of FIG. 27 with the torso of the patient positioned in a raised second prone position.
Figure 31:
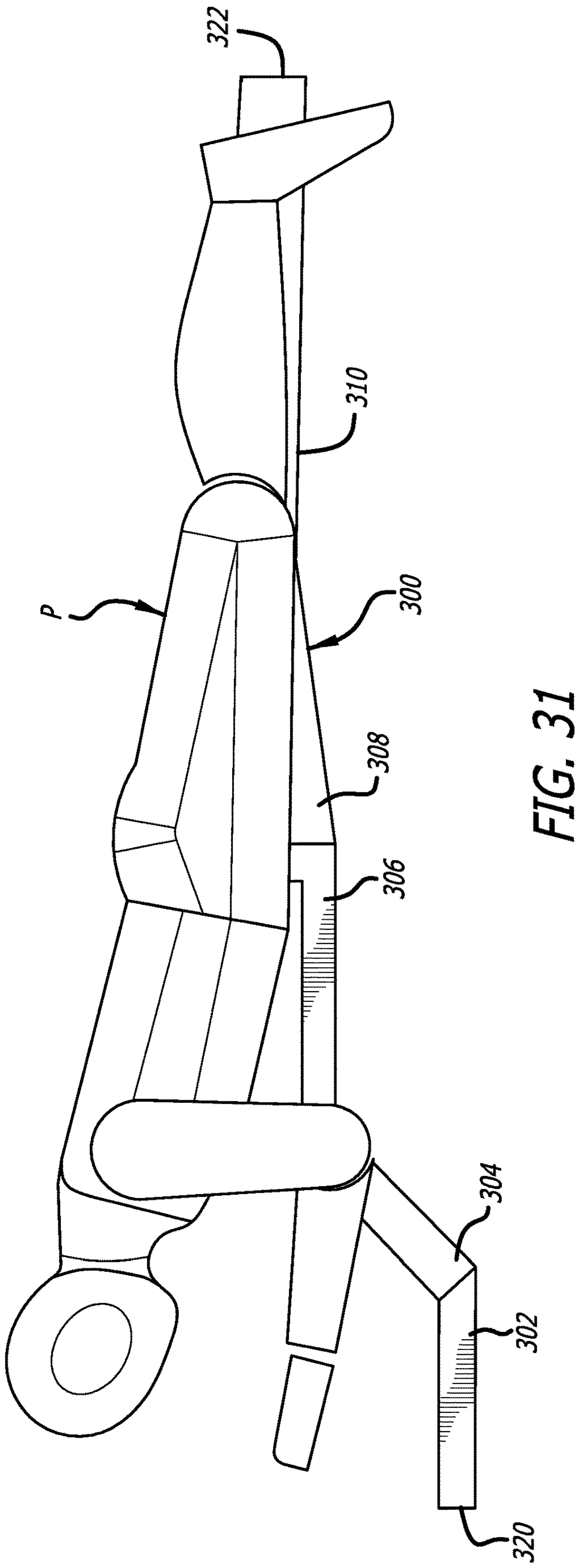
FIG. 31 is a right side elevational view of the conforming main beam portion of FIG. 27 with the torso of the patient positioned in a raised third prone position.
Figure 32:
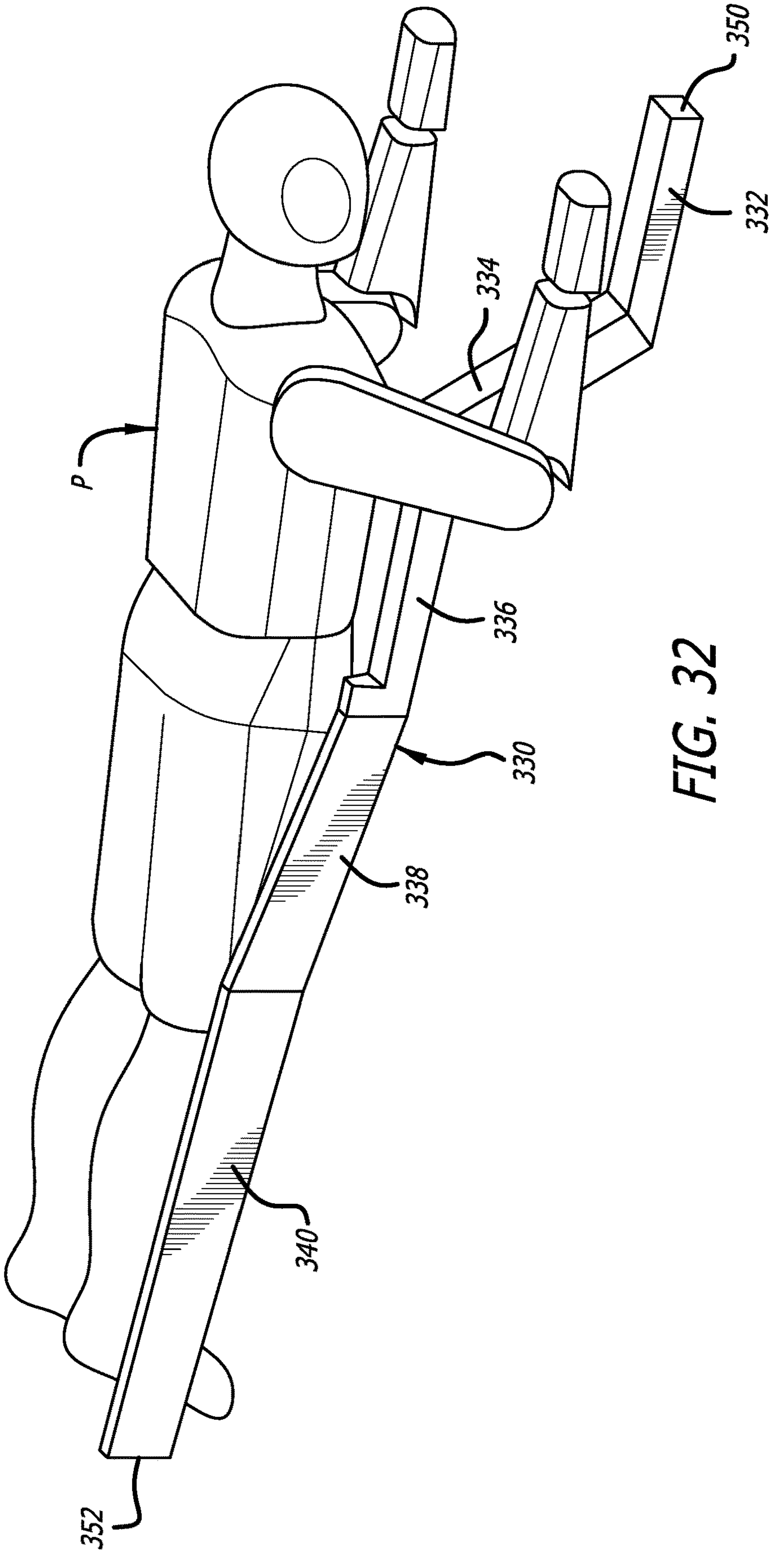
FIG. 32 is a top left perspective view of a second embodiment of a conforming main beam portion and a patient positioned with respect thereto, the second embodiment of the conforming main beam portion being provided to replace portions of the offset main beam depicted in FIGS. 1-10, 16, 22, 23, 25, and 26.
Figure 33:
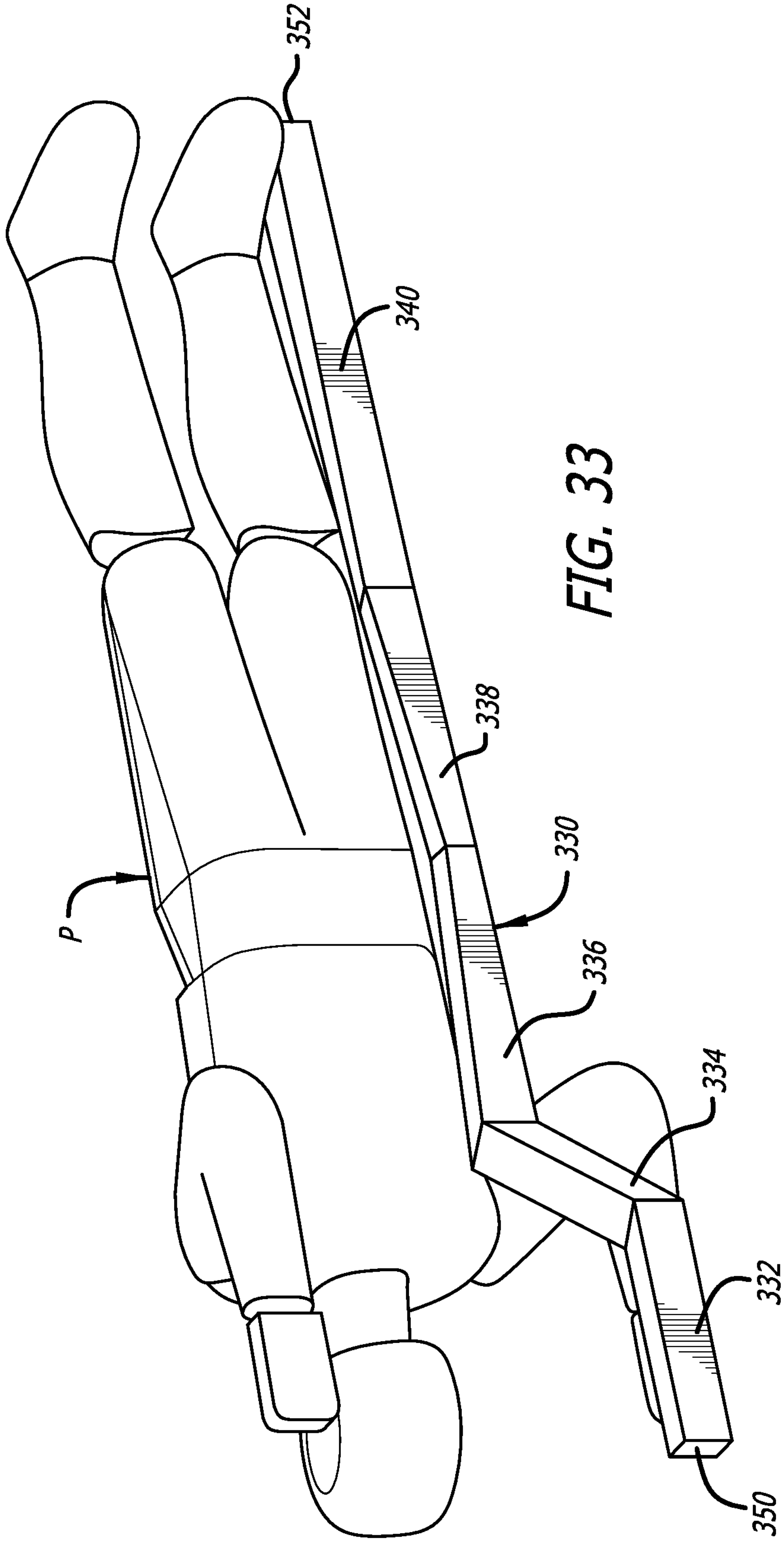
FIG. 33 is a bottom right perspective view of the conforming main beam portion of FIG. 32 and the patient positioned with respect thereto.

The conforming main beam portion 300, as depicted in FIGS. 36-39, can include various support components that directly contact and support the patient P. For example, the conforming main beam 300 can include a head support 400 similar to head support 20, arm supports 402A and 402B similar to the arm supports 22A and 22B, a torso-lift support 404 similar to the torso-lift supports 24 and 160, and a leg support 406 including an upper leg support portion 410 and a lower leg support portion 412 similar to sagittal adjustment mechanism 28. When the patient P is supported by the offset main beam 12 incorporating the conforming main beam portion 300, the various support components thereof can be used to adjust the position of the patient P. For example, to facilitate posterior decompression surgery, the configuration of the conforming main beam portion 300 (FIG. 27), and use of the torso-lift support 404 and the leg support 406 can be relied upon. Furthermore, FIGS. 29-31 depict various prone positions of the patient P using the conforming main beam portion 300. Although not shown in FIGS. 29-30, the support components such as the head support 400, the arm supports 402A and 4026, the torso-lift support 404, and the leg support 406 can be used in facilitating different degrees of lordosis in the patient's spine. FIG. 29 depicts the patient P in a flat first prone position, FIG. 30 depicts the torso of the patient P in a raised second prone position, and FIG. 31 depicts the torso of the patient P in a raised third prone position.

Alternatively, the other preferred embodiment of the conforming main beam portion 330 affords extension of the hips of the patient P and slight lordosis of the patient's spine. The conforming main beam portion 330 includes a first portion 332, a second portion 334, a third portion 336, a fourth portion 338, and a fifth portion 340. Furthermore, the conforming main beam portion 330 has a first end 350 and a second end 352. The first portion 332 can be attached at the first end 350 to the first portion 80, and the fifth portion 340 can be attached at the second end 352 to the second portion 92. As such, the conforming main beam portion 330 is spaced from the axis of rotation of the offset main beam 12 by the first portion 80 and the second portion 92, and the conforming main beam portion 330 is supported by the remainder of the surgical frame 10 via the first portion 80 and the second portion 92. As such, the first portion 80 and the second portion 92 serve as support arms for supporting the conforming main beam portion 300 relative to the remainder of the surgical frame.

Like similar portions of the conforming main beam portion 300, the first portion 332, the second portion 334, the third portion 336, the fourth portion 338, and the fifth portion 340 of the conforming main beam portion 330 are configured to facilitate access to either of the lateral sides of the patient P. The arrangement of the first portion 332, the second portion 334, and the third portion 336 of the conforming main beam portion 330 is similar to the arrangement of the first portion 302, the second portion 304, and the third portion 306 of the conforming main beam portion 300. However, the fourth portion 338 and the fifth portion 340 of the conforming main beam portion 330 have a different arrangement than the fourth portion 308 and the fifth portion 310 of the conforming main beam portion 300. The arrangement of the fourth portion 338 and the fifth portion 340 serves in slightly lordosing the patient's spine when the patient P is supported by the conforming main beam portion 330.

As depicted in FIGS. 32-35, when the conforming main beam portion 330 is oriented such that the patient P is in the prone position, the fourth portion 338 is oriented at an angle transverse to the axis of rotation of the offset main beam 12, and the fourth portion 338 extends toward the second end 352 upwardly from the third portion 336 along a portion of the right upper leg of the patient P. The fourth portion 338 terminates at or above the right knee of the patient P. Furthermore, as depicted in FIGS. 32-35, when the conforming main beam portion 330 is oriented such that the patient P is in the prone position, the fifth portion 340 extends to the second end 352 upwardly from the fourth portion 338 along a portion of the right upper leg, the right lower leg, and the right foot of the patient P.

Figure 34:
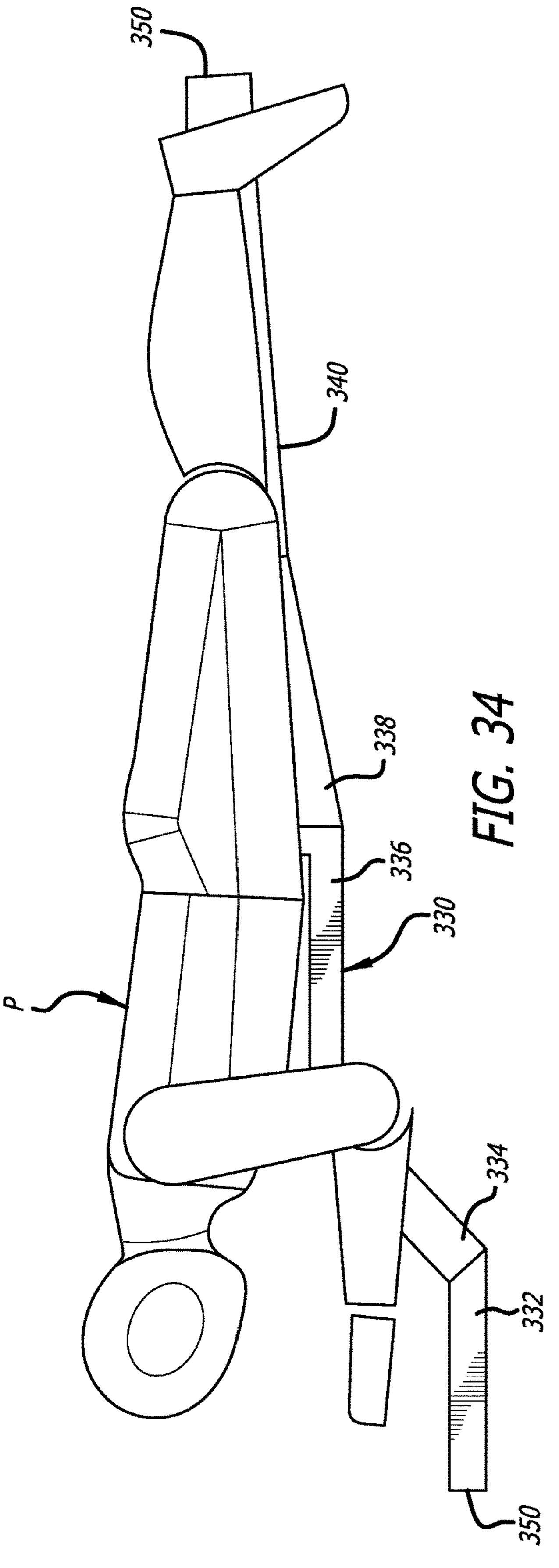
FIG. 34 is a right side elevational view of the conforming main beam portion of FIG. 32 with the torso of the patient positioned in a raised first prone position.
Figure 35:
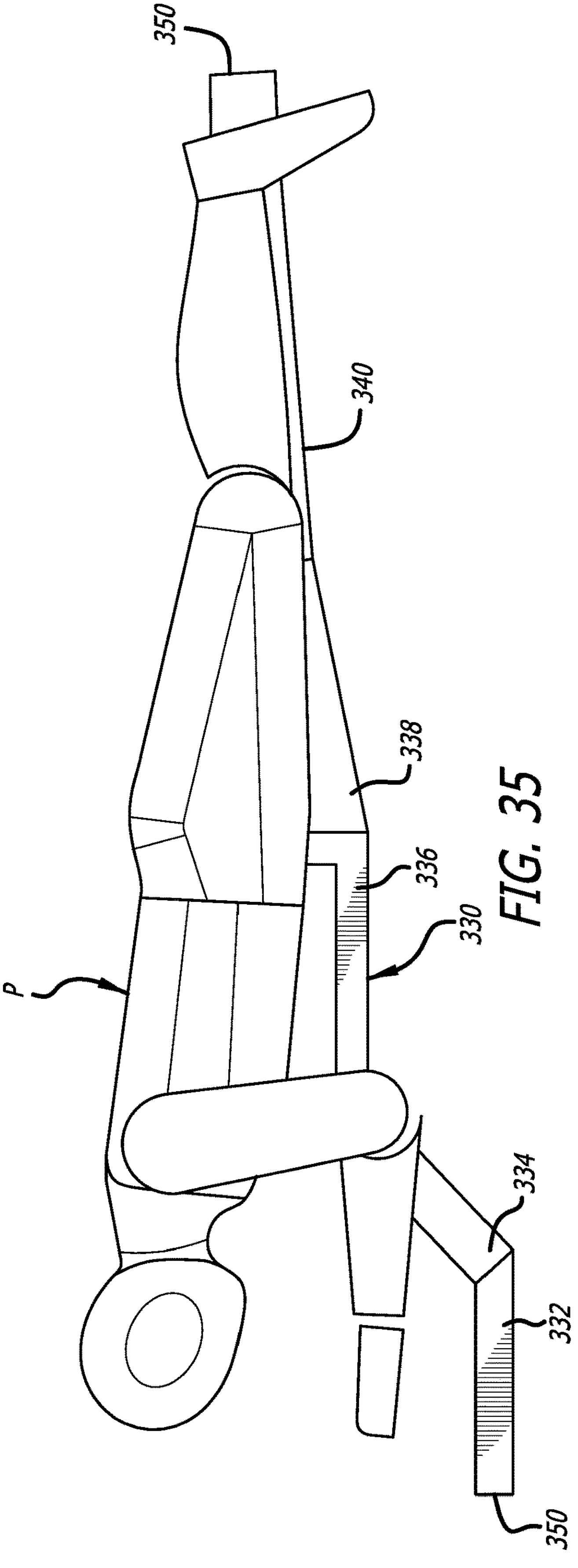
FIG. 35 is a right side elevational view of the conforming main beam portion of FIG. 32 with the torso of the patient positioned in a raised second prone position.
Figure 36:
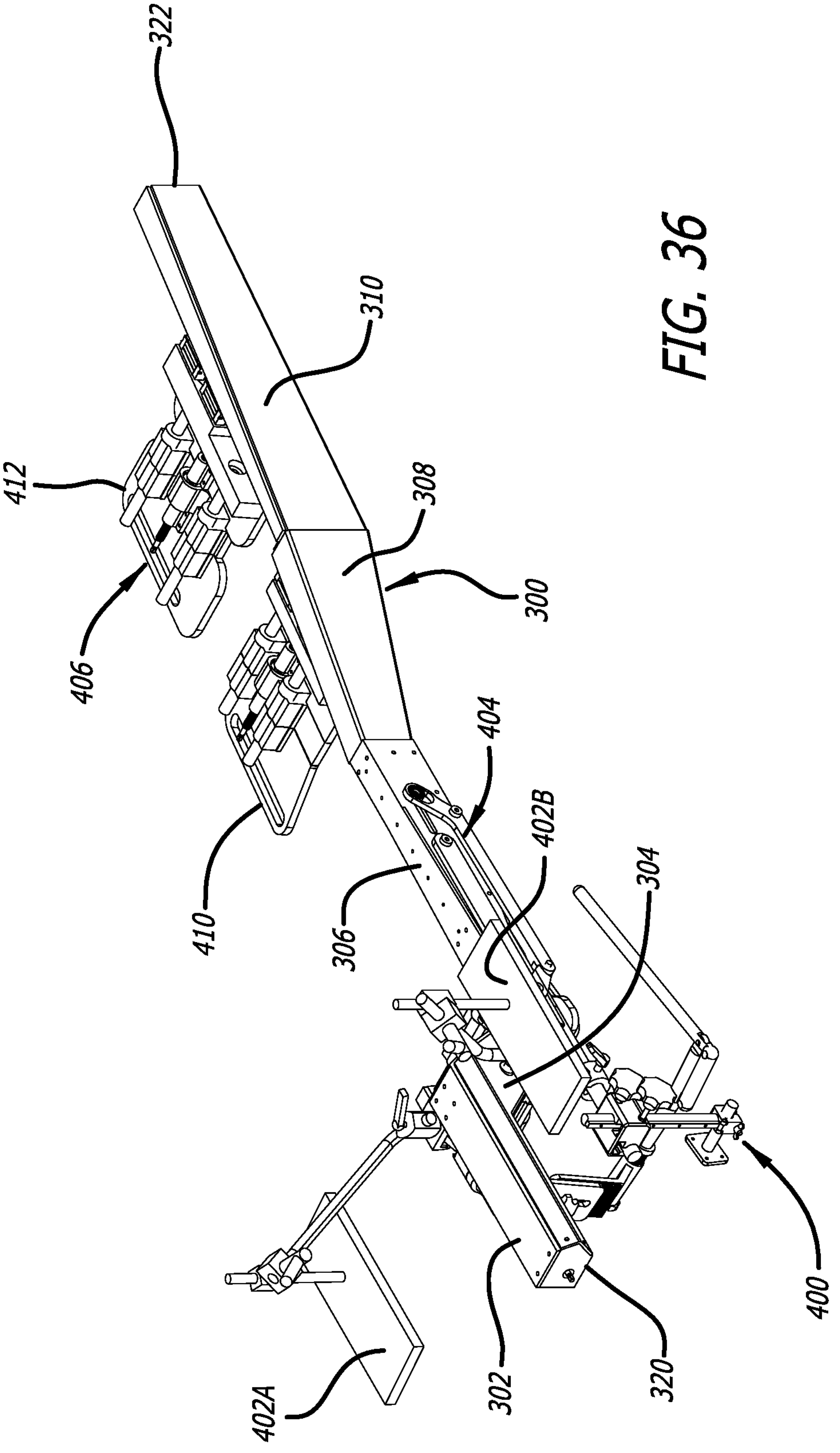
FIG. 36 is a top right perspective view of the conforming main beam portion of FIG. 27 showing the main beam in a first rotational position and showing various support components attached thereto.
Figure 37:
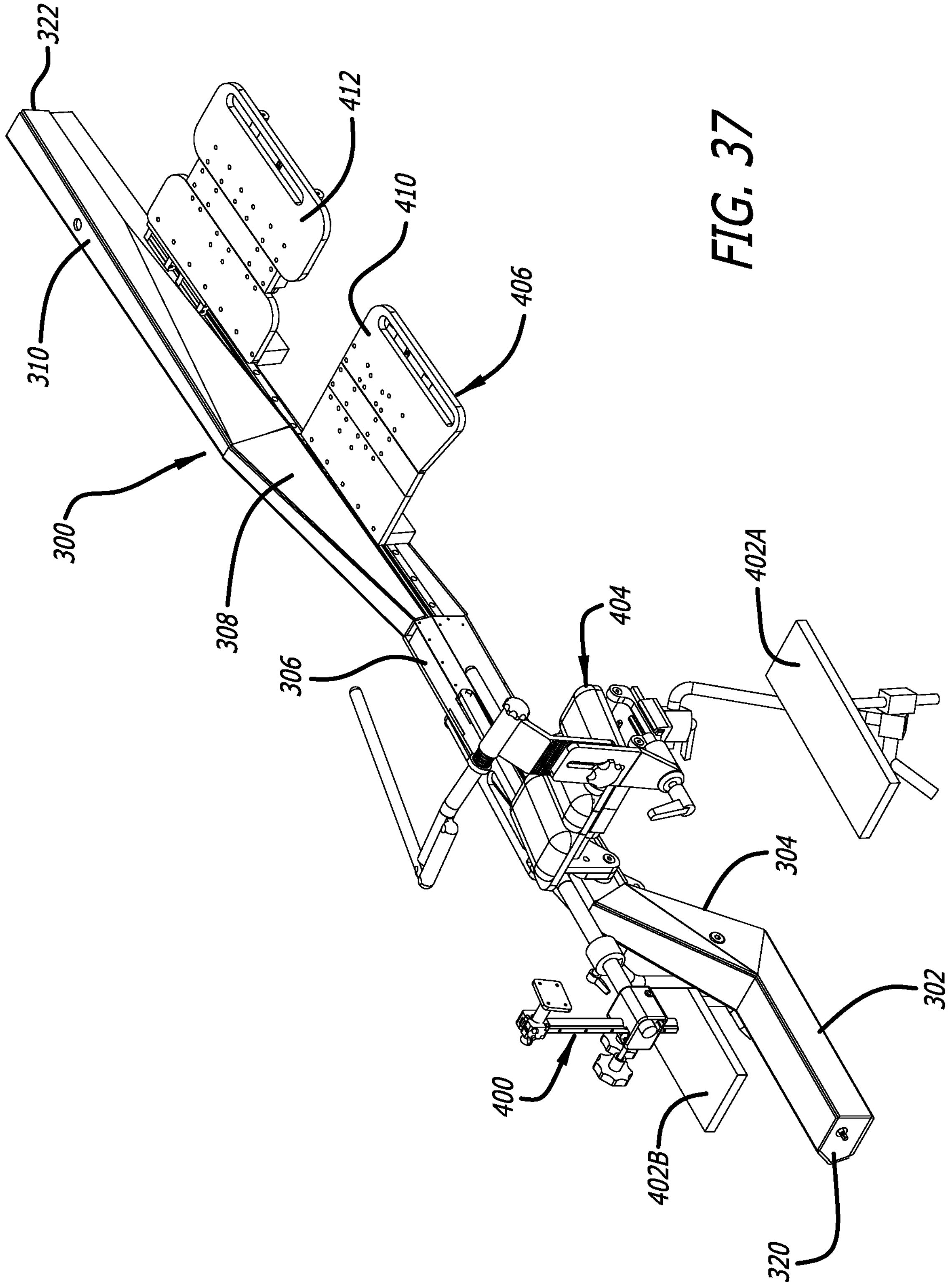
FIG. 37 is a top right perspective view of the conforming main beam portion of FIG. 27 showing the main beam in a second rotational position and showing the various support components attached thereto.
Figure 38:
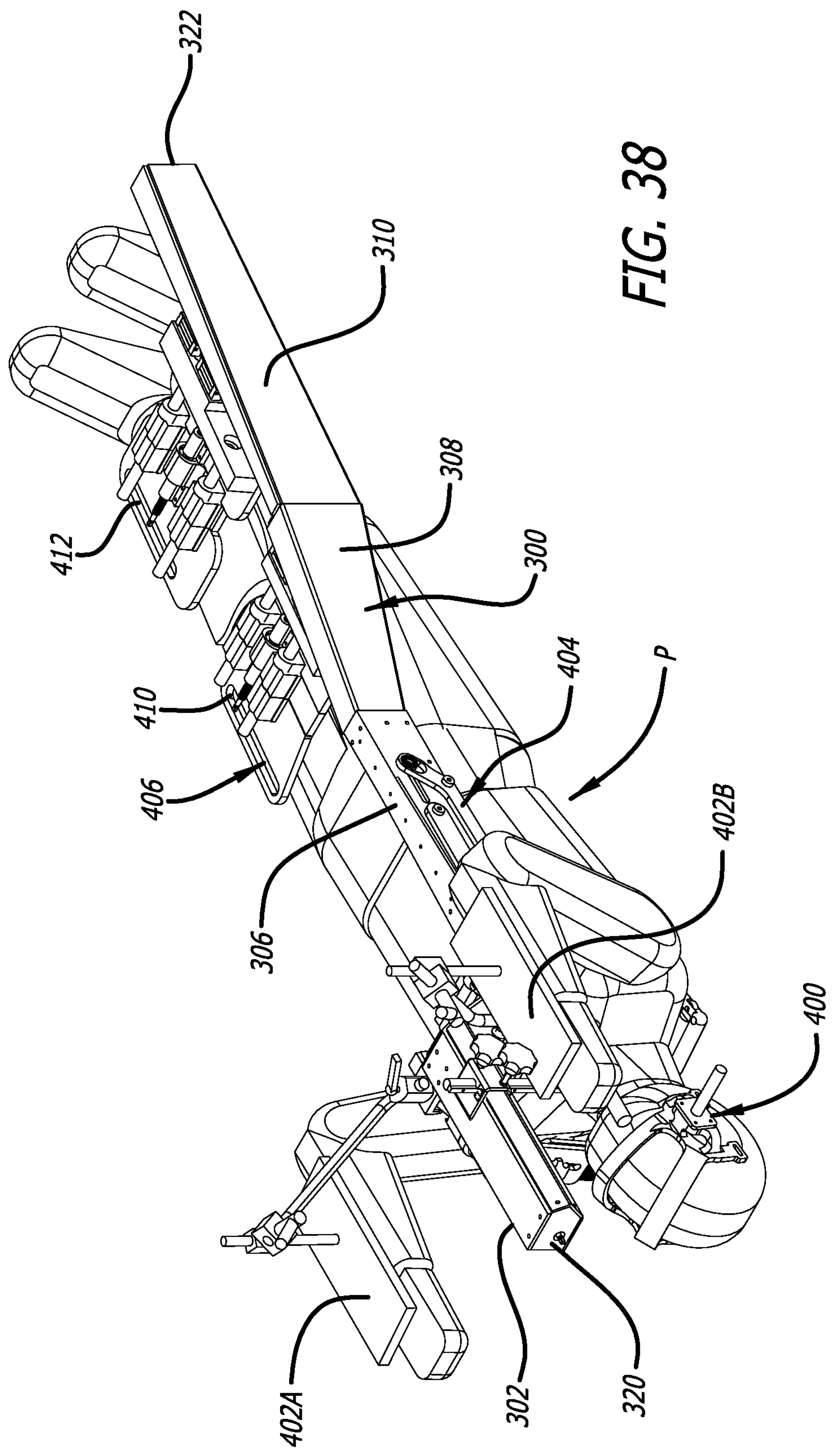
FIG. 38 is a top right perspective view of the conforming main beam portion of FIG. 27 showing the main beam in the first rotational position and the patient being positioned with respect to the various support components.

Like the conforming main beam portion 300, the conforming main beam portion 330 can include various support components that directly contact and support the patient P. For example, the conforming main beam portion 330 can also include the head support 400, the arm supports 402A and 4026, the torso-lift support 404, and the leg support 406 described in association with the conforming main beam portion 300. When the patient P is supported by the offset main beam 12 incorporating the conforming main beam portion 330, the arrangement of the portions of the conforming main beam portion 330 (especially the fourth portion 338 and the fifth portion 340) affords extension of the hips of the patient P and slight lordosis of the patient's spine. Thus, the arrangement of the conforming main beam portion 330 accomplishes a degree of lordosis of the patient's spine. Furthermore, although not shown in FIGS. 34 and 35, the support components such as the head support 400, the arm supports 402A and 402B, the torso-lift support 404, and the leg support 406 can be used in facilitating different degrees of lordosis in the patient's spine. FIG. 34 depicts the torso of the patient P in a raised first prone position, and FIG. 34 depicts the torso of the patient P in a raised second prone position.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A surgical positioning frame including a single main beam for supporting a patient thereon, the surgical positioning frame comprising:

a first support structure, a second support structure, a first patient arm support, a second patient arm support, and the single main beam positioned between the first support structure and the second support structure, the first patient arm support and the second patient arm support being supported relative to the single main beam, the single main beam being pivotable about an axis of rotation extending through or adjacent the first support structure and the second support structure, the single main beam including a first end portion and a second end portion being pivotally supported relative to the first and second support structures, respectively, the single main beam including a conforming main beam portion extending between the first end portion and the second end portion, the conforming main beam portion including a first end adjacent the first end portion and a second end adjacent the second end portion, a first portion extending toward the second end from the first end portion in a direction substantially aligned with the axis of rotation, a second portion extending toward the second end from the first portion in a direction transverse to the axis of rotation, and a third portion extending toward the second end from the second portion in a direction substantially aligned with the axis of rotation, the first portion, when the patient is supported by the surgical positioning frame in a prone position relative to the single main beam, extending underneath a head and between arms of the patient, the second portion, when the patient is supported by the surgical positioning frame in the prone position, extending upwardly toward a right lateral side of the patient and underneath a torso of the patient, at least portions of the third portion, when the patient is supported by the surgical positioning frame in the prone position, extending from underneath to along the right lateral side of the torso of the patient, at least portions of the third portion conforming to portions of the right lateral side of the patient, and wherein, the first portion of the conforming main beam includes a first side portion and an opposite second side portion, and, when the patient is supported by the single main beam, the first side portion is oriented toward the first patient arm support and a first arm of the patient supported thereby, and the second side portion is oriented toward the second patient arm support and a second arm of the patient supported thereby.

2. The surgical positioning frame of claim 1, wherein, when the patient is supported by the surgical positioning frame in the prone position, no other portion of the surgical positioning frame that is pivotable about the axis of rotation extends along a left upper leg portion and a left lower leg portion along a left lateral side of the patient opposite the right lateral side of the patient.

3. The surgical positioning frame of claim 2, wherein, when the patient is supported by the surgical positioning frame in the prone position, no other portion of the surgical positioning frame that is pivotable about the axis of rotation extends along the left lateral side of the patient.

4. The surgical positioning frame of claim 1, further comprising:

a torso-lift support attached to the conforming main beam portion, the torso-lift support including a chest support plate being configured to support the chest of the patient, the torso-lift support being pivotally connected to the single main beam, the torso-lift support being configured to pivot the chest support plate between at least a first position and a second position to move the torso of the patient between an unlifted position and a lifted position.

5. The surgical positioning frame of claim 4, wherein the first patient arm support and the second patient arm support are attached to the torso-lift support.

6. The surgical positioning frame of claim 1, further comprising:

a pelvic-tilt support attached to the single main beam, the pelvic-tilt support including a thigh cradle and a lower leg cradle, the thigh cradle being configured to support the thighs of the patient, and the lower leg cradle being configured to support the lower legs of the patient, the thigh cradle and the lower leg cradle being pivotal with respect to one another to facilitate adjustment of the hips of the patient.

7. The surgical positioning frame of claim 1, further comprising:

an upper leg support and a lower leg support attached to the conforming main beam portion adjacent the second end portion.

8. A surgical positioning frame including a single main beam for supporting a patient thereon, the surgical positioning frame comprising:

a support structure, a first patient arm support, a second patient arm support, and the single main beam positioned between portions of the support structure, the single main beam supporting the patient for pivotable movement about an axis of rotation relative to the support structure, the single main beam including a first end portion and a second end portion being pivotally pivotable between the portions of the support structure, the single main beam including a conforming main beam portion extending between the first end portion and the second end portion, the conforming main beam portion including a first end adjacent the first end portion and a second end adjacent the second end portion, a first portion extending toward the second end from the first end portion, a second portion extending toward the second end from the first portion, and a third portion extending toward the second end from the second portion, the first portion, when the patient is supported by the surgical positioning frame in a prone position relative to the single main beam, extending underneath a head and between arms of the patient, the second portion, when the patient is supported by the surgical positioning frame in the prone position, extending upwardly toward a right lateral side of the patient and underneath a torso of the patient, at least portions of the third portion, when the patient is supported by the surgical positioning frame in the prone position, conforming to portions of the right lateral side of the patient, and wherein, the first portion of the conforming main beam includes a first side portion and an opposite second side portion, and, when the patient is supported by the single main beam, the first side portion is oriented toward the first patient arm support and a first arm of the patient supported thereby, and the second side portion is oriented toward the second patient arm support and a second arm of the patient supported thereby; and wherein, when the patient is supported by the surgical positioning frame in the prone position, no other portion of the surgical positioning frame that is rotatable about the axis of rotation extends along a left upper leg portion and a left lower leg portion along a left lateral side of the patient opposite the right lateral side of the patient.

9. The surgical positioning frame of claim 8, wherein the axis of rotation extends through or adjacent the first support structure and the second support structure.

10. The surgical positioning frame of claim 8, wherein, when the patient is supported by the surgical positioning frame in the prone position, no other portion of the surgical positioning frame that is pivotable about the axis of rotation extends along a left upper leg portion and a left lower leg portion along a left lateral side of the patient opposite the right lateral side of the patient.

11. The surgical positioning frame of claim 10, wherein, when the patient is supported by the surgical positioning frame in the prone position, no other portion of the surgical positioning frame that is rotatable about the axis of rotation extends along the left lateral side of the patient.

12. The surgical positioning frame of claim 8, further comprising:

a torso-lift support attached to the conforming main beam portion, the torso-lift support including a chest support plate being configured to support the chest of the patient, the torso-lift support being pivotally connected to the single main beam, the torso-lift support being configured to pivot the chest support plate between at least a first position and a second position to move the torso of the patient between an unlifted position and a lifted position.

13. The surgical positioning frame of claim 12, wherein the first patient arm support and the second patient arm support are attached to the torso-lift support.

14. The surgical positioning frame of claim 8, further comprising:

a pelvic-tilt support attached to the single main beam, the pelvic-tilt support including a thigh cradle and a lower leg cradle, the thigh cradle being configured to support the thighs of the patient, and the lower leg cradle being configured to support the lower legs of the patient, the thigh cradle and the lower leg cradle being pivotal with respect to one another to facilitate adjustment of the hips of the patient.

15. The surgical positioning frame of claim 8, further comprising:

an upper leg support and a lower leg support attached to the conforming main beam portion adjacent the second end portion.

16. A surgical positioning frame including a single main beam for supporting a patient thereon, the surgical positioning frame comprising:

a support structure, a first patient arm support, a second patient arm support, and the single main beam positioned between portions of the support structure, the single main beam supporting the patient for rotatable movement about an axis of rotation relative to the support structure, the single main beam including at least a first end portion being pivotally attached relative to the support structure, the single main beam including a conforming main beam portion having a first end and a second end, the conforming main beam portion being attached at the first end to the first end portion, the conforming main beam portion including a first portion extending toward the second end from the first end portion a second portion extending toward the second end from the first portion, and a third portion extending toward the second end from the second portion, the first portion, when the patient is supported by the surgical positioning frame in a prone position relative to the single main beam, extending underneath a head and between arms of the patient, and the second portion, when the patient is supported by the surgical positioning frame in the prone position, extending upwardly toward a right lateral side of the patient and underneath a torso of the patient, wherein, the first portion of the conforming main beam includes a first side portion and an opposite second side portion, and, when the patient is supported by the single main beam in the prone position, the first side portion is oriented toward the first patient arm support and a first arm of the patient supported thereby, and the second side portion is oriented toward the second patient arm support and a second arm of the patient supported thereby; and wherein, when the patient is supported by the surgical positioning frame in the prone position, no other portion of the surgical positioning frame that is rotatable about the axis of rotation extends along a left lateral side of the patient opposite the right lateral side of the patient.

17. The surgical positioning frame of claim 16, wherein the first portion and the third portion extend in directions substantially aligned with the axis of rotation.

18. The surgical positioning frame of claim 16, further comprising:

a torso-lift support attached to the single main beam, the torso-lift support including a chest support plate being configured to support the chest of the patient, the torso-lift support being pivotally connected to the single main beam, the torso-lift support being configured to pivot the chest support plate between at least a first position and a second position to move the torso of the patient between an unlifted position and a lifted position, wherein the first patient arm support and the second patient arm support are attached to the torso-lift support.

19. The surgical positioning frame of claim 18, wherein the first patient arm support and the second patient arm support are attached to the torso-lift support.

20. The surgical positioning frame of claim 16, further comprising:

a pelvic-tilt support attached to the single main beam, the pelvic-tilt support including a thigh cradle and a lower leg cradle, the thigh cradle being configured to support the thighs of the patient, and the lower leg cradle being configured to support the lower legs of the patient, the thigh cradle and the lower leg cradle being pivotal with respect to one another to facilitate adjustment of the hips of the patient; and an upper leg support and a lower leg support attached to the conforming main beam portion adjacent the second end.

* * * * *